United States Patent [19]

Ishii

[11] Patent Number: 4,999,620

[45] Date of Patent: Mar. 12, 1991

[54] APPARATUS FOR STORING AND ACCESSING IMAGE DATA TO BE DISPLAYED ON A DISPLAY UNIT

[75] Inventor: Takatoshi Ishii, Tokyo, Japan

[73] Assignee: ASCII Corporation, Tokyo, Japan

[21] Appl. No.: 86,680

[22] Filed: Aug. 17, 1987

[30] Foreign Application Priority Data

Aug. 21, 1986 [JP] Japan .................... 61-195899
Aug. 21, 1986 [JP] Japan .................... 61-195900
Aug. 21, 1986 [JP] Japan .................... 61-195901
Aug. 21, 1986 [JP] Japan .................... 61-195902
Aug. 21, 1986 [JP] Japan .................... 61-195903
Aug. 21, 1986 [JP] Japan .................... 61-195904

[51] Int. Cl.$^5$ ............................. G09G 1/02
[52] U.S. Cl. ................... 340/799; 340/798; 340/703
[58] Field of Search ........... 340/799, 798, 701, 703, 340/744, 747, 750

[56] References Cited

U.S. PATENT DOCUMENTS

| | | | |
|---|---|---|---|
| 4,641,282 | 2/1987 | Ounuma | 340/703 |
| 4,706,079 | 11/1987 | Kummer et al. | 340/799 |
| 4,742,474 | 5/1988 | Knierim | 340/799 |
| 4,766,431 | 8/1988 | Kobayashi et al. | 340/723 |

Primary Examiner—Jeffery A. Brier

Attorney, Agent, or Firm—Hoffmann & Baron

[57] ABSTRACT

A memory storage and accessing device is constituted by a plurality of plane memories. Memory elements are arranged in each plane memory two-dimensionally, and a plurality of image data are stored in a word direction in each plane memory. In addition, plural plane memories are disposed in a pixel direction. Hence, plural image data are stored two-dimensionally in word and pixel directions. The memory device is constituted such that a port connected by a word data bus and another port connected by a pixel data bus are provided therein. Due to these two ports, it is possible to perform an independent access so as to independently read out and write in word data and pixel data. The memory storage and accessing device is capable of masking bits of data and memory units, using both static and dynamic masks. In the static mask, mask data are applied all at once in one memory cycle, or the mask data are supplied to the memory device at plural times in one memory cycle. In the dynamic mask, the mask data are supplied to the memory device at plural times in one memory cycle and the mask positions can be sequentially changed. The memory storage and accessing device of the present invention is also capable of comparing pixel and word data with compare data in each plane memory and in combination with a masking operation.

9 Claims, 25 Drawing Sheets

7 = P·S·D
6 = P·S·D̄
5 = P·S̄·D
4 = P·S̄·D̄
3 = P̄·S·D
2 = P̄·S·D̄
1 = P̄·S̄·D
0 = P̄·S̄·D̄

APPARATUS FOR STORING AND ACCESSING IMAGE DATA TO BE DISPLAYED ON A DISPLAY UNIT

BACKGROUND OF THE INVENTION

1. Field of the Invention

The present invention generally relates to memory devices for storing image data, and more particularly to a memory device having a large storage capacity in which plenty of image data are written therein and read out therefrom with a high speed so as to display the image corresponding to the image data on a screen of a display unit.

2. Prior Art

Generally, a memory device for storing image data (such as a frame buffer and the like) is used for displaying the image on the screen of display unit. In order to perform a multicolor display and a high resolution display, such memory device is required to perform write-in and read-out processes with a high speed and to provide a large storage capacity. The storage capacity of the frame buffer must be increased in proportion to the size of display area and the resolution value of the display unit and in accordance with the number of display screens (in the case where the display unit is provided with a plurality of display screens) and the number of displayed colors as well.

For instance, in the case where sixteen colors are to be displayed on the screen of the display unit (on the display screen), a color code designating one of the sixteen colors must be in the form of four-bit digital data. Hence, as shown in FIG. 1, the frame memory must be constituted by four frame memories FM0 to FM3. In FIG. 1, one dot of the display screen corresponds to four data surrounded by a dotted line which exist at the same bit position of the frame memories FM0 to FM3. A direction of the dotted line is called a pixel (picture element) direction. When the image is displayed on the display screen, the plural data in the pixel direction (hereinafter, four data in the pixel direction will be referred to as one pixel data) are sequentially read out from the frame memories FM0 to FM3 in accordance with the scanning of the display screen, whereby the multicolor display can be performed.

Actually, the frame memories FM0 to FM3 are constituted by dual port memories in order to obtain a high picture quality of the display screen. Generally, the four data within one pixel data are synchronized and read out from serial data output terminals of the frame memories FM0 to FM3, hence, plural pixel data are read out from the frame memories FM0 to FM3. In FIG. 1, when the access is performed by one word, the access direction will be called a word direction as shown by an arrow surrounded by a dashed line.

However, the conventional memory device is disadvantageous in that the following problems must necessarily occur.

Firstly, in the above-mentioned memory device having plural memory units (or memory boards), it is required to transfer the data by words or by pixels. In this case, one of the memory units and the address of the data as the source must be selected one by one so as to read out the data therefrom, and one of the memory units and the address of the data as the destination must be selected so as to write the data therein. Hence, the conventional memory device suffers a problem in that the access must be performed at many times in the data transfer, hence, much time must be required for the data transfer.

Secondly, in the case where the destination area or the source area exists in consecutive two words area, the access must be performed at further more times and the process for changing the bit position of the transfer data must be required. Hence, the conventional memory device suffers another problem in that the transfer time must be increased and the read-out and write-in processes must be complicated.

Thirdly, the conventional memory device is advantageous in that the color codes can be read out well when the image is displayed. However, the processes for exchanging data are extremely complicated when the independent access is performed to each pixel data and the predetermined two bits are exchanged in a certain pixel, for example. More specifically, the word data of eight bits (as shown by dashed line in FIG. 1) are read out in one chip within the frame memories FM0 to FM3. For this reason, when the access is given to the subject data (of more than two bits) by pixels and by bits as described above, the read-out process must be performed on word data including the subject data and the subject data must be extracted from the above word data. Hence, the conventional memory device suffers a further problem in that the processes for exchanging data must be complicated and much process time thereof must be required.

Fourthly, the memory device for storing the image data must require the large storage capacity. In this case, memory usage efficiency and packaging space can be improved by using a portion of the storage area as a program area. However, the image memory using the conventional memory device and the peripheral circuits thereof is disadvantageous in that it is impossible to use a portion of the storage area as the program area with ease because the access process must be complicated.

Fifthly, a picture processing technique requires processes for searching and detecting specific colors on the display screen. For example, in order to detect the coordinates of boundary portions of the predetermined image, the color codes must be searched at the boundary portions and the coordinates corresponding to the searched color codes must be calculated.

However, the conventional memory device is not provided with a function for comparing the data stored therein. In order to perform the above-mentioned search process, the central processing unit (CPU) connected to the memory device must perform the entire search process which requires the complicated control, and it is burdensome for the CPU. As a result, the conventional memory device suffers a problem in that it is difficult to perform the image process with a high speed. More specifically, the data must be read out by every plane in all of the frame buffers, and the read-out data are converted into the pixel data. Then the search/detect processes must be performed on the pixel data. Hence, the read-out process and the converting process must be complicated.

Sixthly, the picture processing sometimes requires the memory device to provide special functions for performing several kinds of processes. In a system where plural memory portions are provided therein, it is necessary to provide all of such special functions in common with all of the memory portions, and it is also necessary to independently supply parameters concerning such special functions to each memory portion.

However, the conventional memory device is disadvantageous in that the above-mentioned constitution can not be realized.

Seventhly, the picture processing requires a process for detecting whether the inputted color code coincides with the predetermined color code or not or a process for performing a logical operation between the inputted color code and the predetermined color code when the color code is written into the memory device. This logical operation is used for image composition, display blanking and partial image movement and the like. For example, in the case where destination data, pattern data and source data are respectively set as a background image, a pattern image and pattern color data, the logical operations are performed on the above data so that the pattern image is displayed on the background and the color of the pattern image is displaced by the color indicated by the source data.

In the above-mentioned processes, it is necessary to displace the pattern data, the source data and the destination data or comparing/detecting data when the picture processing is performed. Conventionally, the CPU and a graphic controller for controlling the memory device performs the above-mentioned processes, hence, it is extremely difficult to displace the data with a high speed. In addition, in the case where control programs for the CPU are complicated and there are many color codes to be operated, many kinds of logical operations are required. Hence, the conventional device suffers a problem in that it is burdensome to select and perform the logical operations.

Lastly, in the case where plural frame memories are connected in parallel as the frame buffers, the same data bus must be connected to output terminals of the same bit number within the frame memories. Hence, the total floating capacity of the data buses can not be prevented from enlarging. Meanwhile, in the case where data output buffers of the frame memories are identified as the open type (i.e., an open drain type and an open collector type and the like), a time lag in which the level of the data bus is changed from "0" level to "1" level will be determined by a time constant corresponding to the total floating capacity and resistances of pull-up resistors of the data buses. Generally the resistances of the pull-up resistors are set to relatively large resistances in order to reduce demanding electric power. Due to the large total floating capacity and the large resistances of the pull-up resistors of the data buses, the time constant becomes extremely large. Hence, the conventional frame buffers are disadvantageous in that the time lag becomes extremely long when signal having "1" logical level (hereinafter, referred to as "1" signal) is outputted from the data bus. In contrast with the above case, when the "0" or "1" signal is charged in the negative side of the data bus, the state inverse to the above-mentioned state will occur, however, the conventional frame buffers are disadvantageous as described above.

SUMMARY OF THE INVENTION

It is a primary object of the invention to provide a memory device for storing image data in which image data can be transferred with less access frequency and at a high speed.

It is a second object of the invention to provide a memory device in which the image data can be transferred with a high speed even when the source area and the destination area exist in two word areas.

It is a third object of the invention to provide a memory device in which the image data can be displaced by pixels and by bits with ease and at high speed.

It is a fourth object of the invention to provide a memory device in which the storage area thereof can be used as image data area and the program area and the usage thereof can be changed with a high speed.

It is a fifth object of the invention to provide a memory device in which the predetermined color can be searched and detected on the display screen with ease and the burden of the CPU can be remarkably reduced by providing a function for detecting whether the stored data (the stored color code) coincide with the predetermined data or not.

It is a sixth object of the invention to provide a memory device having a simple constitution in which the special functions can be set in common and the parameters thereof can be set independently.

It is a seventh object of the invention to provide a memory device in which several kinds of data can be stored and displaced in the area other than the memory portion thereof with a high speed.

It is the last object of the invention to provide a memory device in which the output signal in the charge side is prevented from being delayed even when the data output terminal thereof is an open type.

In a first aspect of the invention, there is provided a memory device comprising: (a) memory means constituted by a plurality of memory units, an address bus is connected in common to every memory units; (b) select means for selecting a specific portion within a storage area of each memory unit and enabling the selected specific portion on which the access can be performed in one memory cycle; and (c) access data selecting means for selecting said specific portion sequentially or at random so as to select access data in each memory unit.

In a second aspect of the invention, there is provided a memory device comprising: (a) memory means constituted by a plurality of memory units, a plurality of memory elements within each memory unit and a plurality of memory units being arranged such that bits of each image data are stored therein two-dimensionally in a word direction and in a pixel direction; (b) select means for selecting an arbitrary bit position and enabling the selected bit position when a common access is performed on each memory unit; (c) access control means for selecting said bit position sequentially or at random within one memory cycle so as to select a plurality of bit positions, whereby the access is performed on pixel data corresponding to the selected bit positions; and (d) buffer means constituted by a plurality of buffers, the pixel data being received in a portion selected by the select means and the access control means via the buffers.

In a third aspect of the invention, there is provided a memory device comprising: (a) memory means constituted by a plurality of memory units, a plurality of memory elements within each memory unit and a plurality of memory units being arranged such that bits of each image data are stored therein two-dimensionally in a word direction and in a pixel direction; (b) select means for selecting and enabling one of the memory units, the access is performed only on the selected memory unit (the access plane); (c) access control means for selecting said access plane sequentially or at random within one memory cycle so as to select a plurality of access planes, whereby the access is performed on word data corresponding to the selected access planes; and (d) buffer means for sequentially storing the word data selected by the access control means so as to output continuous two word data therefrom; and (e) barrel shifter means for extracting one word data from the continuous two word data and outputting the extracted one word data to the access control means.

In a fourth aspect of the invention, there is provided a memory device comprising: (a) select means for selecting one of a normal mode and a mask mode; and (b) means for executing a mask function and a logical operation function when the mask mode is selected.

In a fifth aspect of the invention, there is provided a memory device comprising: (a) memory means constituted by one memory unit or a plurality of memory units; (b) first means for performing a normal mode where at least one of memory units is selected based on select data; (c) second means for selecting and performing one of a bit mask and a plane mask, at least one of stored bits (at least one of memory elements) within each memory unit being masked based on bit mask data when the bit mask is selected, at least one of memory units being masked based on plane mask data when the plane mask is selected; and (d) mode selecting means for selecting one of the normal mode and the mask mode based on a value of a predetermined memory control signal when a start control signal for a memory access is activated.

In a sixth aspect of the invention, there is provided a memory device comprising: (a) memory means constituted by one memory unit or a plurality of memory units; (b) a word data bus provided in common for the same bit number of each memory unit in a word direction; (c) a plurality of pixel data buses, each of which is independently provided for each memory unit in a pixel direction; (d) first storing means for storing bit mask data for performing a bit mask, the bit mask data being supplied to the first storing means via the word data bus, at least one of bits (at least one of memory elements) within each memory unit being selected to be masked based on the bit mask data; (e) second storing means for storing select data, the select data being supplied to the second storing means via the pixel data bus, one of the memory units being selected based on the select data; (f) third storing means for storing plane mask data for performing a plane mask, the plane mask data being supplied to the third storing means via the pixel data bus, at least one of the memory units being masked based on the plane mask data; (g) first means for executing a normal mode, one of the memory units being selected based on the select data stored in the second storing means when the normal mode is selected; (h) second means for executing a mask mode, the bit mask based on the bit mask data stored in the first storing means or the plane mask based on the plane mask data stored in the third storing means being performed when the mask mode is selected; and (i) mode selecting means for selecting one of the normal mode and the mask mode based on a value of a predetermined memory control signal when a start control signal for a memory access is activated.

In a seventh aspect of the invention, there is provided a memory device comprising: (a) first storing means including a plurality of plane memories, one word being constituted by one bit or a plurality of bits; (b) second storing means for storing predetermined compare data to be compared, the second storing means being provided within each plane memory; and (c) comparing means for comparing contents of data read out from the plane memories with contents of the compare data stored in the second storing means and outputting the comparing result thereof.

In an eighth aspect of the invention, there is provided a memory device comprising: (a) memory means constituted by a plurality of memory units, each of which has a specific function; (b) address bus means connected in common to the memory units, each memory unit being supplied with function selecting codes via the address bus means; and (c) data bus means for transferring parameters to each memory unit.

In a ninth aspect of the invention, there is provided a memory device comprising: (a) register means provided independent of the memory units for storing data; and (b) register load means for activating load signals supplied to the register means at a timing when the read data are defined in a read cycle for the memory units.

In a tenth aspect of the invention, there is provided a memory device comprising: (a) register means provided independent of the memory units for storing data; (b) logical operation codes storing means for storing logical operation codes which are set in a predetermined procedure; (c) logical operation executing means for executing a logical operation between data supplied from an external device and data stored in the register means, the logical operation being selected by the logical operation codes supplied from the logical operation codes storing means; and (d) register load means for activating load signals supplied to the register means at a timing when the read data are defined in a read cycle for the memory units.

In the last aspect of the invention, there is provided a memory device comprising: (a) memory means constituted by a plurality of memory units, each of which has an open type output terminal connected to a data bus; and (b) precharging means for precharging the data bus before read data are outputted from the memory units in a read cycle for the memory units.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DESCRIPTION OF THE PREFERRED EMBODIMENTS

Figure 2:
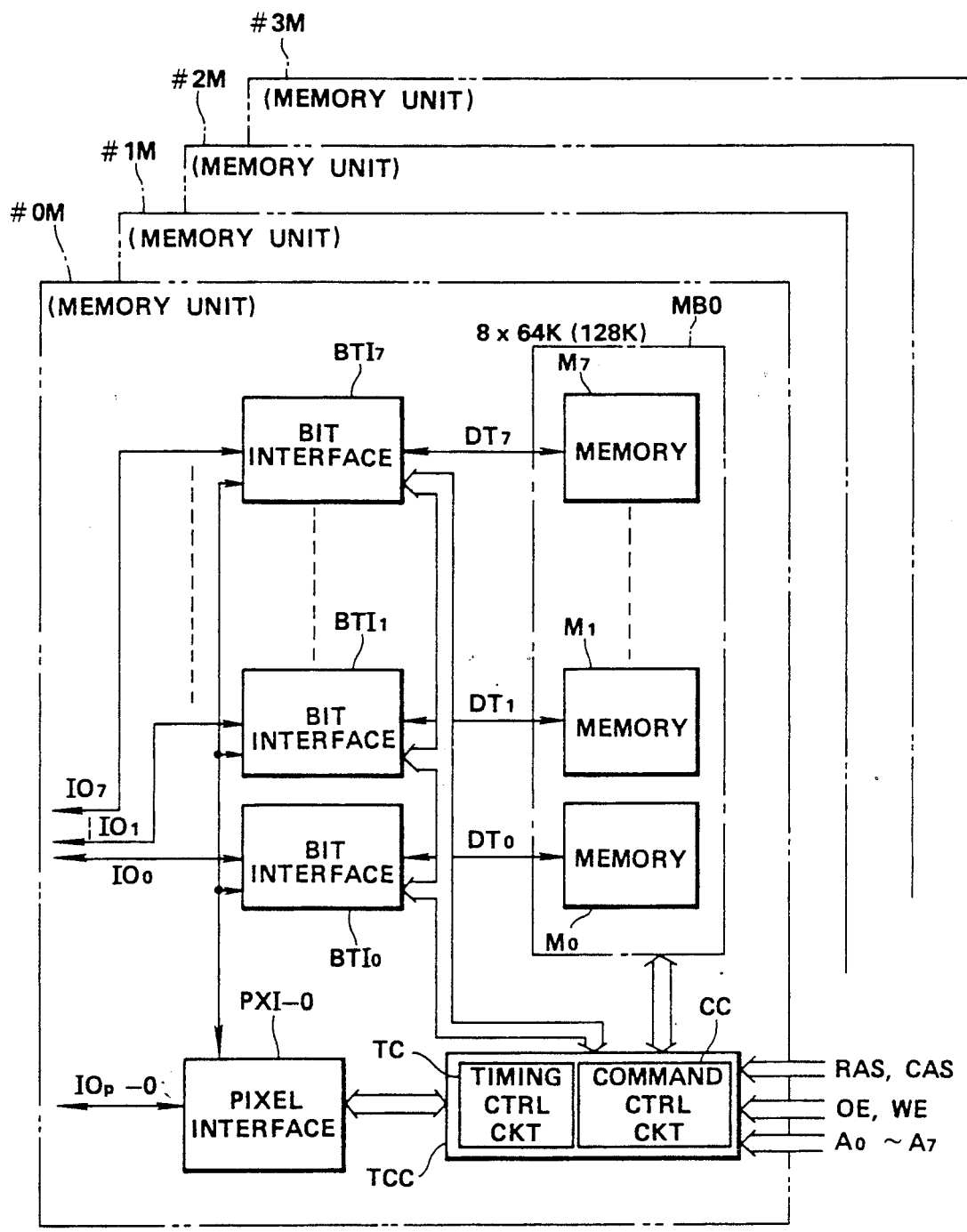
FIG. 2 is a block diagram showing a diagrammatic whole constitution of an embodiment of the memory device according to the present invention.

Referring now to the drawings, wherein like reference characters designate corresponding parts and signals throughout the several views, FIG. 2 is a block diagram showing an embodiment of a diagrammatic whole constitution of the memory device according to the present invention.

In FIG. 2, four memory units #0M to #3M have the same constitution, hence, the description will be mainly given with respect to the memory unit #0M. In the memory unit #0M, $M_0$ to $M_7$ designate memories each of which has a storage capacity of 1-bit×64-kilo (or 128-kilo). These memories $M_0$ to $M_7$ are connected in parallel as to constitute a memory block MB0 which has a storage capacity of 8-bit×64-kilo (or 128-kilo). In addition, $BTI_0$ to $BTI_7$ designate bit interfaces for controlling to transmit parallel data between the memories $M_0$ to $M_7$ and data buses $IO_0$ to $IO_7$. Furthermore, PXI-0 designates a pixel interface for transmitting data (i.e., pixel data) between the bit interfaces $BTI_0$ to $BTI_7$ and a data bus $IO_p$-0. The pixel interface circuit PXI-0 transmits the pixel data to one of the memories $M_0$ to $M_7$ via corresponding one of the bit interfaces $BTI_0$ to $BTI_7$. In addition, the pixel interface PXI-0 reads in chip select data and plane mask data so as to generate control signals, and the control signals are supplied to the bit interfaces $BTI_0$ to $BTI_7$ and a timing command control circuit TCC.

The timing command control circuit TCC is supplied with address data outputted from an external device (not shown) via address buses $A_0$ to $A_7$. In addition, the timing command control circuit TCC is supplied with an output enable signal OE, a write enable signal WE, a row address strobe signal RAS and a column address strobe signal CAS and the like. This timing command control circuit TCC performs an access control on the memory block MB0 and also performs a timing control on several portions within the memory unit #0M. The timing command control circuit TCC controls the write enable signal WE for the memories $M_0$ to $M_7$ based on values of bit mask data (which will be described later) supplied from the bit interfaces $BTI_0$ to $BTI_7$. In addition, command data are supplied to the timing command control circuit TCC wherein the command data are decoded and several portions within the memory unit #M0 are controlled based on the decoded command data.

Above is the diagrammatic whole constitution of the memory unit #0M. Similarly, the memory units #1M to #3M respectively provide memory blocks MB1 to MB3 and pixel interfaces PXI-1 to PXI-3, and data buses $IO_p$-1 to $IO_p$-3 are respectively connected to the pixel interfaces PXI-1 to PXI-3.

Figure 3:
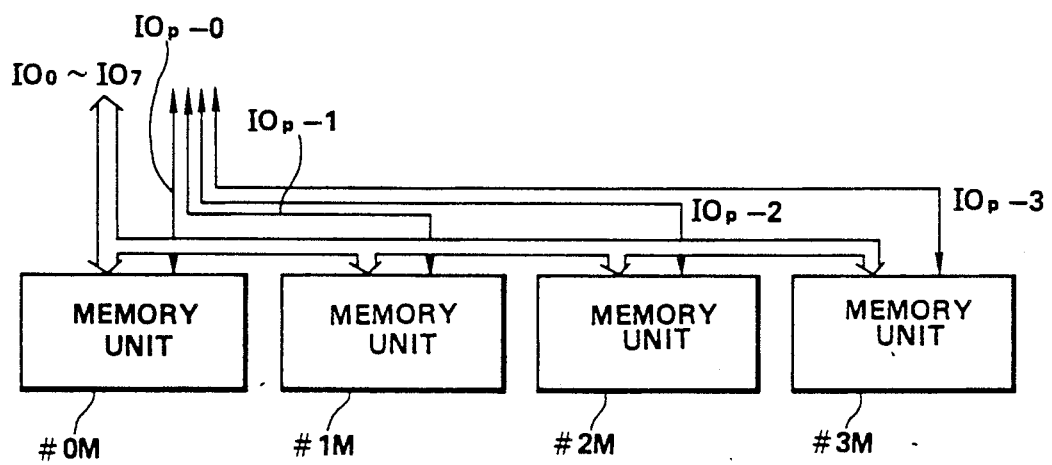
FIG. 3 is a block diagram showing connection relation between memory units and the data buses.

FIG. 3 is a block diagram showing a connection relation between the memory units #0M to #3M and the data buses $IO_0$ to $IO_7$ and $IO_p$-0 to $IO_p$-3. As shown in FIG. 3, all of the data buses $IO_0$ to $IO_7$ are connected in common to the memory units #0M to #3M. On the other hand, the data buses $IO_p$-0 to $IO_p$-3 are independently connected to respective memory units #0M to #3M.

#1 DIAGRAMMATIC DESCRIPTION OF MODES

Next, description will be given with respect to diagrammatic operation modes of the present invention, i.e., [A] normal mode and [B] mask mode in the following paragraphs.

[A] NORMAL MODE

In the normal mode, one of the memory units #0M to #3M is selected and the access for data of eight bits is performed on the selected memory unit. More specifically, the access is performed on parallel data of eight bits within the selected memory unit via the data buses $IO_0$ to $IO_7$.

In addition, this normal mode is used in the case where predetermined areas within the memory blocks MB0 to MB3 are used as program memory areas.

[B] MASK MODE

In the mask mode, one or two bits of data can be masked, and one or two memory units within the memory units #0M to #3M can be masked. This mask includes a static mask and a dynamic mask. In the static mask, the mask data are supplied by one memory cycle, or the mask data are supplied by plural times in one memory cycle. The present invention relates to the dynamic mask in which the mask data are supplied to the memory device by plural times in one memory cycle and mask positions are sequentially changed.

In addition, this mask mode includes a word access mode and a pixel access mode. In the word access mode, data are transmitted via the data buses $IO_0$ to $IO_7$ in the word direction. In the pixel access mode, data are transmitted via the data buses $IO_p$-0 to $IO_p$-3 in the pixel direction.

Figure 1:
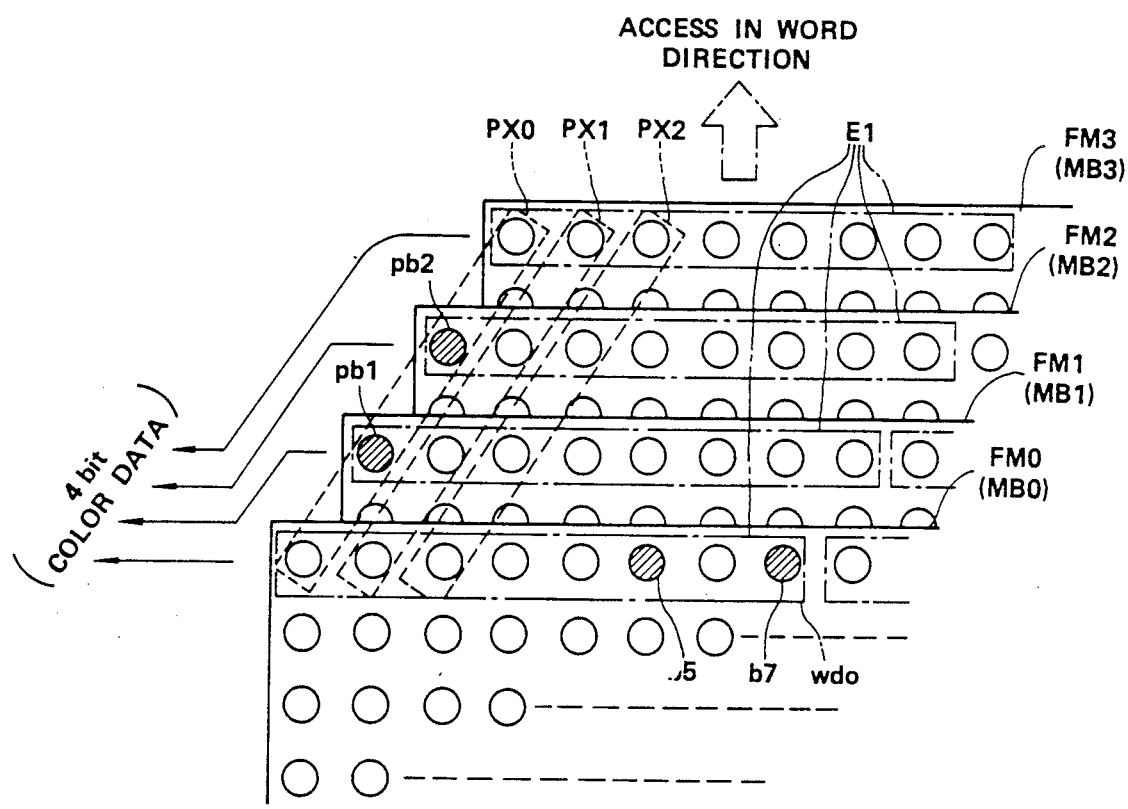
FIG. 1 is a conceptual drawing showing a relation between the data stored in the frame memories and the display screen.

In the above word access mode, the access is performed on the memory blocks MB0 to MB3 in the word direction as shown by dashed lines in FIG. 1. Next, description will be given with respect to the case where the bit mask is performed in the word access mode. For instance, in the case where the access is performed on only bits $b_5$ and $b_7$ and other bits are masked, the access is performed on the data $wd_0$ of eight bits within the memory block MB0 in the word direction. In this case, the access is performed only on the bits $b_5$ and $b_7$ within the data $wd_0$, and other bits are masked so that the access is prohibited from being performed on other bits within the data $wd_0$.

In the pixel access mode, the access is performed on the data within the memory blocks MB0 to MB3 in the pixel direction as shown by dotted lines in FIG. 1. Next, description will be given with respect to the case where the bit mask is performed in this pixel access mode. For instance, in the case where the access is performed on only bits $pb_1$ and $pb_2$ within pixel data PX0, the access is performed on the pixel data PX0 and the memory blocks MB0 and MB3 are masked so as to give access only to the bits $pb_1$ and $pb_2$.

Furthermore, all bits within the mask data can be set to "0" so that it is possible not to mask all bits and all memory blocks.

2 DESCRIPTION OF CIRCUIT CONSTITUTIONS

Next, description will be given with respect to the circuit constitutions of [A] Timing Control Circuit TC, [B] Command Control Circuit CC, [C] Memory Block MB0, [D] Bit Interface $BTI_i$, [E] Pixel Interface and [F] Output Data Buffer in conjunction with FIGS. 4 to 9.

[A] TIMING CONTROL CIRCUIT TC

Next, description will be given with respect to the circuit constitution of the timing command control circuit TCC shown in FIG. 2. This timing command control circuit TCC is constituted by a timing control circuit TC and a command control circuit CC respectively shown in FIGS. 4 and 5.

Figure 4:
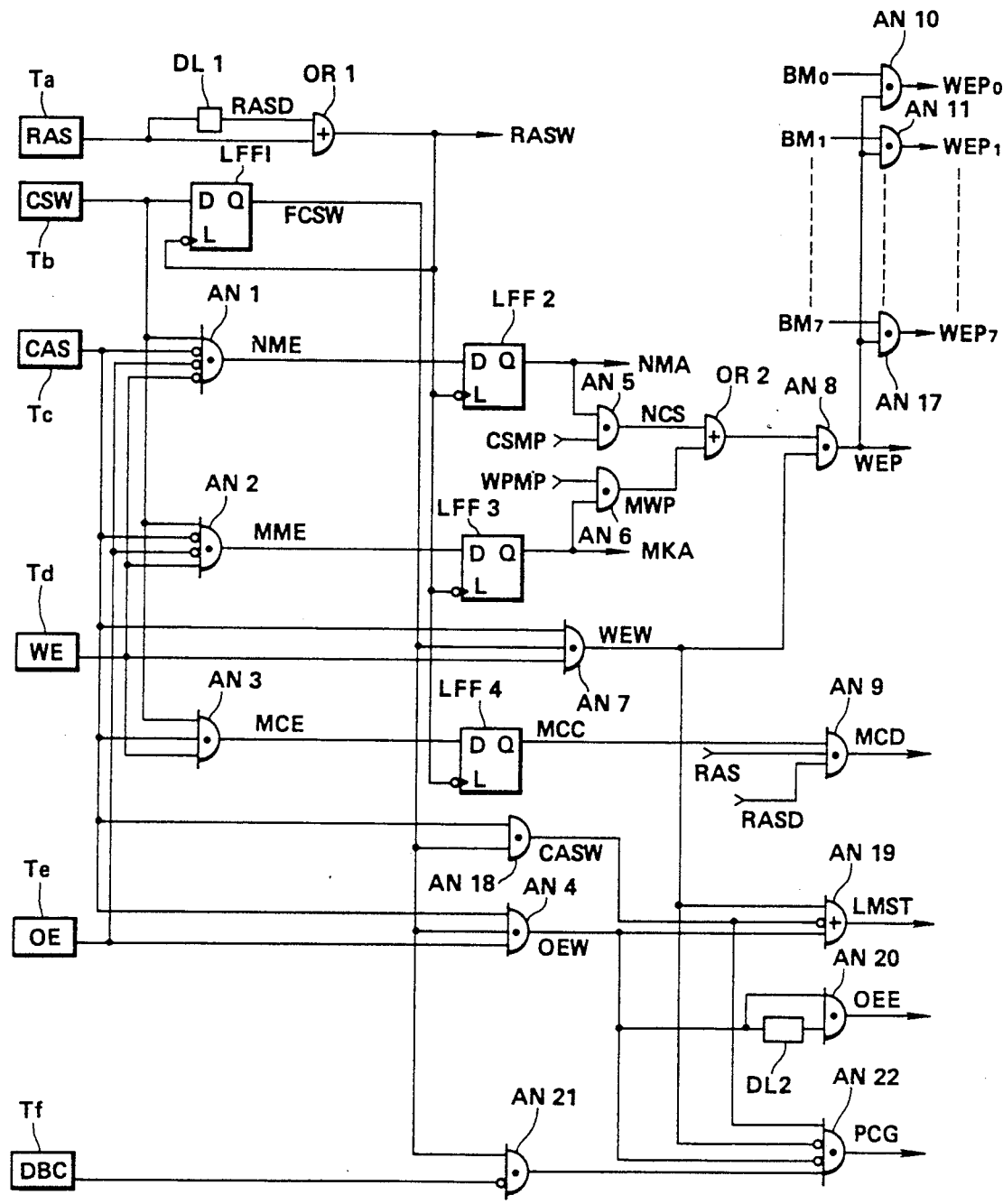
FIG. 4 is a circuit diagram showing an embodiment of a timing control circuit within the memory unit.

First, description will be given with respect to the timing control circuit TC in conjunction with FIG. 4. In FIG. 4, this timing control circuit TC has six input terminals Ta to Tf. The input terminal Ta is supplied with a row address strobe signal RAS, the input terminal Tb is supplied with a chip select signal CSW for selecting or not selecting the memory unit #0M, the input terminal Tc is supplied with a column address strobe signal CAS, the input terminal Td is supplied with a write enable signal WE, the input terminal Te is supplied with an output enable signal OE and the input terminal Tf is supplied with a data bus control signal DBC. The row address strobe signal RAS is delayed in a delay line DL1 so as to obtain a delayed row address signal RASD. The signals RAS and RASD are supplied to an OR gate OR1 wherein a signal RASW having a pulse width longer than that of the signal RAS is obtained based on the logical sum operation. The value of the chip select signal CSW is stored in a latch type flip-flop (hereinafter, referred to as a L flip-flop) LFF1 at a leading edge timing of the signal RASW and a signal FCSW is outputted from the output terminal Q thereof. When the normal mode is selected, an AND gate AN1 outputs a normal mode enable signal NME. In addition, when the mask mode is selected, an AND gate AN2 outputs a mask mode enable signal MME. Furthermore, when a command write-in cycle (which will be described later) is selected, an AND gate AN3 outputs a command enable signal MCE. At the leading edge timing of the signal RASW, these enable signals NME, MME and MCE are stored respectively in L flip-flops LFF2, LFF3 and LFF4 wherein signals NMA, MKA and MCC are obtained and outputted from the respective output terminals Q thereof.

An AND gate AN4 outputs a signal OEW based on the signals FCSW, CAS and OE, an AND gate AN5 outputs a signal NCS based on a signal NMA and an output signal CSMP of the pixel interface, an AND gate AN6 outputs a signal MWP based on a signal MKA and an output signal WPMP of the pixel interface and an AND gate AN7 outputs a signal WEW based on signals CAS, FCSW and WE. An OR gate OR2 is supplied with the signals NCS and MWP, and an AND gate AN8 outputs a signal WEP based on the signal WEW and the output signal of the OR gate OR2. In addition, an AND gate AN9 outputs a signal MCD based on signals MCC, RAS and RASD. Furthermore, first terminals of AND gates AN10 to AN17 are supplied with the same signal WEP from the AND gate AN8, and second terminals of AND gates AN10 to AN17 are supplied with respective bit mask signals $BM_0$ to $BM_7$ from the bit interfaces $BTI_0$ to $BTI_7$. Thus, the AND gates AN10 to AN17 outputs respective write enable signals $WEP_0$ to $WEP_7$ for the memories $M_0$ to $M_7$ (shown as FIG. 6) based on the logical product operations. An AND gate AN18 outputs a signal CASW based on signals CAS and FCSW and an AND gate AN19 outputs a signal LMST based on signals WEW, CASW and OEW.

In addition, the signal OEW is supplied to a delay line DL2 and a first input terminal of an AND gate AN20, and the delayed output signal from the delay line DL2 is supplied to a second input terminal of the AND gate AN20, thereby, the AND gate AN20 outputs a signal OEE. An AND gate AN21 is supplied with signals FCSW and DBC. Furthermore, an AND gate AN22 outputs a signal PCG based on signals CASW, WEW, OEW and the output signal of the AND gate AN21.

Incidentally, the latch type flip-flops LFF1 to LFF4 have latch terminals L for a negative logic, and the flip-flops LFF1 to LFF4 store the respective data when the "1" signals are supplied to the latch terminals L thereof.

[B] COMMAND CONTROL CIRCUIT CC

Figure 5:
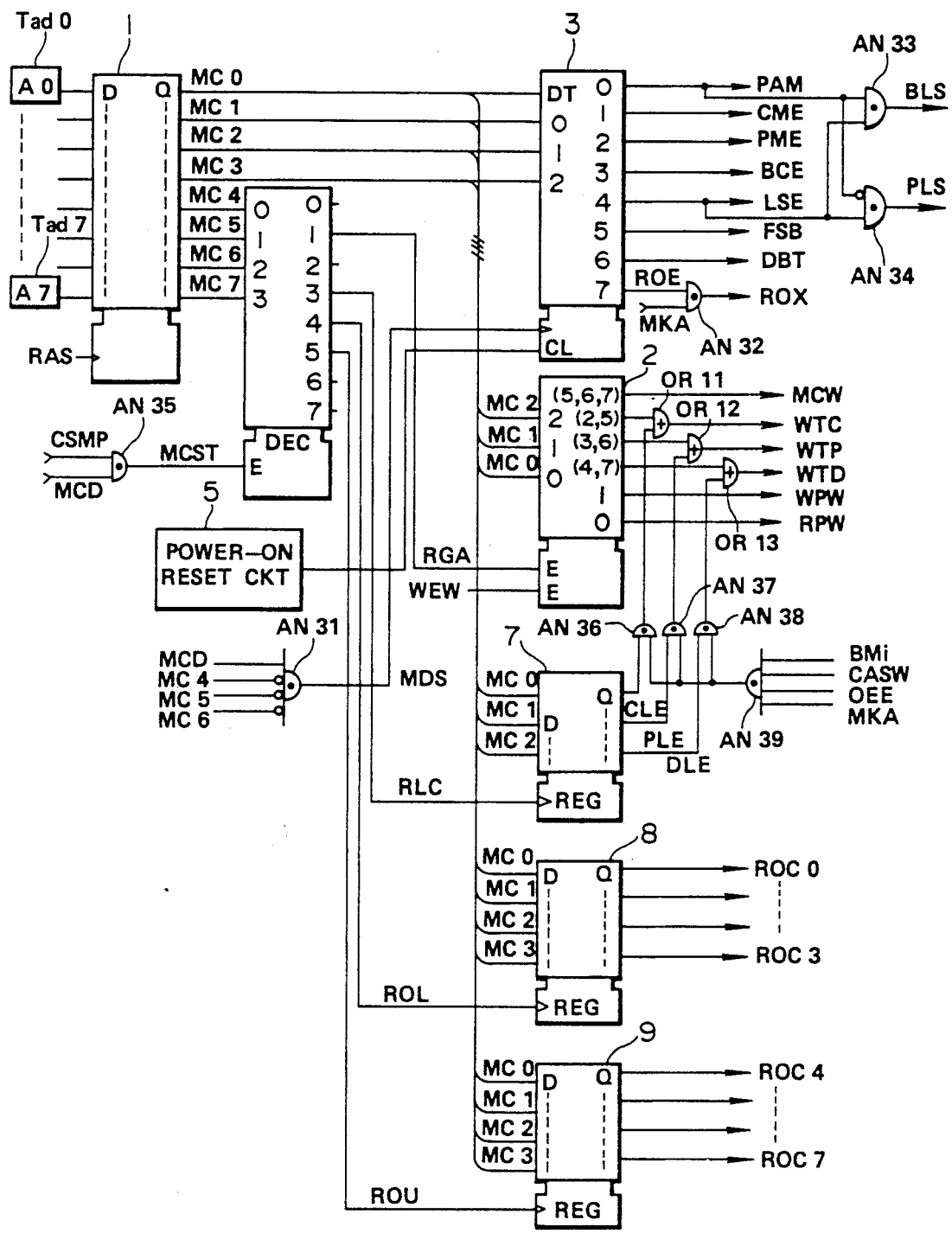
FIG. 5 is a circuit diagram showing an embodiment of a command control circuit within the memory unit.

Next, description will be given with respect to the command control circuit CC in conjunction with FIG. 5. In FIG. 5, address data input terminals Tad0 to Tad7 are connected to respective input terminals D of a command register 1. The command is selected by the command codes (function designating codes) of eight bits, and the command codes of eight bits are inputted into the command register 1 via the address buses $A_0$ to $A_7$. At the leading edge timing of the row address strobe signal RAS, the command codes are latched in the command register 1 wherein the command codes are outputted therefrom as command data MC0 to MC7 of eight bits. The upper four bits of the command data constitute main command data, and lower four bits of the command data constitute sub-command data. The most significant bit MC7 of the command data is a so-called "don't care bit" as shown in FIG. 5. The relation between the values of the command data MC0 to MC7 and the corresponding command names will be shown in the following Tables 1 and 2 (shown in next pages). In the column of the lower data of the following Table 2, (MC1=1) and (MC2=1) mean that other bits are all "don't care bits", and (COEFFICIENT) mean that all of the lower data work as coefficient data (which will be described later).

TABLE 1

| COMMAND DATA | | |
|---|---|---|
| UPPER BITS | LOWER BITS | COMMAND NAME |
| 0 | 0 | WORD ACCESS MODE |
| | 1 | PIXEL ACCESS MODE (PAM) |
| | 2 | COMPARE DATA DISABLE |
| | 3 | COMPARE DATA ENABLE (CME) |
| | 4 | PLANE MASK DISABLE |
| | 5 | PLANE MASK ENABLE (PME) |
| | 6 | BIT/CHIP SELECT MASK DISABLE |
| | 7 | BIT/CHIP SELECT MASK ENABLE (BCE) |
| | 8 | LINE SELECT DISABLE |
| | 9 | LINE SELECT ENABLE (LSE) |
| | A | HALF PARALELL BUFFER |
| | B | FULL SERIAL BUFFER (FSB) |
| | C | DATA BUFFER OPEN DRAIN |
| | D | DATA BUFFER TRI-STATE (DBT) |
| | E | RASTER OPERATION DISABLE |
| | F | RASTER OPERATION ENABLE (ROE) |
| 1 | 0 | READ PLANE MASK (RPM) |
| | 1 | WRITE PLANE MASK (WPM) |
| | 2 | PLANE COMPARE REGISTER (PCR) |
| | 3 | PLANE PATTERN REGISTER (PPR) |
| | 4 | PLANE DESTINATION REGISTER (PDR) |
| | 5 | COMPARE REGISTER (CMP) |
| | 6 | PATTERN REGISTER (PTN) |
| | 7 | DESTINATION REGISTER (DST) |

TABLE 2

| COMMAND DATA | | |
|---|---|---|
| UPPER BITS | LOWER BITS | COMMAND NAME |
| 3 | (MC0 = 1) | COMPARE LOAD ENABLE (CLE) |
| | (MC1 = 1) | PATTERN LOAD ENABLE (PLE) |
| | (MC2 = 1) | DESTINATION LOAD ENABLE (DLE) |
| 4 | (COEFFICIENT) | RASTER OPERATION CODE (LOW) |
| 5 | (COEFFICIENT) | RASTER OPERATION CODE (HIGH) |

,0260
Next, in FIG. 5, the decoder 3 has eight D flip-flops therein in which respective eight signals PAM, CME, PME, BCE, LSE, FSB, DBT and ROE are outputted therefrom. Based on the input data of three bits, one of the eight D flip-flops is selected. In other words, the decoder 3 selects one D flip-flop corresponding to the input address data of three bits. Hence, the bit data MC0 is supplied to the data terminal DT of the decoder 3, and this bit data MC0 is supplied to and stored in the selected D flip-flop at a (from the timing control circuit TC) and the data MCD, MC4, MC5 and MC6 and an output signal MDS thereof rises. More specifically, the decoder 3 selects one of signals PAM, CME, PME, BCE, LSE, FSB, DBT and ROE based on the value of the command data MC1 to MC3, and the value of the selected signal is changed into that of the command data MC0 (i.e., the value "0" or "1"). The clear terminal CL of the decoder 3 is supplied with a reset signal from a power-on reset circuit 5, so that all of eight D flip-flops within the decoder 3 are cleared at a power-on time. An AND gate AN32 outputs a signal ROX based on the logical product operation of a signal MKA and the output signal ROE of the decoder 3. In addition, an AND gate AN33 outputs a signal BLS based on the signals PAM and LSE from the decoder 3, similarly, an AND gate AN34 outputs a signal PLS based on the signals PAM and LSE.

The main command decoder 4 decodes the input data of three bits and outputs the "1" signal from the corresponding output terminal thereof. The main command decoder 4 is designed to output eight kinds of control signals from the 0-bit to 7-bit output terminals. In this case, however, signals RGA, RLH, ROL and ROU relate to the present invention. Hence, these signals are only shown in FIG. 5. This main command decoder 4 is subject to the enable state when the signal CSMP (from the pixel interface) and the signal MCD (from the timing control circuit TC) are supplied to an AND gate AN35 from which a signal MCST is supplied to a terminal E of the main command decoder 4.

The decoder 2 decodes the command data MC0 to MC2 and outputs signals MCW, WPW and RPW. In addition, the decoder 2 outputs signals WTC, WTP and WTD by use of OR gates OR11, OR12 and OR13. This decoder 2 is subject to the enable state when the value of the signal WEW (from the timing control circuit TC) becomes "1" and the value of the signal RGA from the main command decoder 4 becomes "1". When the value of the command data MC0 to MC2 (command value) is "0", the signal RPW becomes the "1" signal. Similarly, the signal WPW becomes the "1" signal when the command value is "1". In addition, the output signal WTD of the OR gate OR13 becomes the "1" signal when the command value is "4" or "7", the output signal WTP of the OR gate OR12 becomes the "1" signal when the command value is "3" or "6", and the output signal WTC of the OR gate OR11 becomes the "1" signal when the command value is "2" or "5". Furthermore, the signal MCW becomes the "1" signal when the command value is "5", "6" or "7".

The command data MC0, MC1 and MC2 are stored in a register 7 at the leading edge timing of the signal RLC from the main command decoder 4. Signals CLE, PLE and DLE are supplied to first input terminals of AND gates AN36, AN37 and AN38 as the stored command data MC1 and MC2. The second input terminals of the AND gates AN36, AN37 and AN38 are connected to the same output terminal of an AND gate AN39 which is supplied with signals CASW, OEE and MKA (from the timing control circuit TC shown in FIG. 4) and a signal BMi (from the bit interface shown in FIG. 7 which will be described later). The output signals from the AND gates AN36, AN37 and AN38 are supplied to the respective input terminals of the OR gates OR11, OR12 and OR13, whereby the values of the output signals WTC, WTP and WTD of the OR gates OR11, OR12 and OR13 are controlled.

The command data MC0 to MC3 are supplied to both of registers 8 and 9. The register 8 stores the command data at the leading edge timing of the signal ROL from the main command decoder 4, and the register 8 outputs signals ROC0 to ROC3 as the stored command data MC0 to MC3. Similarly, the register 9 stores the command data at the leading edge timing of the signal ROU from the main command decoder 4, and the register 9 outputs signals ROC4 to ROC7 as the stored command data MC0 to MC3. Based on the signals ROC0 to ROC3 and ROC4 to ROC7, coefficients in logical operations (which will be described later) are determined.

[C] MEMORY BLOCK MB0

Figure 6:
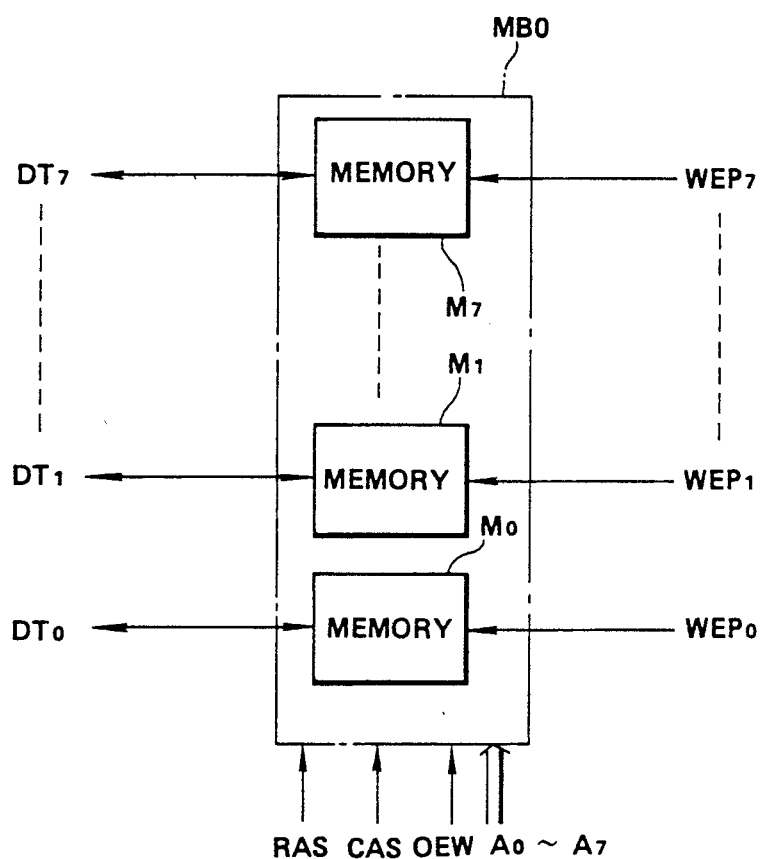
FIG. 6 is a block diagram showing an embodiment of a memory block within the memory unit.

FIG. 6 is a block diagram showing the constitution of the memory block MB0. In FIG. 6, the memories $M_0$ to $M_7$ store the row addresses outputted on the address buses A0 to A7 at the leading edge timing of the row address strobe signal RAS, and the memories $M_0$ to $M_7$ store the column addresses outputted on the address buses A0 to A7 at the leading edge timing of the column address strobe signal CAS. Hence, the access address is defined. In read cycles, the data are read out from the memories $M_0$ to $M_7$ when the output enable signal OEW rises after the access address is defined. In write cycles, the memory block MB0 selects some of memories $M_0$ to $M_7$ the signals $WEP_0$ to $WEP_7$ of which become the high levels when or after the access address is defined, and the data are written into the selected memories only.

[D] BIT INTERFACE $BTI_i$

Figure 7:
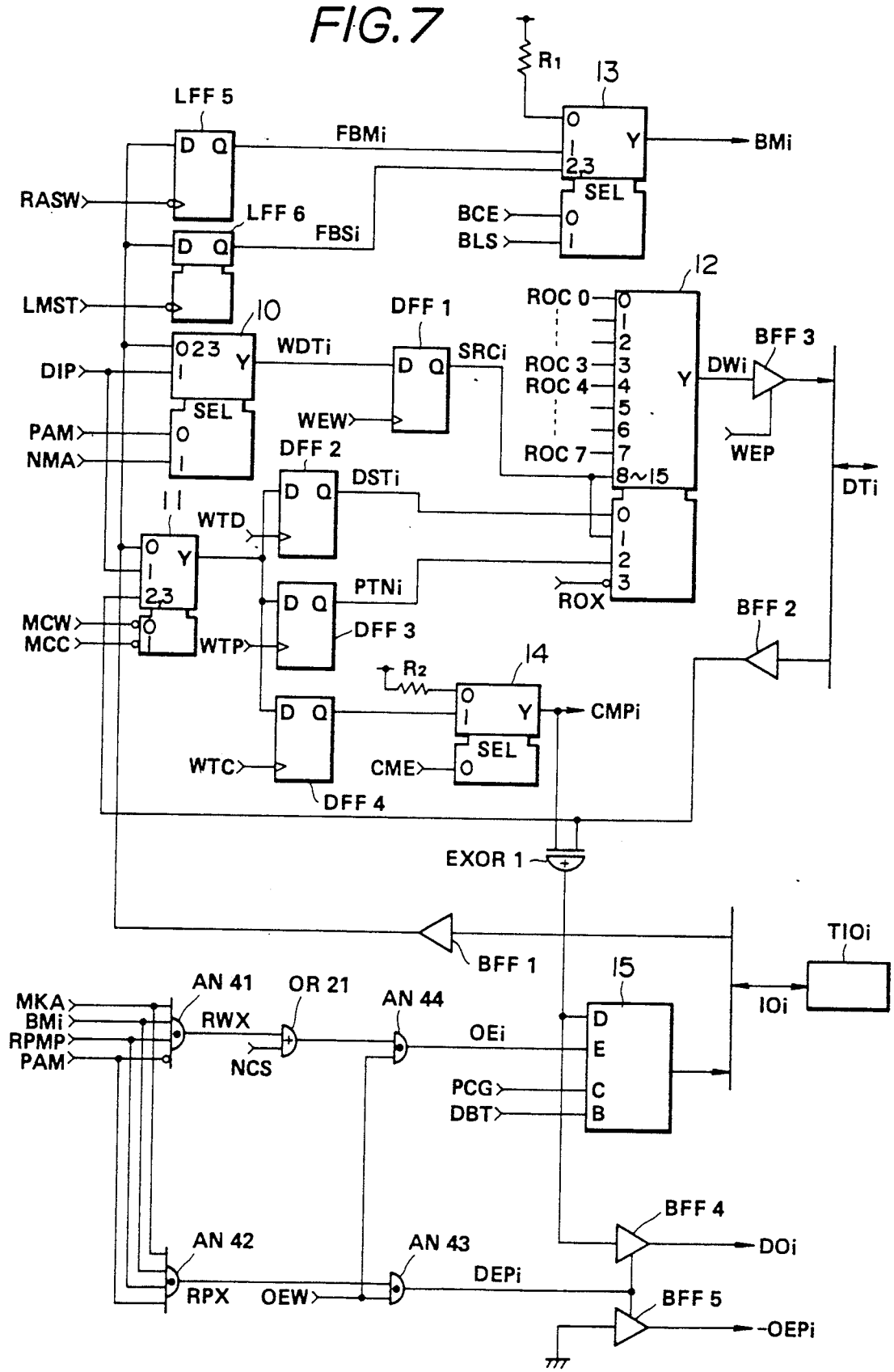
FIG. 7 is a circuit diagram showing an embodiment of a bit interface within the memory unit.

FIG. 7 is a block diagram showing the constitution of the bit interface $BTI_i$ (hereinafter, i denotes an integral number within 0 to 7). In FIG. 7, $TIO_i$ designates a data input/output terminal.

The data inputted into the data input/output terminal $TIO_i$ is supplied to 0-bit, 2-bit and 3-bit input terminals of a selector 10, a 0-bit input terminal of a selector 11 and input terminals D of L flip-flops LFF5 and LFF6 respectively via a data bus $IO_i$ and a buffer BFF1 in series. In the case where a value of a signal NMA is "0" and a value of a signal PAM is "1", the selector 10 selects an 1-bit input terminal, and data DIP of the pixel direction supplied from the pixel interface PXI-0 (shown in FIG. 8) is outputted from the output terminal Y of the selector 10. In the cases other than the above-mentioned case, the selector 10 selects the 0-bit, 2-bit and 3-bit input terminal of the selector 10, and data supplied to the data bus $IO_i$ are outputted from the Y output terminal of the selector 10. The selector 10 outputs an output signal $WDT_i$ to an input terminal D of a D flip-flop DFF1 wherein the signal $WDT_i$ is stored therein at the leading edge timing of the signal WEW supplied from the timing control circuit TC (shown in FIG. 4). The D flip-flop DFF1 outputs an output signal $SCR_i$ to 8-bit to 15-bit input terminals and a 1-bit select terminal of a selector 12. In addition, 1-bit to 7-bit input terminals of the selector 12 are supplied with respective signals ROC0 to ROC7 from the command control circuit CC. In the case where the data having the decimal value of "8" to "15" are supplied to 0-bit to 3-bit select terminals of the selector 12, data $DW_i$ are outputted from the output terminal Y of the selector 12 as the data $SCR_i$, and the data $DW_i$ are supplied to the corresponding memory $M_i$ (shown in FIG. 2) via a buffer BFF3 and a data bus $DT_i$ in series.

In this case, when the value of the signal ROX from the command control circuit CC is "0", the data having the decimal value larger than "8" are supplied to the select terminals of the selector 12. For this reason, in the case where the write-in operation is performed in the word direction, the data supplied to the input/output terminal $TIO_i$ are supplied to the memory $M_i$ via a first route; buffer BFF1, the selector 10, the D flip-flop DFF1, the selector 12 and the buffer BFF3. On the other hand, in the case where the write-in operation is performed in the pixel direction, the data DIP supplied to an input/output terminal $TIO_p$-0 of the pixel interface (shown in FIG. 8) are supplied to the corresponding memory $M_i$ via a second route; a buffer BFF10 (shown in FIG. 8), the selector 10, the D flip-flop DFF1, the selector 12 and the buffer BFF3.

As will be described later, the signal ROX becomes the "1" signal only when a logical operation mode is set. Hence, the data supplied to the input/output terminal $TIO_i$ are supplied to the memory $M_i$ via the above first route in the modes other than the logical operation mode. Meanwhile, the buffer BFF3 is subject to the enable state when the value of the signal WEP from the timing control circuit TC is equal to "1".

The L flip-flop LFF5 stores the data inputted into the input terminal D thereof at the leading edge timing of the signal RASW which is supplied from the timing control circuit TC. The L flip-flop LFF6 outputs an output signal $FBM_i$ to a 1-bit input terminal of a selector 13.

The L flip-flop LFF6 stores the data inputted into the input terminal D thereof when the signal LMST from the timing control circuit TC rises, and the flip-flop LFF6 outputs the output signal $FBS_i$ to 2-bit and 3-bit input terminals of the selector 13.

The 0-bit input terminal of the selector 13 is supplied with the positive voltage via a pull-up resistor $R_1$. When both of the values of signals BCE and BLS from the command control circuit CC are equal to "0", the selector 13 selects the 0-bit input terminal thereof. When the value of signal BCE is "1" and the value of signal BLS is "0", the selector 13 selects the 1-bit input terminal thereof. Furthermore, when the value of signal BLS is "1" and the value of signal BCE is "0" or "1", the selector 13 selects the 2-bit and 3-bit input terminal thereof. The selector 13 outputs bit mask data $BM_i$ to the timing control circuit TC as the selected input signal thereof.

The selector 11 selects one of 0-bit to 3-bit input terminals based on the values of the signal MCW (from the command control circuit CC) and the signal MCC (from the timing control circuit TC) which are supplied respectively to 0-bit and 1-bit select terminals. In addition, the 0-bit input terminal of the selector 11 is supplied with the data (word data) from the input/output terminal $TIO_i$ via the buffer BFF1, the 1-bit input terminal thereof is supplied with the pixel data DIP from the pixel interface PXI-0 (or one of the pixel interfaces PXI-1 to PXI-3), and the 2-bit and 3-bit input terminals thereof is supplied with the data read out from the memory $M_i$ via the data bus $DT_i$ and the buffer BFF2 in series. The output terminal Y of the selector 11 is connected to input terminals D of D flip-flops DFF2 to DFF4. The D flip-flop DFF2 is stored the input data at the leading edge timing of the signal WTD, and the flip-flop DFF2 outputs data $DST_i$ as the stored input data. Similarly, the D flip-flop DFF3 stores the input data at the leading edge timing of the signal WTP, and the flip-flop DFF3 outputs data $PTN_i$ as the stored input data.

The signal $DST_i$ is supplied to the 0-bit select terminal of the selector 12, and the signal $PTN_i$ is supplied to the 2-bit select terminal of the selector 12.

The D flip-flop DFF4 stores the input data when the signal WTC from the command control circuit CC rises, and the D flip-flop DFF4 outputs the stored data from the Q terminal thereof to the 1-bit input terminal of the selector 14. The 0-bit input terminal of the selector 14 is supplied with a positive voltage via a pull-up resistor $R_2$, and the signal CME from the command control circuit CC is supplied to the 0-bit select terminal of the selector 14. Based on the value of the signal CME, the selector 14 outputs the signal $CMP_i$ from the output terminal Y thereof as the input data.

The data read out from the memory $M_i$ are supplied to one input terminal of the exclusive OR circuit EXOR1 via the data bus $DT_i$ and the buffer BFF2, and the signal $CMP_i$ is supplied to another input terminal of the exclusive OR circuit EXOR1. The output signal of the exclusive OR circuit EXOR1 is supplied to the input terminal D of the output data buffer 15 and the buffer BFF4 respectively.

AND gates AN41 and AN42 generate respective signals RWX and RPX based on the signal $BM_i$, the signal MKA (from the timing control circuit TC), the signal RPMP (from the pixel interface) and the signal PAM (from the command control circuit CC). AN AND gate AN43 outputs a signal $DEP_i$ based on the logical product of the signal RPX and the signal OEW (from the timing control circuit TC). AN AND gate AN44 generates a signal $OE_i$ based on the logical product of the output signal of the OR gate OR21 and the signal OEW.

The output signal $OE_i$ of the AND gate AN44 is supplied to the input terminal E of the output data buffer 15, and the signal PCG (from the timing control circuit TC) and the signal DBT (from the command control circuit CC) are supplied to respective input terminals C and B of the output data buffer 15. Hence, the output data buffer 15 outputs the data inputted into the input terminal D thereof to the data input/output terminal $TIO_i$ via the data bus $IO_i$ while the output signal $OE_i$ from the AND gate AN44 is the "1" signal. The input terminal of the buffer BFF5 is grounded. These buffers BFF4 and BFF5 are subject to the enable states while the signal $DEP_i$ from the AND gate AN43 is the "1" signal. In this enable states, the buffers BFF4 and BFF5 output respective output signals $DO_i$ and $-OEP_i$ to the pixel interface PXI-0. The above-mentioned output data buffer 15 and the buffers BFF4 and BFF5 have open-drain output terminals.

The eight D flip-flops DFF1 within the bit interfaces BTI0 to BTI7 constitute a source register. Similarly, the eight D flip-flops DFF2 constitute a destination register, the eight D flip-flops DFF3 constitute a pattern register and the eight L flip-flops LFF4 constitute a bit mask register. Therefore, each of memory units #0M to #3M is provided with the source register, the destination register, the pattern register and the bit mask register.

[E] PIXEL INTERFACE

Figure 8:
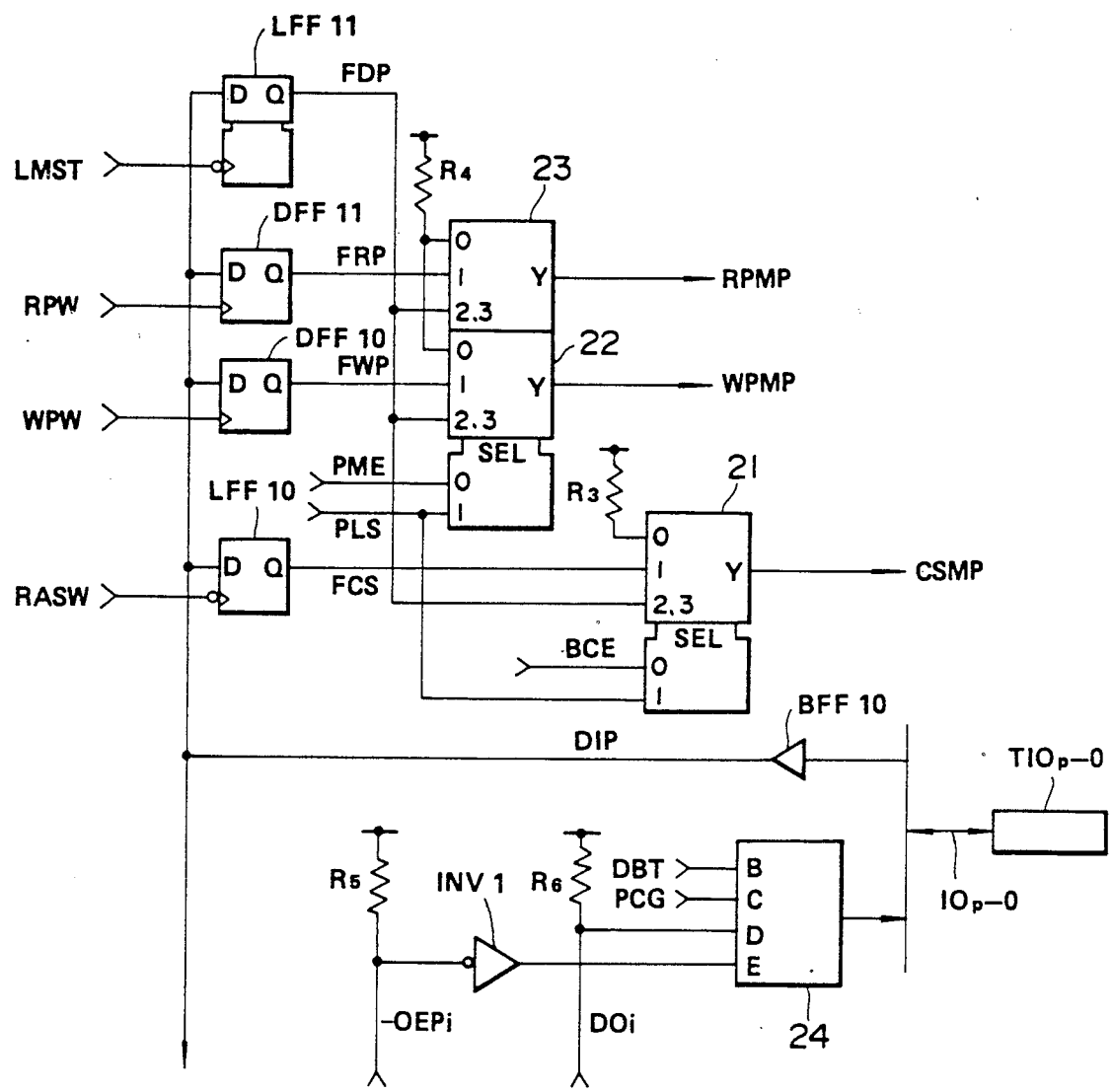
FIG. 8 is a circuit diagram showing an embodiment of a pixel interface within the memory unit.

FIG. 8 is a block diagram showing an embodiment of the pixel interface PXI-0. In FIG. 8, $TIO_p$-0 designates a pixel data input/output terminal and the data inputted therein pass through a buffer BFF10 and become the data DIP. The data DIP is supplied to input terminals D of L-type flip-flops LFF10, LFF11, and D flip-flops DFF10 and DFF11, and this data DIP is also supplied to the selector 10 of the bit interface $BTI_i$ (shown in FIG. 7). The input data are stored in the L flip-flop LFF10 when the signal RASW from the timing control circuit TC rises. Similarly, the input data are stored in the D flip-flops DFF10 and DFF11 when the respective signals WPW and RPW from the command control circuit CC rise. In addition, the input data are stored in the L flip-flop LFF11 when the signal LMST from the command control circuit CC rises. The flip-flop LFF10 outputs a signal FCS to a 1-bit input terminal of a selector 21. Similarly, the D flip-flops DFF10 and DFF11 output respective signals FWP and FRP to respective 1-bit input terminals of selectors 22 and 23. The 0-bit input terminal of the selector 21 is supplied with a positive voltage via a pull-up resister R3. Similarly, the 0-bit input terminals of the selectors 22 and 23 are supplied with the same positive voltage via a pull-up resistor R4. The selector 21 selects the 0-bit input terminal thereof when both of the values of the signals BCE and PLS (from the command control circuit CC) become "0". In addition, the selector 21 selects the 1-bit input terminal thereof when the value of the signal BCE becomes "1" and the value of the signal PLS becomes "0". Furthermore, the selector 21 selects the 2-bit and 3-bit input terminals when the value of the signal PLS becomes "1" and the value of the signal BCE becomes "0" or "1". Thus, the selector 21 outputs the signal CSMP corresponding to the input signal of the input terminal selected based on the values of the signals BCE and PLS. Similarly, the selectors 22 and 23 select the respective 0-bit input terminals when both of the values of the signals PME and PLS (from the command control circuit CC) becomes "0". In addition, the selectors 22 and 23 select the respective 1-bit input terminals thereof when the value of the signals PME becomes "1" and the value of the signal PLS becomes "0". Furthermore, the selectors 22 and 23 select the respective 2-bit and 3-bit input terminals when the value of the signal PLS becomes "1" and the value of the signal PME becomes "0" or "1". Thus, the selectors 22 and 23 output the respective signals WPMP and RPMP corresponding to the respective input signals of the input terminals selected based on the values of the signals PME and PLS. Actually, the selectors 22 and 23 are constituted as one selector, however, the selectors 22 and 23 are shown as respective two selectors for convenience's sake.

The signal $-OEP_i$ (i.e., $-OEP_0$ to $-OEP_7$) from the bit interface $BTI_i$ (i.e., $BTI_0$ to $BTI_7$) is supplied to the enable terminal E of the pixel output data buffer 24 via the inverter INV1. A positive voltage is supplied to the input terminal of the inverter INV1 via a pull-up resistor R5. The data terminal D of the pixel output data buffer 24 is supplied with a positive voltage via a pull-up resistor R6 and data $DO_i$ (i.e., $D0_0$ to $DO_7$) from the bit interface $BTI_i$ ($BTI_0$ to $BTI_7$). In addition, the respective signals DBT and PCG are supplied to the terminals B and C of the pixel output data buffer 24. Hence, when the "1" signal is supplied to the enable terminal E of the pixel output data buffer 24, the signal supplied to the data terminal D of the pixel output data buffer 24 is outputted to the pixel data input/output terminal $TIO_p$-0 via the data bus $IO_p$-0.

[F] OUTPUT DATA BUFFER

Figure 9:
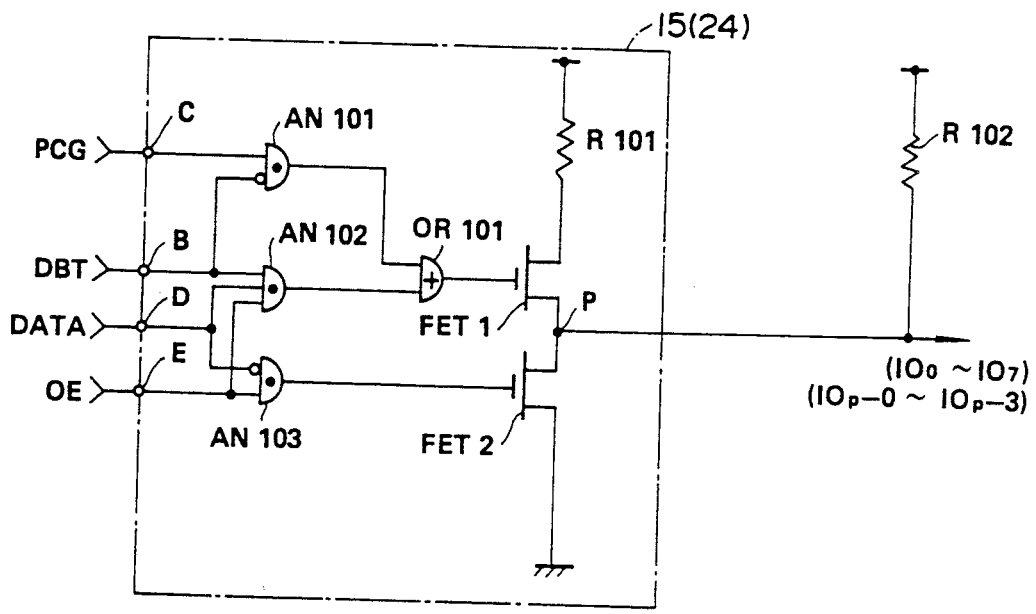
FIG. 9 is a circuit diagram showing an embodiment of an output data buffer within the bit interface and the pixel interface.

Next, description will be given with respect to the output data buffers 15 and 24 which are provided respectively in the bit interfaces $BTI_0$ to $BTI_7$ and the pixel interfaces PXI-0 to PXI-3. FIG. 9 is a block diagram showing an embodiment of the output data buffer, and a block surrounded by a dashed line represents the output data buffer 15 and 24. As shown in FIG. 9, the output data buffer is constituted by AND gates AN101, AN102, AN103, an OR gate OR101, field effect transistors FET1 and FET2 and a load resistor R101. The signal DATA read from the memories $M_0$ to $M_7$ is inputted into a data terminal D of the output data buffer wherein the signal DATA is outputted to the data buses $IO_0$ to $IO_7$ or data buses $IO_p$-0 to $IO_p$-3.

One input terminal of the AND gate AN101 shown in FIG. 9 is set as a positive logical terminal and another input terminal thereof is set as a negative logical terminal. Actually, the signal PCG is supplied to the positive input terminal of the AND gate AN101 and the signal DBT is supplied to the negative input terminal thereof. The AND gate AN102 has three input terminals (all of them are set as the positive logical terminals) which are supplied with the signals DBT, DATA (representative of the signal $DO_i$) and OE (representative of the signals $OE_i$ and $OEP_i$). The AND gate AN103 has a negative logical terminal supplied with the signal DATA and a positive logical terminal supplied with the signal OE. The output signals of the AND gates AN101 and AN102 are supplied to the OR gate OR101, and the output signal of the OR gate is supplied to the gate of the field effect transistor FET1. The output signal of the AND gate AN103 is supplied to the gate of the field effect transistor FET2. The drain of the transistor FET1 is supplied with a positive voltage via the resistor R101 and the source thereof is connected to the drain of the transistor FET2 at a connection point P. In addition, this connection point P is connected to the data bus $IO_i$ (where i denotes 0 to 7) or the data buses $IO_p$-0 to $IO_p$-3. Further, the source of the transistor FET2 is grounded. A resistor R102 is a pull-up resistor (an externally connected resistor), and the resistance of the resistor R102 is set larger than that of the resistor R101.

The signal PCG becomes the "1" signal when the data buses are precharged in a memory reading timing. On the contrary, the signal PCG becomes the "0" signal in the read data outputting timing and in the memory writing timing. On the other hand, the signal DBT becomes the "1" signal when the command "data buffer tri-state" is supplied to the timing command control circuit TCC. On the contrary, the signal DBT becomes the "0" signal when the command "data buffer open drain" is supplied to the timing command control circuit TCC. The command "data buffer tri-state" is outputted so that the output data buffer functions as the tri-state buffer, and the command "data buffer open drain" is outputted so that the output data buffer functions as the open drain buffer.

Next, description will be given with respect to the function of the signal DBT. When the signal DBT is the "1" signal, the signal DATA read from the memory is supplied to the gate of the field effect transistor FET1 via the AND gate AN102 and the OR gate OR101 in series in a timing when the output enable signal OE becomes the "1" signal. In addition, the signal DATA is inverted in the AND gate AN103, and inverted signal $\overline{DATA}$ is supplied to the gate of the field effect transistor FET2. As a result, the output signal at the connection point P becomes the "1" signal when the signal DATA is the "1" signal. Similarly, the output signal at the connection point P becomes the "1" signal when the signal DATA is the "1" signal. On the contrary, when the output enable signal OE becomes the "0" signal, both of the AND gates AN102 and AN103 are subject to the closed states and both of the transistors FET1 and FET2 are turned off. As a result, the connection point P is subject to a high impedance state. As described heretofore, the output data buffer works as the tristate buffer when the signal DBT becomes the "1" signal.

On the other hand, when the signal DBT is the "0" signal, the AND gate AN102 is turned off. In addition, the AND gate AN101 outputs the "1" signal only when the signal PCG becomes the "1" signal. Hence, the field effect transistor FET1 is always in the closed state in the read data outputting timing. The signal DATA (representative of the read data) is inverted in the AND gate AN103 in a timing when the output data enable signal OE becomes the "1" signal, and the inverted signal $\overline{DATA}$ is supplied to the gate of the field effect transistor FET2. As a result, the signal at the connection point P corresponds to the signal DATA. In this case, the output state of the output data buffer is identified as an open drain output state by the field effect transistor FET2 because the field effect transistor FET1 is turned off. As described heretofore, the output data buffer works as the open drain buffer when the signal DBT is the "0" signal.

#3 OPERATIONS OF THE EMBODIMENT

Next, description will be given with respect to operations of the embodiment, i.e., [I] BASIC OPERATION, [II] SELECT OPERATION, [III] COMPARE PROCESS, [IV] LOGICAL OPERATION PROCESS and [V] RECHARGE OPERATION FOR DATA BUS in turn.

[I] BASIC OPERATION

As described before, the present embodiment provides two kinds of operation modes in the memory read/write cycle, i.e., the normal mode and the mask mode. In addition, the present embodiment provides a command write-in cycle for writing commands other than above two modes. Hereinafter, description will be given with respect to the read cycle and write cycle in turn, and description will be given with respect to the normal mode, the mask mode and the command write-in mode in each cycle.

(A) READ CYCLE (1) Normal Mode

Figure 10:
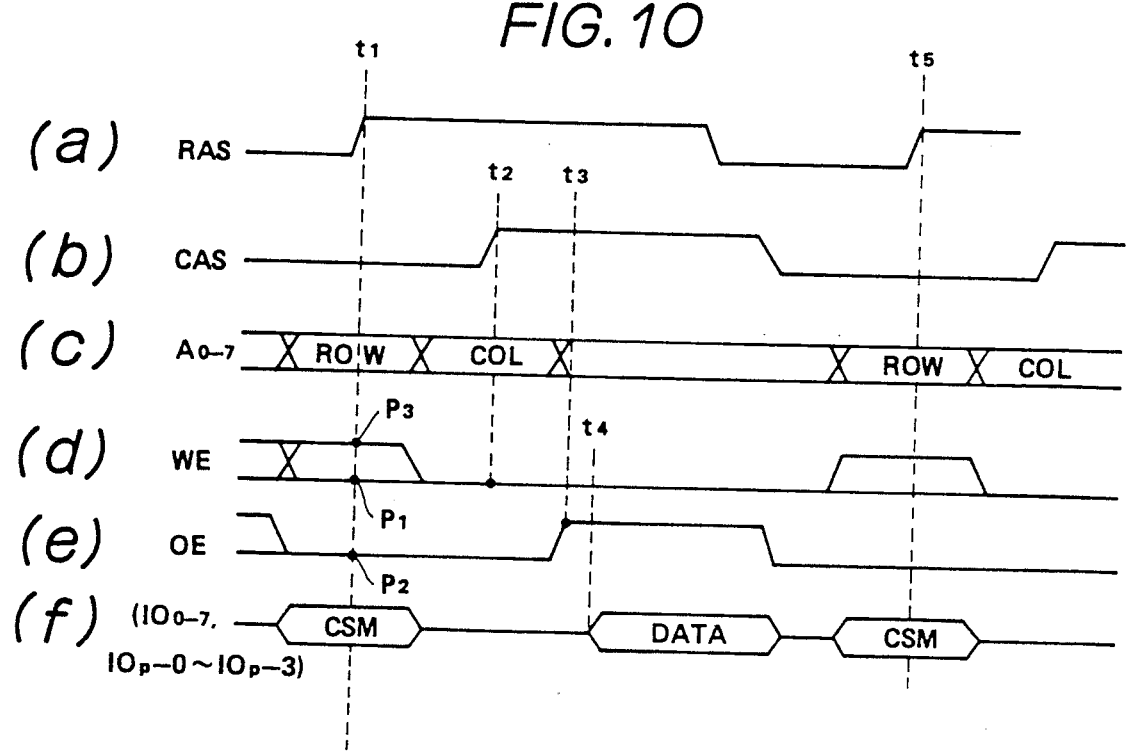
FIG. 10 is a timing chart showing a read cycle.

As shown in FIG. 10(a), at a time $t_1$ when the row address strobe signal RAS rises, the level of the column address strobe signal CAS is equal to the "0" level, and both levels of the write enable signal WE and the output enable signal OE are equal to the "0" levels as shown by $P_1$ and $P_2$ in FIGS. 10(d) and 10(e). At the time $t_1$, the normal mode is selected. More specifically, while the above-mentioned condition is obtained, the output signal NME of the AND gate AN1 (shown in FIG. 4) becomes the "1" signal so that the normal mode is selected. Hence, when the row address strobe signal RAS (i.e., the signal RASW) rises, the signal NME is stored in the L flip-flop LFF2 wherein the level of the signal NME is kept at the "1" level, whereby the normal mode is defined.

Next, the column address strobe signal CAS rises at a time $t_2$. When the level of the write enable signal WE is the "0" level at the time $t_2$, a read cycle operation will be started. In addition, the column address is defined at the time $t_2$. As a result, the addresses to be given with access is defined. Hence, the access is performed on the same address of the memory blocks MB0 to MB3 within the memory units #0M to #3M at the same time, whereby the data at that address are read out. As shown in FIG. 7, the read data are supplied to the data terminal D of the output data buffer 15 via the data bus $DT_i$, the buffer BFF2 and the exclusive OR circuit EXOR1 in series. The read data are outputted to the data bus $IO_i$ at a timing when the output data buffer 15 is subject to the enable state.

The timing when the output data buffer 15 is subject to the enable state is identical to the timing when the signal OEW becomes the "1" signal if the OR gate OR21 outputs the "1" signal. Apparent from FIG. 4, when the output enable signal OE becomes the "1" signal in a state where both of the column address strobe signal CAS and the signal RASW are the "1" signals, the signal OEW becomes the "1" signal. More specifically, at a time $t_3$ (shown in FIG. 10) when the output enable signal OE becomes the "1" signal, the above-mentioned conditions are satisfied and the output signal of the AND gate AN44 becomes the "1" signal so that the output data buffer 15 is subject to the enable state. In this case, the data are outputted at the timing shown in FIG. 10(f).

Next, description will be given with respect to the condition where the OR gate OR21 outputs the "1" signal. The OR gate OR21 outputs the "1" signal in a condition where either one of the signals RWX and NCS becomes the "1" signal. Apparent from FIG. 4, the levels of the signals MME and MKA are not equal to the "1" level in the normal mode, hence, the output signal RWX of the AND gate AN41 must not become the "1" signal in the normal mode. Therefore, the level of the output signal of the OR gate OR21 is determined by the value of the signal NCS.

Next, description will be given with respect to the signal NCS. The time $t_1$ when the row address strobe signal RAS rises is identical to the input timing when the chip select data of four bits are supplied from the input/output terminals $TIO_p$-0 to $TIO_p$-3. The supplied chip select data are stored in the L flip-flop LFF10 (shown in FIG. 8) within the pixel interfaces PXI-0 to PXI-3 at a leading edge timing of the signal RASW. For instance, when the 0-bit signal of the chip select data from the input/output terminal $TIO_p$-0 is supplied to the respective input terminals of the L flip-flops LFF10, D flip-flop DFF10 and the D flip-flop DFF11 via the buffer BFF10. In this case, the signal RASW rises at the time $t_1$, however, the signals RPW and WPW are not outputted as described later. Hence, the chip select data are stored only in the L flip-flop LFF10, and the chip select data are not stored in the D flip-flops DFF10 and DFF11. Thus, the value of the signal FCS varies to "1" or "0" in accordance with the chip select data. Hence, the "1" or "0" signal is supplied to the 1-bit input terminal of the selector 21. In this case, when the value of the signal BCE is "0", the value of the output signal CSMP of the selector 21 is always equal to "1", regardless of the value of the signal FCS (i.e., the value of the chip select data). Further, when the value of the signal BCE is equal to "1", the value of the signal CSMP is identical to the value of the chip select data. This signal CSMP is supplied to one input terminal of the AND gate AN5 (shown in FIG. 4) wherein a logical product of the signal CSMP and the signal NMA having the "1" level is obtained. As a result, the value of the output signal NCS (the logical product result) of the AND gate AN5 is determined in response to the value of the signal CSMP. Hence, if the signal BCE is the "1" signal, the value of the signal NCS is determined based on the value of the chip select signal. The signal NCS is supplied to one input terminal of the OR gate OR21 (shown in FIG. 7) wherein the output signal value thereof is determined based on the value of the signal NCS.

Figure 11:
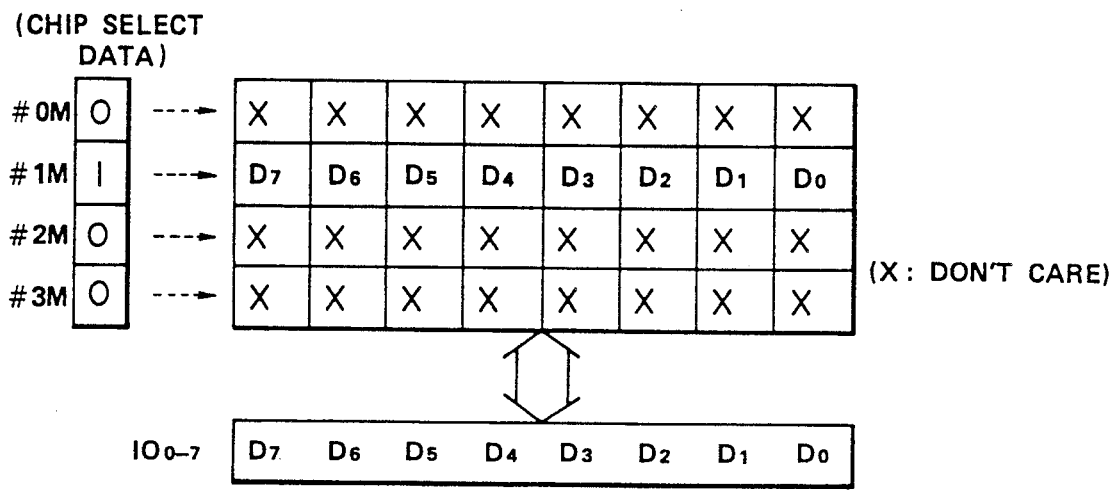
FIG. 11 is a drawing showing a data input and output state in memory units in a normal mode.

As is apparent from the above description, when the value of the signal BCE supplied to the selector 21 (shown in FIG. 8) is equal to "1", the output data buffer 15 corresponds to the value of the chip select data. Hence, the output data buffer 15 is subject to the enable state when the value of the chip select data is "1". More specifically, the memory unit supplied with the chip select data the value of which is equal to "1" is selected from the memory units #0M to #3M, and the read data are outputted from the selected memory unit. For instance, in the case where the value of the chip select data supplied to the memory unit #1M is only equal to "1" as shown in FIG. 11, data $D_0$ to $D_7$ of eight bits are outputted only from the memory unit #1M. In FIG. 11, "X" designates the "don't care bit". In other words, "X" represents that the output terminal of the output data buffer 15 within the memory unit from which the data are not outputted is subject to the high impedance state. In the case where the chip select data for more than two memory units are equal to "1", the data are simultaneously outputted from these memory units and simultaneously supplied to the common data buses $IO_0$ to $IO_7$ (shown in FIG. 3). In this case, the value "0" is superior than other value at each bit of the data outputted on the above common data buses because each output data buffer 15 within each memory unit is subject to the open drain output state. (In this case, however, data are read out from either one of the memory units in general.)

As is apparent from FIG. 11, either one of the memory blocks is selected and parallel data of eight bits are independently read out from the selected memory block in the read-out operation at the normal mode. Hence, the present invention is preferable to the case where the storage areas within the memory blocks MB0 to MB3 are used as program areas.

On the other hand, when the signal BCE supplied to the selector 21 (shown in FIG. 8) is the "0" signal, the chip select function does not work.

Next, description will be given with respect to the signal BCE. The signal BCE becomes the "1" signal when the command "bit/chip select mask enable" (shown in Table 1) is supplied to the memory units. The command write-in operation in this case will be described as follows.

Firstly, if the levels of the column address strobe signal CAS and the write enable signal WE are equal to the "1" level at a time $t_{10}$ (shown in FIG. 12) when the row address strobe signal RAS rises, the command write-in mode is selected. More specifically, when both levels of the column address strobe signal CAS and the write enable signal WE are equal to the "1" level, the output signal MCE of the AND gate AN3 (shown in FIG. 4) becomes the "1" signal and this signal MCE is stored in the L flip-flop LFF4 at the leading edge timing of the signal RAS. Hence, after the time $t_{10}$, the output signal MCC of the L flip-flop LFF4 becomes the "1" signal, whereby the command write-in cycle is started. In addition, the output signal MCD of the AND gate AN9 becomes the "1" signal while both levels of the row address strobe signal RAS and the signal RASD are equal to the "1" level. More specifically, the signal MCD starts to rise at a timing delayed from the leading edge timing of the row address strobe signal RAS.

On the other hand, the command "bit/chip select mask enable" is supplied to the command register 1 (shown in FIG. 5) via the address bus A0 to A7 and stored in the command register 1 at the leading edge timing of the row address strobe signal RAS. As shown in Table 1, the command "bit/chip select mask enable" has a code the hexadecimal digit of which is described as (07). Hence, the command register 1 outputs the signals MC0 to MC2 having the same "1" level and outputs the signals MC3 to MC7 having the same "0" level. For this reason, the 0-bit and 1-bit input terminals of the decoder 3 are supplied with the "1" signals. Thus, the decoder 3 is subject to a state where the signal BCE corresponding to the decoded result "3" of the input signals thereof can become the "1" signal. In this case, the decoder 3 set the level of the signal BCE to "1" at the leading edge timing of the signal MDS supplied to the clock terminal thereof. Since the signal MDS rises at a timing delayed from the leading edge timing of the signal RAS, the signal BCE becomes the "1" signal at a timing delayed from the time $t_{10}$ shown in FIG. 12. As is apparent from the above description, the level of the signal BCE is set to the "0" level so as to work the present memory device as the general purpose memory device. On the contrary, the level of the signal BCE is set to the "1" signal so as to perform the bit/chip select mask operation.

Above is the description explaining the process where the signal BCE becomes the "1" signal. Generally, the write-in operation of the command "bit/chip select mask enable" must be performed before the access for the normal mode is performed. In the normal mode operation, the chip select data is set effective to the memory units #0M to #3M. More specifically, the chip select data are inputted via the input/output terminals $IO_p$-0 to $IO_p$-3 so that either one of (or more than two of) the memory units #0M to #3M are selected at the time $t_1$ (shown in FIG. 10(f)) in the normal mode access timing. Thereafter, data other than those of the selected memory units are masked at the data reading out timing (i.e., at the time $t_4$). Similarly, the chip select data for selecting preferable memory units are inputted via the input/output terminal $IO_p$-0 to $IO_p$-3. Thus, it is possible to select preferable memory units within the memory read cycle prior to the access operation. As a result, it is actually possible to perform the chip select operation with an extremely high speed.

Above is the description of the normal mode operation in the read cycle.

(2) Mask Mode

Next, description will be given with respect to the mask mode operation in the read cycle. The condition of the signals for setting the mask mode is almost identical to that for setting the normal mode described before except that the level of the write enable signal WE is equal to the "1" level at the leading edge timing of the row address strobe signal RAS. More specifically, the condition for setting the mask mode is identical to the condition where both levels of the column address strobe signal CAS and the output enable signal OE are equal to the "0" level and the level of the write enable signal WE is equal to the "1" level as shown in FIG. 10(d) at the time $t_1$ when the row address strobe signal RAS rises.

If the above-mentioned condition is satisfied, the output signal MME of the AND gate AN2 (shown in FIG. 4) becomes the "1" signal and the signal MME is stored in the L flip-flop LFF3 at the leading edge timing of the row address strobe signal RAS. Thereafter, the level of the output signal MKA of the L flip-flop LFF3 is maintained at the "1" level and the mask mode is defined. Next, the column address is stored and the address to be given with access is defined at a time $t_2$ when the column address strobe signal CAS rises. Thereafter, at the time $t_4$ when the predetermined time is passed after the access address is defined, data within the corresponding addresses are outputted under a condition where the write enable signal WE is the "0" signal and the output enable signal OE is the "1" signal. Such data are selectively masked by each bit and by each memory unit.

Figure 13:
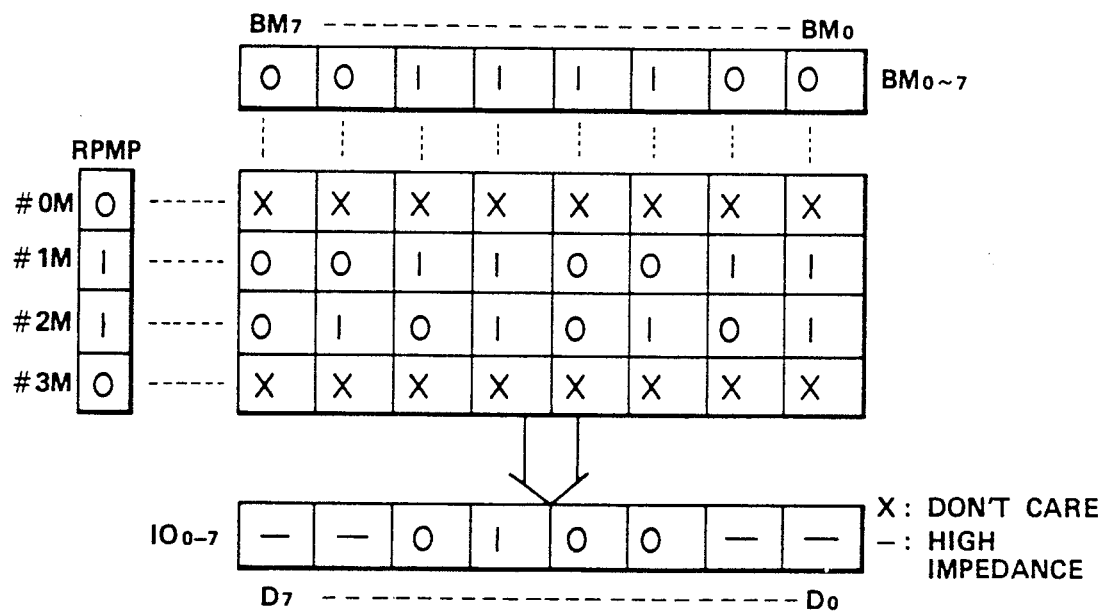
FIGS. 13 and 14 are drawings showing data output states in masked states of read cycles.

Next, description will be given with respect to the data output state when the mask operation is performed. FIG. 13 shows the mask state in the case where by read-out operation is performed in the word direction, and $BM_0$ to $BM_7$ and RPMP represent the values of signals shown in FIGS. 7 and 8. FIG. 13 designates a case where the levels of the signals RPMP within the memory units #0M and #3M are equal to "0" and the levels of the signals RPMP within the memory units #1M and #2M are equal to "1" and the signals $BM_7$ to $BM_0$ are described as eight-bit data of (00111100). The signals $BM_0$ to $BM_7$ within the memory units #0M to #3M have the same value, which will be described later.

When the signals $BM_0$ to $BM_7$ and the signals RPMP within the memory units #0M to #3M are set as shown in FIG. 13, 7-bit, 6-bit, 1-bit and 0-bit of the common data bus $IO_0$ to $IO_7$ are subject to the high impedance states (shown by "—") and 5-bit, 4-bit, 3-bit and 2-bit of the common data bus $IO_0$ to $IO_7$ are described as (0100). More specifically, the data within the memory units each of which has the signal RPMP having the "1" level are selected first, and then the data within the selected data each bit of which corresponds to the signal $BM_i$ having the "1" level is selected. Such data are subject to the output permitting state. In FIG. 13, four-bit data of (1100) within the memory unit #1M and four-bit data of (0101) within the memory unit #2M are both subject to the output permitting state. Further, when more than two data are permitted to be outputted to the data bus $IO_i$, the "0" signal is superior than the "1" signal at each bit of the data. Therefore, the data of (—0100—) are outputted to the data bus $IO_i$. Above is the description for explaining the data output state after the mask process in the case where the read-out operation is performed in the word direction.

Figure 14:
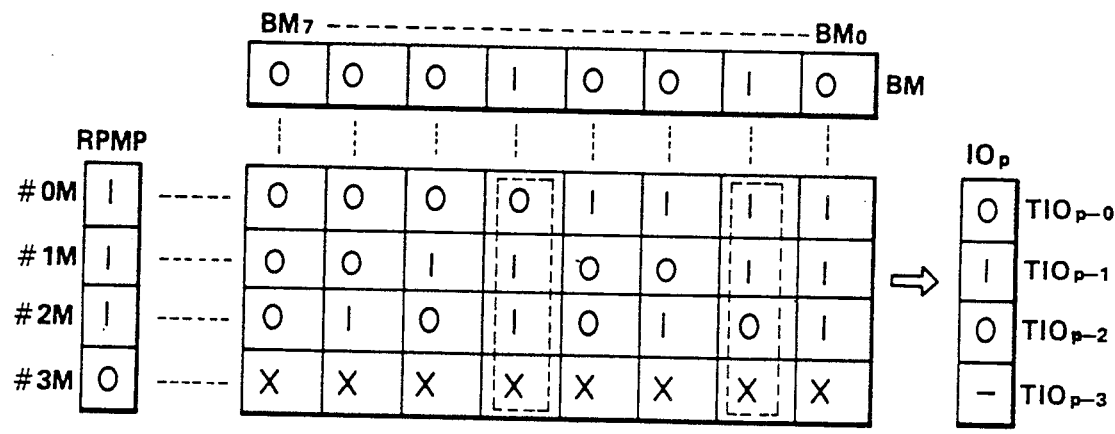

FIG. 14 shows the mask state in the case where the read-out operation is performed in the pixel direction. Same symbols are used in FIGS. 13 and 14. Similar to FIG. 13, the data within the memory units each of which has the signal RPMP having the "1" level are selected first, and then data within the selected data each bit of which corresponds to the signal $BM_i$ having the "1" level are selected. Such data are subject to the output permitting state. In FIG. 14, four-bit data of (011X) and (110X) surrounded by dotted lines are subject to the output permitting state. As described before, when two data are permitted to be outputted to the data bus $IO_p$, the "0" signal is superior than the "1" signal at each bit of the data. As a result, the data (010-) are outputted to the bit input terminals $TIO_p$-0 to $TIO_p$-3.

Hereinafter, description will be given with respect to the processes for setting the values of the signals $BM_i$ and RPMP plus the read operation after such processes.

(i) PROCESS FOR SETTING BIT MASK

In the bit mask, the bit mask data (of eight bits) are supplied to each of the memory units #0M to #3M via the common data bus $IO_0$ to $IO_7$ at the time $t_1$ shown in FIG. 10(f). The bit mask data are constituted such that bits to be masked are designated by "0" and bits not to be masked are designated by "1". The 1-bit of the bit mask data is supplied to the input terminal of the L flip-flop LFF5 (within each memory unit) via the data bus $IO_i$ and the buffer BFF1 shown in FIG. 7. The L flip-flop LFF5 stores the mask data supplied to the input terminal thereof at the leading edge timing of the signal RASW (i.e., at the leading edge timing of the signal RAS), and the L flip-flop LFF5 outputs the signal $FBM_i$ as the mask data to the 1-bit input terminal of the selector 13. In the case where the level of the signal BCE is set to "1" by the command write-in operation described before, the value of the output signal $BM_i$ of the selector 13 coincides with the value of the mask data and varies to "0" or "1". This signal $BM_i$ is supplied to the AND gates AN41 and AN42, whereby the signal $BM_i$ controls the ON/OFF operations of the enable signal $OE_i$ for the output data buffer 15 and the enable signal $OEP_i$ for the buffers BFF4 and BFF5. As is apparent from FIG. 4, the signal NCS is not outputted in the mask mode.

In the case where the output data buffer 15 is subject to the enable state, the data read from the memory $M_i$ (shown in FIG. 2) are supplied to the common data bus $IO_i$ for each memory unit via the buffer BFF2 and the output data buffer 15 (shown in FIG. 7) in series. When the buffers BFF4 and BFF5 are subject to the enable state, the data read from the memory $M_i$ are passed through the buffer BFF2, the exclusive OR circuit EXOR1 and the buffer BFF4 in series and supplied to the input terminal D of the pixel output data buffer 24 shown in FIG. 8. In addition, the level of the output signal of the inverter INV1 turns to "1" so that the pixel output data buffer 24 is subject to the enable state. As a result, the data read from the memory $M_i$ are supplied to the input/output terminal $TIO_p$-0 (or the input/output terminals $TIO_p$-1 to $TIO_p$-3) via the pixel output data buffer 24 and the data bus $IO_p$-0 in series. In conclusion, the signal $OE_i$ determines to permit or not to permit the data output operation in the word direction, and the signal $OEP_i$ determines to permit or not to permit the data output operation in the pixel direction.

(ii) PROCESS FOR SETTING MASK OF MEMORY UNIT

The mask data of the memory units (hereinafter, referred to as the plane mask data) are applied via the input/output terminals $TIO_p$-0 to $TIO_p$-3 when the command "read plane mask" shown in Table 1 is performed. At a time $t_{30}$ (shown in FIG. 15(a)) when the row address strobe signal RAS rises, the command write-in cycle is started if both levels of the column address strobe signal CAS and the write enable signal WE are identical to the "1" level. The operation described heretofore is similar to the case shown in FIG. 12 except that the data value written into the command register (shown in FIG. 5) is described as (10) in the hexadecimal digit form as shown in Table 1. As a result, only the output signal MC4 of the command register 1 becomes the "1" signal, and this "1" signal is supplied to the 0-bit input terminal of the main command decoder 4. The main command decoder 4 decodes the input signal thereof so as to set the level of the signal RGA to "1" at the leading edge timing of the signal MCST supplied to the enable terminal of the main command decoder 4. The value of the signal MCST is determined by the logical product of the signal MCD and CSMP. The level of the signal MCD rises to the "1" level at the leading edge timing of the signal RASD (shown in FIG. 4) and this "1" level of the signal MCD is maintained thereafter. In addition, the level of the signal CSMP (shown in FIG. 8) is always at the "1" level while the signal BCE is at the "0" level, and the level of the signal CSMP depends on the value of the chip select data while the signal BCE is at the "1" level. Therefore, the write-in operation of the command "read plane mask" is performed at the leading edge timing of the signal RAS under the condition where the signal BCE is at the "1" level and the value of the chip select data is equal to "1" or under the condition where the signal BCE is at the "0" level.

As described above, the command "read plane mask" is written into the command register 1 at the time $t_{30}$. However, since the signal RASD is the "0" signal as shown by a dashed line in FIG. 15(a) at the time $t_{30}$, the signal MCD does not become the "1" signal (as shown in FIG. 4). As a result, the signal MCST shown in FIG. 5 does not become the "-1" signal. Therefore, the main command decoder 4 is not subject to the enable state. Next, all of the row address strobe signal RAS, the signal RASD, the column address strobe signal CAS and the signal WE become the "1" signal at a time $t_{31}$. As a result, the main command decoder 4 is subject to the enable state, so that the level of the signal RGA is set to the "1" level. In addition, the level of the signal WEW (shown in FIG. 4) turns to the "1" level at the time $t_{31}$, whereby the decoder 2 is subject to the enable state. A this time, the command data MC0 supplied to the 0-bit input terminal of the decoder 2 is the "0" signal, whereby the decoder 2 turns the level of the signal RPW to the "1" level at a timing when the decoder 2 is subject to the enable state. This signal RPW is supplied to the clock terminal of the D flip-flop DFF11 shown in FIG. 8, hence, the D flip-flop DFF11 stores the data supplied to the input terminal thereof at the time $t_{31}$. Meanwhile, the mask data (MD) for memory unit (hereinafter, referred to as read plane mask data) are applied to the input/output terminals $TIO_p$-0 to $TIO_p$-3 at the time $t_{31}$ shown in FIG. 15. The read plane mask data are supplied to the input terminal of the D flip-flop DFF11 via the buffer BFF10 (shown in FIG. 8). Hence, the read plane mask data are stored in the D flip-flop DFF11 at the time $t_{31}$, and the value of the output signal FRP of the D flip-flop DFF11 coincides with the value of the read plane mask data. Further, the signal FRP is supplied to the 1-bit input terminal of the selector 23, hence, the value of the signal RPMP coincides with the value of the read plane mask data if the signal PME is at the "1" level. The signal RPMP is supplied to the input terminals of the AND gates AN41 and AN42 shown in FIG. 7, whereby the signal RPMP controls the ON/OFF operation of the signals $OEP_i$ and $OE_i$ described before.

The level of the signal PME turns to the "1" level when the command "plane mask enable" (shown in Table 1) is performed. Similar to the write-in operation of the command "bit/chip select mask enable", the write-in operation of the command "plane mask enable" is performed at the timing shown in FIG. 12. The commands in the present embodiment includes two kinds of commands, i.e., first commands for writing data into the predetermined flip-flop and second commands for not writing data. The first commands are written in at the timing shown in FIG. 15, and the second commands are written in at the timing shown in FIG. 12.

(iii) FUNCTIONS OF SIGNALS $BM_i$ AND RPMP

As described heretofore, the values of the signal $BM_i$ for controlling the bit mask and the signal RPMP for controlling the memory unit mask are set to the optimum values, and the signals $BM_i$ and RPMP are supplied respectively to the AND gate AN41 and AN42.

As is described before, the output signals of the AND gates AN41 and AN42 control the ON/OFF operations of the signals $OE_i$ and $OEP_i$, and the signals $OE_i$ and $OEP_i$ contribute to the data output enable operations in the word and pixel directions respectively. Hereinafter, description will be given with respect to the relation between the signals $BM_i$ and RPMP in detail.

As is apparent from FIG. 7, the condition where the AND gate AN41 outputs the "1" signal is identical to the condition where the AND gate AN42 outputs the "1" signal except for the signal PAM. The level of the signal PAM turns to the "1" level when the command "pixel access mode" (shown in Table 1) is written in at the timing shown in FIG. 12. In addition, the signal PAM is cleared at a power-on time or at a time when the command "word access mode" is written in. More specifically, the level of the signal PAM turns to the "1" level after the command "pixel access mode" is performed in order to set the memory device at the pixel access mode, whereby the AND gate AN42 can output the "1" signal. On the other hand, the level of the signal PAM turns to the "0" level when the word access mode is set in the memory device, whereby the AND gate AN41 can output the "1" signal.

In the case where the word access mode is selected, the AND gate AN41 can output the "1" signal. However, the level of the signal MKA (shown in FIG. 4) supplied to the AND gate AN41 is maintained constantly at the "1" level after the mask mode is selected. Hence, the level of the output signal RWX of the AND gate AN41 depends on the logical product of the signals $BM_i$ and RPMP. More specifically, the output signal RWX of the AND gate AN41 turns to the "1" signal when both of the signals $BM_i$ and RPMP are identical to the "1" signal. Hence, when the signal OEW supplied to one input terminal of the AND gate AN44 turns to the "1" signal, the signal $OE_i$ turns to the "1" signal so that the output data buffer 15 is subject to the enable state. Therefore, as shown in FIG. 13, the data buses $IO_0$ to $IO_7$ are supplied with the signals corresponding to the bits where both of the signals $BM_i$ and RPMP are identical to the "1" signal.

On the contrary, in the case where the pixel access mode is selected, the AND gate AN42 can output the "1" signal. Similar to the output signal RWX of the AND gate AN41, the level of the output signal RPX depends on the logical product of the signals $BM_i$ and RPMP. Therefore, as shown in FIG. 14, the input/output terminals $TIO_p$-0 to $TIO_p$-3 are supplied with the signals corresponding to the bits where both of the signals $BM_i$ and RPMP are identical to the "1" signal.

Above is the operation of the read cycle in the mask mode. Prior to the access in the read cycle of the mask mode, it is possible to mask desirable memory units and desirable bits, and it is also possible to select and change over the memory units or the bits to be masked with an extremely high speed.

It is possible to summarize the conditions for setting the data output states shown in FIGS. 13 and 14 into the following statements. The data output state shown in FIG. 13 can be realized under the condition where the mask mode is selected, both of the signals PME and BCE are identical to the "1" signal and the signal PAM is identical to the "0" signal. The data output state shown in FIG. 14 can be realized under the condition where the mask mode is selected and all of the signals PAM, PME and BCE are identical to the "1" signal. In order to read out the pixel data (of four bits) corresponding to the display dot, the signals RPMP within all of the memory units must be set to the "1" signals (as shown in FIG. 14) and the signal $BM_i$ corresponding to the display dot to be read out must be set to the "1" signal.

(B) Write Cycle

Next, description will be given with respect to the write cycle. Similar to the read cycle described before, the write cycle provides with the normal mode and the mask mode. In addition, there is provided the command write-in cycle other than the read and write cycles.

(1) Normal Mode

This normal mode in the write cycle is similar to that in the read cycle. As shown in FIG. 11, the data in the word direction are written into the memory units whose values of the chip select data are equal to "1" in this normal mode in the write cycle.

In addition, this normal mode in the write cycle is set similar to that in the read cycle. This normal mode is set under the condition where the levels of the column address strobe signal CAS, the write enable signal WE and the output enable signal OE are all equal to the "0" level at the leading edge timing of the row address strobe signal RAS (i.e., at a time $t_{40}$ shown in FIG. 16(a)). Thereafter, the signals NME and NMA (shown in FIG. 4) sequentially become the "1" signals, whereby this normal mode is defined.

Next, the operations in the write cycle is started to be performed when the level of the write enable signal WE is the "1" level at the leading edge timing $t_{41}$ (shown in FIG. 16) of the column address strobe signal CAS. At the same time, the column address is defined, as a result, the addresses to be written in are defined. Therefore, the access is performed on and the data on the common data buses $IO_0$ to $IO_7$ are simultaneously written into the same address within each of the memory units #0M to #3M. Similar to the read cycle described before, the chip select data can be written in at the leading edge timing $t_{40}$ of the row address strobe signal RAS. At this time, the chip select data are supplied to the memory units, and the data are written into the memory units whose values of the chip select data are equal to "1" when the level of the signal BCE is equal to "1". Hereinafter, description will be give with respect to the operations of the chip select data.

The data on the supply data bus $IO_i$ are supplied to the 0-bit, 2-bit and 3-bit input terminals of the selector 10 via the buffer BFF1 (shown in FIG. 7) at a data writing timing $t_{41}$. In the normal mode where the signal NMA is the "1" signal, the selector 10 selects the 2-bit or 3-bit input terminal. Hence, the data supplied to the 2-bit or 3-bit input terminal of the selector 10 are passed through the selector 10 and stored in the D flip-flop DFF1 at the leading edge timing of the signal WEW, whereby the data stored in the D flip-flop DFF1 are outputted as the signal $SRC_i$. This signal $SRC_i$ is supplied to the memory $M_i$ when the buffer BFF3 is subject to the enable state based on the signal WEW. As shown in FIG. 4, this signal WEW becomes the "1" signal when the signal NCS becomes the "1" signal. In addition, the level of the signal NCS is determined depending on the logical product of the signals NMA and CSMP. In the case where the value of the chip select data is equal to "0" and the level of the signal CSMP is equal to "0", the signal does not become the "1" signal, hence, the signal $SRC_i$ is not supplied to the memory $M_i$. Meanwhile, the signals $WEP_0$ to $WEP_7$ (shown in FIG. 4) are not outputted at all when the signal WEP is not outputted. In this case, the write enable signal is not supplied to the memories $M_0$ to $M_7$ (as shown in FIG. 6), hence, the write-in operation is not performed. As described above, in the case where the signal BCE is the "1" signal, the data are written into the memory units whose values of the chip select data is equal to "1".

(2) Mask Mode

Figure 16:
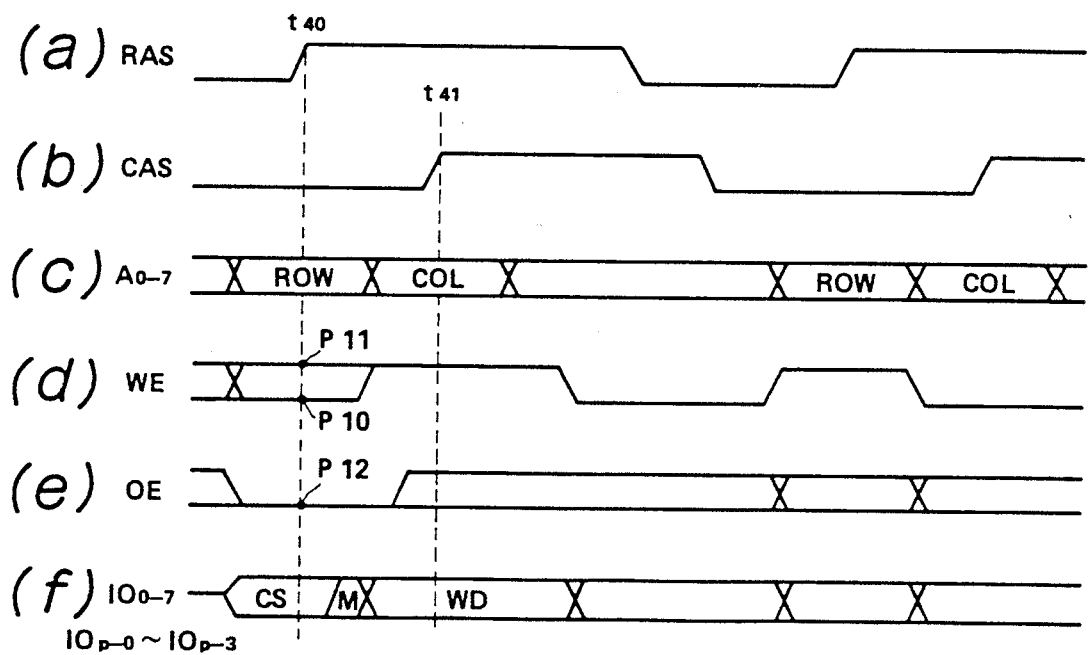
FIG. 16 is a timing chart showing a write cycle.

The mask mode in the write cycle is set under the condition shown in FIG. 16 where the level of the write enable signal WE is at the "1" level at the time $t_{40}$. As is similar to the read cycle, in the case where the level of the write enable signal WE is equal to "1" under the condition shown in FIG. 16, the signals MME and MKA sequentially become the "1" signal, whereby the mask mode is started. Next, the column address is stored at the leading edge timing $t_{41}$ of the column address strobe signal CAS, whereby the address to be given with the access is defined. As shown in FIG. 16(f), the data are written into the corresponding address immediately at the time $t_{41}$ when the address to be given with the access is defined. The data written into the memories are suitably masked by each bit and by each memory unit. Hereinafter, description will be given with respect to the data write-in state where the mask process is performed.

Figure 17:
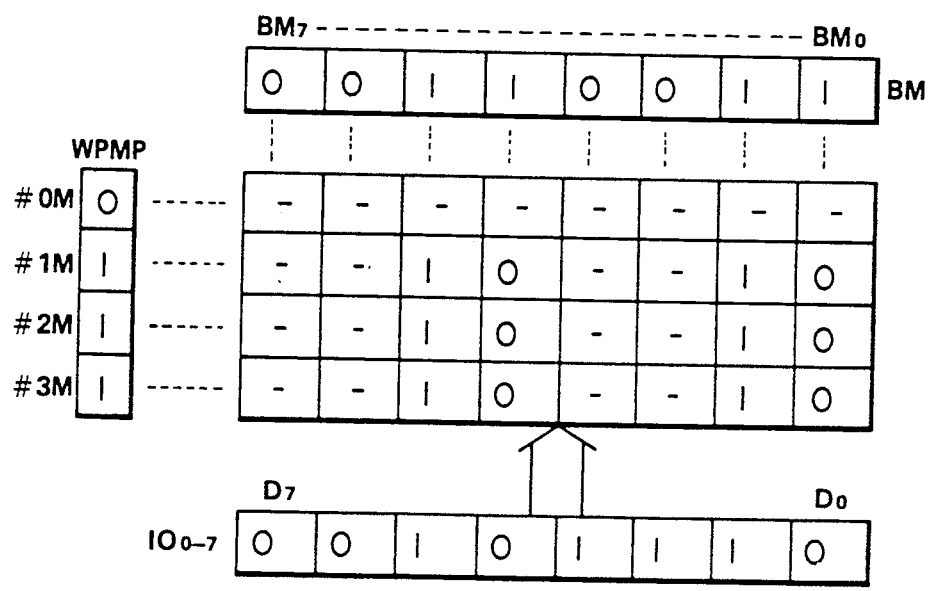
FIGS. 17 and 18 are drawings showing data input states in masked states of write cycles.

FIG. 17 shows the mask state where the data are written in the word direction. The signal WPMP shown in FIG. 17 is identified as the output signal of the selector 22 shown in FIG. 8. More specifically, FIG. 17 represents the case where the signal WPMP within each of the memory units #1M, #2M and #3M is the "1" signal and the binary number of the signals $BM_7$ to $BM_0$ is identical to (00110011). As is similar to the read cycle, the values of the signals $BM_0$ to $BM_7$ are set to the same values within each memory unit.

In the case where the data $D_7$ to $D_0$ having the binary number (00101110) are supplied to the memory units under the state shown in FIG. 17, the data are written into the corresponding bits (whose signals $BM_0$ to $BM_7$ are the "1" signals) of the memory $M_i$ within the memory unit (whose signal WPMP is the "1" signal). In this case, the same data are written into the corresponding memory units #1M to #3M.

Figure 18:
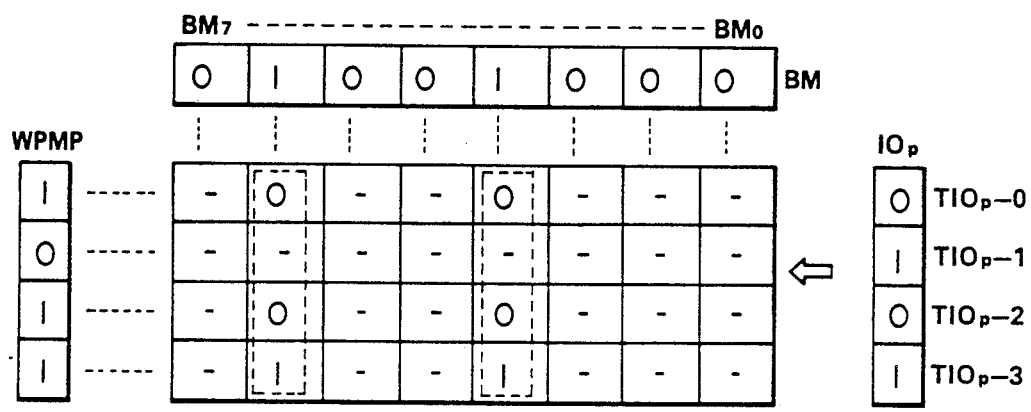

FIG. 18 represents the mask state where the data write-in operation is performed in the pixel direction. In this case, the data are written into the corresponding bits (whose signals $BM_0$ to $BM_7$ are the "1" signals) of the memory $M_i$ within the memory unit (whose signal WPMP is the "1" signal). Within each of the memory units #0M to #3M, the data from the input/output terminals $TIO_p$-0 to $TIO_p$-3 are written in common to the corresponding bits which are subject to the write-in enable states.

The setting operations for setting the values of the signals $BM_0$ to $BM_7$ (shown in FIGS. 17 and 18) are performed in the manner similar to that in the read cycle. Hereinafter, description will be given with respect to the operation for setting the value of the signal WPMP.

Firstly, the command "write plane mask" (shown in Table 1) is performed. At this time, the mask data are supplied to the memory units via the input/output terminals $TIO_p$-0 to $TIO_p$-3. The command "write plane mask" is identified as the command in which the data are written into the D flip-flop DFF10 (shown in FIG. 8), and this command is written in at the timing shown in FIG. 15. More specifically, the signal WPW (shown in FIG. 5) rises at the time $t_{31}$ (shown in FIG. 15), whereby the mask data from the input/output terminals $TIO_p$-0 to $TIO_p$-3 are supplied to the D flip-flop DFF10 via the buffer BFF10 (shown in FIG. 8). Then the D flip-flop DFF10 outputs the signal FWP as the mask data. As a result, the value of the signal FWP coincides with that of the mask data. This signal FWP is supplied to the 1-bit input terminal of the selector 22. Hence, the value of the output signal WPMP of the selector 22 coincides with that of the mask data if the signals PME is the "1" signal. This signal PME becomes the "1" signal when the command "plane mask enable" is executed.

Next, description will be given with respect to the operations of the signals $BM_i$ and WPMP. As shown in FIG. 4, these signals $BM_i$ and WPMP contribute to control the ON/OFF change-over operations of the write enable signals $WEP_0$ to $WEP_7$. More specifically, when the level of the signal WPMP is at the "0" level, the output signal MWP of the AND gate AN6 becomes the "0" signal, whereby the output signal of the OR gate OR2 becomes the "0" signal (while the level of the signal NCS is always set at the "0" level in the mask mode). Therefore, the level of the output signal WEP of the AND gate AN8 is set at the "0" level, and all levels of the write enable signals $WEP_0$ to $WEP_7$ (which are supplied to the memory $M_i$) are set at the "0" level, hence, all of the memories are not permitted to be written in.

Even if the level of the signal WPMP is at the "1" level and the level of the signal WEP becomes the "1" level at the predetermined timing, the write enable signal $WEP_i$ at the corresponding bit whose signal $BM_i$ has the "0" level is not outputted when at least one of the signals $BM_0$ to $BM_7$ is the "0" signal. In other words, the write-in operation is permitted only in the corresponding bit whose signals WPMP and $BM_i$ both have the same level "1". Hence, in the write-in operation in the word direction, the data to be written in are transferred to the memory $M_i$ via a route; the common data bus $IO_i$, the buffer $BFF_1$ (shown in FIG. 7), the 0-bit, 2-bit and 3-bit input terminals of the selector 10, the D flip-flop DFF1, the selector 12, the buffer BFF3 and the data bus $DT_i$. Similarly, in the write-in operation in the pixel direction, the data to be written in are transferred to the data bus $DT_i$ via a route; the input/output terminal $TIO_p$-i, the data bus $IO_p$-i, the buffer BFF10 (shown in FIG. 8), the 1-bit input terminal of the selector 10 (shown in FIG. 7), the D flip-flop DFF1, the selector 12 and the buffer BFF3.

Above is the description of the operation of the mask mode in the write cycle. Prior to the access in the write cycle, it is possible to mask the desirable memory units and the desirable bits. In addition, it is possible to select and change over the memory units and the bits to be masked with an extremely high speed.

Next, the conditions for the states shown in FIGS. 17 and 18 will be summarized to the following statements. The state shown in FIG. 17 is set under the condition where the mask mode is set, the levels of the signals PME and BCE are both set at the "1" level and the level of the signal PAM is set at the "0" level. The state shown in FIG. 18 is set under the condition where the mask mode is set, the levels of the signals PAM, PME and BCE are all set at the same "1" level.

Figure 19:
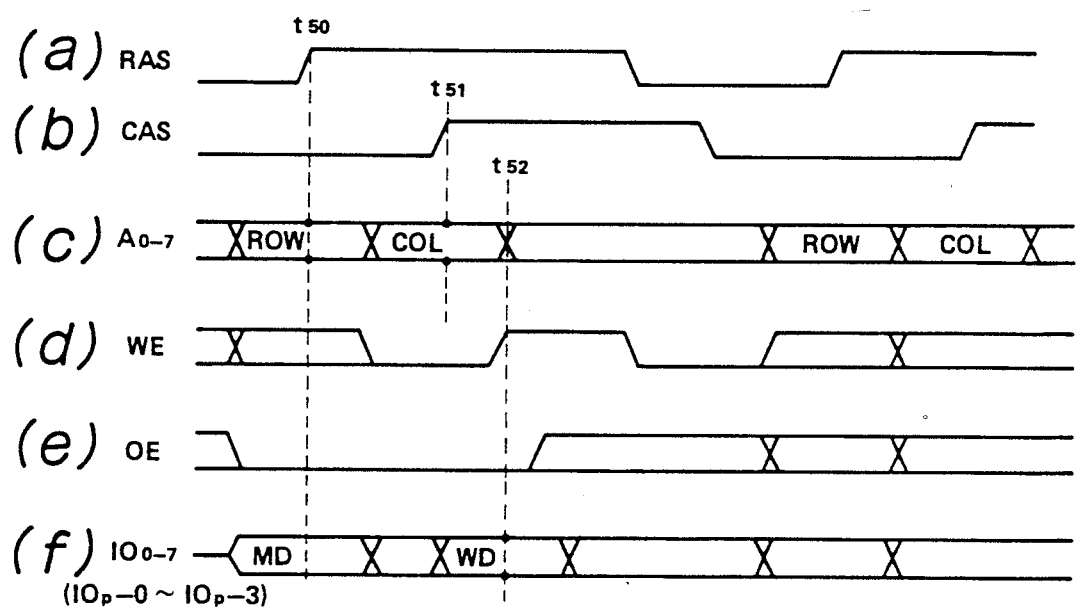
FIG. 19 is a timing chart showing a late write cycle.

In addition, the present embodiment provides a late write cycle other than the write cycle (shown in FIG. 16). In the late write cycle (shown in FIG. 19), the data write-in operation is performed at a time $t_{52}$ when the predetermined time is passed after the column address is stored.

[II] SELECT OPERATION

Next, description will be given with respect to a select operation, i.e., (A) LINE SELECT READ, (B) LINE SELECT WRITE and (C) LINE SELECT READ/WRITE IN WORD DIRECTION in conjunction with FIGS. 20 to 23.

(A) Line Select Read

Figure 22:
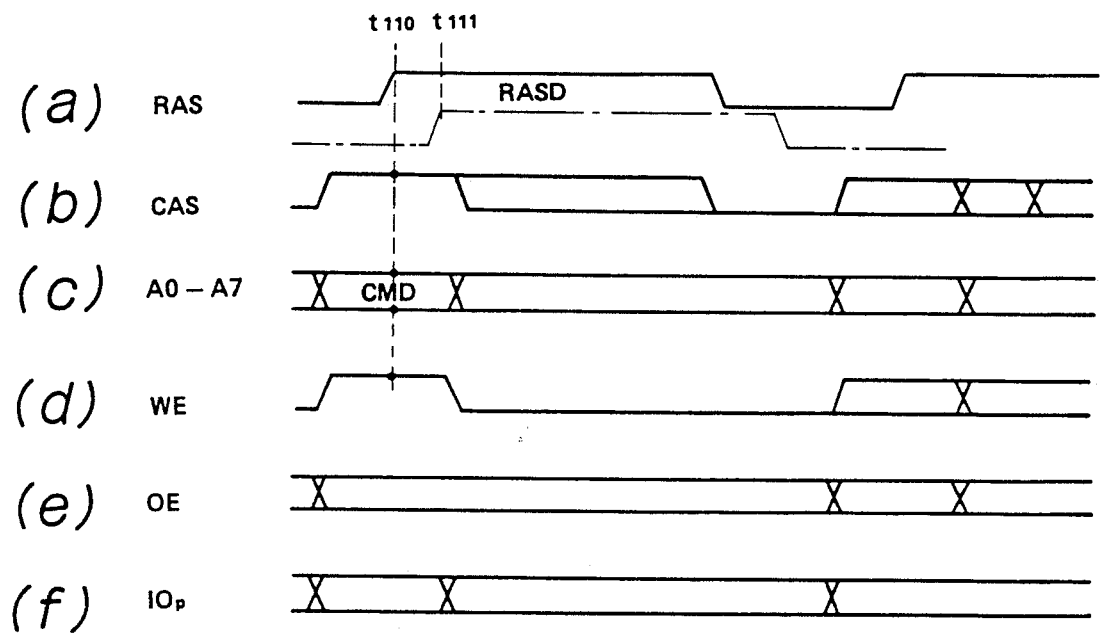

At a time $t_{110}$ shown in FIG. 22, the row address strobe signal RAS, the column address strobe signal CAS and the write enable signal WE are all identical to the "1" signal. At this time $t_{110}$, the signal MCC (shown in FIG. 4) rises up to the "1" signal so that the command write-in cycle is started. In this cycle, the address buses A0 to A7 supplies the command code "Line Select Enable" (shown in Table 1), the hexadecimal number of which can be represented as (09). As a result, the command register 1 (shown in FIG. 5) stores the above command code at the time $t_{110}$ (i.e., at the leading edge timing of the row address strobe signal RAS), whereby the command register 1 supplies the data (1001) to the decoder 3 as the command data MC3, MC2, MC1 and MC0. At a time $t_{111}$ (shown in FIG. 4) when a predetermined time is passed after the leading edge timing of the row address strobe signal RAS, the output signal MCD of the AND gate AN9 rises. As a result, the output signal MDS of the AND gate AN31 (shown in FIG. 5) becomes the "1" signal so that the above command data are stored in the decoder 3. Thus, decoder 3 sets the signal LSE to the "1" signal at the time $t_{111}$. At this time, the signal BLS becomes the "1" signal if the signal PAM is the "1" signal, and the signal PLS becomes the "1" signal if the signal PAM is the "0" signal. In this case, the signal PAM becomes the "0" signal when the command "Word Access Mode" (shown in Table 1) is executed, and the signal PAM becomes the "1" signal when the command "Pixel Access Mode" is executed. Similar to the command "Line Select Enable" described before, these commands are stored in the memory units at the timing shown in FIG. 22. Hereinafter, in the following description, the signal PAM is set to the "1" signal.

Figure 20:
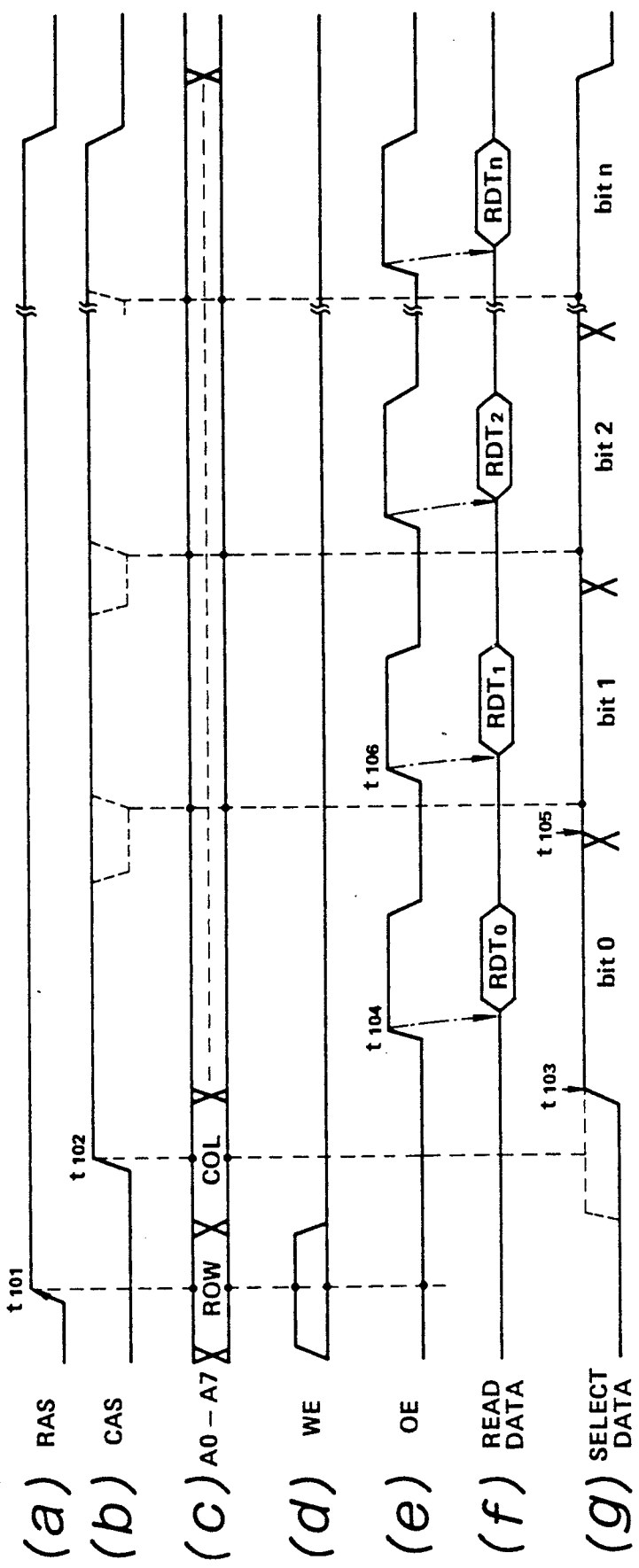
FIGS. 20, 22 and 23 are timing charts for explaining a line select read process.

Next, the read cycle is started in the case where the level of the row address strobe signal RAS is set to the "1" level, both levels of the column address strobe signal CAS and the output enable signal OE are set to the "0" level at a time $t_{101}$ shown in FIG. 20. In this case, the mask mode is selected when the write enable signal is the "1" signal, and the normal mode is selected when the write enable signal is the "0" signal (as is understood by the signals NME and MME in FIG. 4). However, the mask mode will be selected in order to set the signal NCS (described hereinafter) to the "0" signal in the following description.

As shown in FIG. 20, the row addresses stored in the storing areas (on which the access must be performed) are supplied to the address buses A0 to A7 just before the time $t_{101}$. As a result, the row address is defined at the time $t_{101}$. Similarly, the column address is defined at the leading edge timing $t_{102}$ of the column address strobe signal CAS. Thus, the access address is defined at the time $t_{102}$. At this time, the defined address is set in common to all of the memory blocks MB0 to MB3 within the memory units #0M to #3M. At a next time $t_{103}$, the select data are supplied to the memory units in order to select some bits within the storing areas on which the access is performed by way of the data buses $IO_0$ to $IO_7$. In the case shown in FIG. 20, the select data are supplied to the memory units in order to set the value of the data on the data bus $IO_0$ to "1", i.e., in order to select the 0-bit of the data. As a result, the "1" signal is supplied to the input terminal of the L flip-flop LFF6 (shown in FIG. 7) within the bit interface $BTI_0$ via the data bus $IO_0$, and the "0" signal is supplied to the input terminal of the L flip-flop LFF6 within all of the bit interfaces $BTI_1$ to $BTI_7$ via the data buses $IO_1$ to $IO_7$. At a time $t_{104}$, the signal LMST (shown in FIG. 4) rises when the output enable signal OE rises. Hence, the L flip-flop LFF6 (shown in FIG. 7) starts to store the input signal thereof. Due to the above-mentioned process, the value of the output signal $FBS_i$ of the L flip-flop LFF6 coincides with that of the select data at the time $t_{104}$. More specifically, the signal $FBS_0$ within the bit interface $BTI_0$ is the "1" signal, and other signals $FBS_1$ to $FBS_7$ within the bit interfaces $BTI_1$ to $BTI_7$ are identical to the "0" signal. Hence, the signal $FBS_i$ (where i denotes as 0 to 7) is supplied to the corresponding 2-bit and 3-bit input terminals of the selector 13. In this case, the signal BLS supplied to the select input terminal of the selector 13 is the "1" signal (because both of the signals PAM and LSE are the "1" signal), hence the selector 13 selects one of the 2-bit and 3-bit input terminals thereof. As a result, the value of the signal $BM_i$ equals to that of the signal $FBS_i$.

Hereinafter, description will be given with respect to the function of the signal $BM_i$. At the memory read time, the data read out from the memory $M_i$ are passed through the buffer BFF2 and the exclusive OR circuit EXOR1 in series. The output data of the exclusive OR circuit EXOR1 are outputted to the data bus $IO_i$ via the output data buffer 15, or outputted to the data bus $IO_p$-0 (or the data buses $IO_p$-1 to $IO_p$-3) via the buffer BFF4 and the pixel output data buffer 24 (shown in FIG. 8). In this case, the AND gate AN41 (shown in FIG. 7) can not output the "1" signal when the command "Pixel Access Mode" is executed so that the level of the signal PAM is set to "1" as described above. In addition, the signal NCS supplied to the OR gate OR21 does not become the "1" signal in the normal mode (as shown in FIG. 4). Hence, the output signal $OE_i$ of the AND gate AN44 must not become the "1" signal. As a result, the output data buffer 15 must not be subject to the enable state.

Meanwhile, the AND gate AN42 can output the "1" signal when the signals MKA, $BM_i$, RPMP and PAM are all equal to the "1" signal. In this case, the signal MKA is always set to the "1" signal in the mask mode. Hereinafter, description will be given with respect to the signal RPMP.

Figure 23:
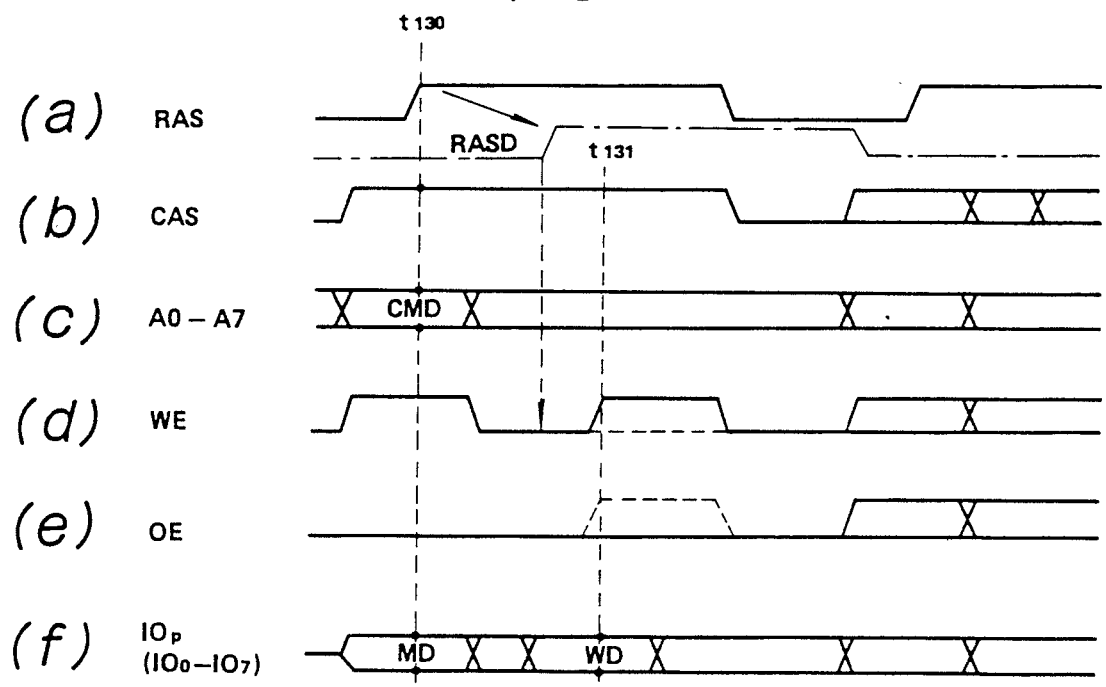

The operation for setting the signal RPMP is performed when the command "Read Plane Mask" (shown in Table 1) is performed. FIG. 23 is the timing chart showing the timings of the several signals in the command "Read Plane Mask". At a leading edge timing $t_{130}$ (shown in FIG. 23(a)) of the row address strobe signal RAS, the command write-in cycle is set when both levels of the column address strobe signal CAS and the write enable signal WE are equal to the "1" level. The operation described heretofore is similar to that in the former case shown in FIG. 22, except that the hexadecimal number of the data written into the command register 1 (shown in FIG. 5) is (10) at the time $t_{130}$. Hence, only the output signal MC4 of the command register 1 becomes the "1" signal and this "1" signal is supplied to the 0-bit input terminal of the main command decoder 4. The main command decoder 4 decodes the input signal thereof so as to output the signal RGA having the "1" level from the 1-bit output terminal thereof when the signal MCST supplied to the enable terminal of the main command decoder 4 rises. In this case, the level of the signal MCST is determined based on the logical product of the signals MCD and CSMP. This signal MCD becomes the "1" signal at the leading edge timing of the signal RASD (shown in FIG. 4) and holds its level "1" thereafter in the command write-in mode. Since the signal PLS is the "0" signal, the level of the signal CSMP (shown in FIG. 8) is always set to the "1" level when the level of the signal BCE is at the "0" level, and the level of the signal CSMP is determined depending on that of the signal FCS when the level of the signal BCE is at the "1" level. Therefore, the write-in operation of the command "Read Plane Mask" is performed at the leading edge timing of the signal RAS under the condition where both levels of the signals BCE and FCS are equal to the "1" level, or under the condition where the level of the signal BCE is at the "0" level. According to the timing shown in FIG. 22, the level of the signal BCE is set to the "1" level when the command "Bit/Chip Select Mask Enable" is performed, and the level of the signal BCE is set to the "0" level when the command "Bit/-Chip Select Mask Disable" is performed. As is apparent from FIG. 8, the value of the signal FCS is determined by the signals supplied to the data buses $IO_p$-0 to $IO_p$-3 at the leading edge timing of the signal RASW.

As described above, the command "Read Plane Mask" is written into the command register 1 at a time $t_{130}$ (shown in FIG. 23). However, the signal RASD (shown by a dashed line in FIG. 23(a)) is the "0" signal at the time $t_{130}$, hence, the signal MCD (shown in FIG. 4) does not become the "1" signal. As a result, the signal MCST (shown in FIG. 4) does not become the "1" signal. Therefore, the main command decoder 4 is not subject to the enable state. At a next time t131, all of the row address strobe signal RAS, the signal RASD, the column address strobe signal CAS and the signal WE are equal to the "1" signal, hence, the main command decoder 4 is subject to the enable state so that the main command decoder 4 sets the level of the output signal RGA thereof at the "1" level. In addition, the signal WEW (shown in FIG. 4) becomes the "1" signal at the time t131 so that the decoder 2 is subject to the enable state. At this time, since the value of the command data MC0 supplied to the input terminal of the decoder 2 is equal to "0", the decoder 2 sets the level of the signal RPW to the "1" level at timing when the decoder 2 is subject to the enable state. Hence, the D flip-flop DFF11 (shown in FIG. 8) stores the data supplied to the input terminal thereof in accordance with the signal RPW which is supplied to the clock terminal of the D flip-flop DFF11.

In this case, the "1" or "0" signal from the input/output terminal $TIO_p$-0 to $TIO_p$-3 is supplied to and stored in the D flip-flop DFF11 via the buffer BFF10 (shown in FIG. 8). In other words, the value of the signal FRP is determined based on the value of the signal which is supplied to the D flip-flop DFF11 at the time $t_{131}$. The signal FRP is supplied to the 1-bit input terminal of the selector 23 wherein the value of the output signal RPMP thereof coincides with that of the signal FRP under the condition where the level of the signal PME is at the "1" level and the level of the signal PLS is at the "0" level.

The signal RPMP is set in the manner described above. Hence, when the level of the signal RPMP is set to the "1" level, the level of the output signal of the AND gate AN42 (shown in FIG. 7) is determined based on that of the signal $BM_i$. This level of the signal $BM_i$ is determined based on that of the signal FBSi in the line select read mode. In other words, the level of the signal $BM_i$ is determined based on the value of the select data supplied to the data bus $IO_i$ at the time $t_{103}$ shown in FIG. 20. Hence, the signal $BM_i$ is equal to the "0" signal within all of the bit interfaces except for the bit interface $BTI_0$ at a time $t_{104}$. The read data RDT0 are outputted to the data buses $IO_p$-0 to $IO_p$-3 when the predetermined time is passed after the time t104, and the read data $RDT_0$ is therefore identical to the data of the 0-bit, the one byte of which is given with the access within each of the memory blocks MB0 to MB3. For example, in the case where the above-mentioned select data are supplied to each of memory blocks having the areas E1 (shown in FIG. 1) which are given with the common access, the pixel data PX0 at the 0-bit position are outputted as the read data $RDT_0$.

Next, the select data for selecting only the 1-bit are supplied to the memory units at a time $t_{105}$ (shown in FIG. 20). Due to the similar operation described above, the pixel data at the 2-bit position are outputted as read data $RTD_1$ when the predetermined time is passed after a time $t_{106}$ when the output enable signal OE rises. In other words, the pixel data PX1 are outputted as the read data $RTD_1$. Similarly, the pixel data PX2, PX3, . . . , PXn are sequentially outputted. In this case, n denotes as an arbitrary integral number, more specifically, the maximum value of the number n is set to "7" because one word is constituted by eight bits.

The pixel data are sequentially read out from the memory blocks by the above-mentioned process. As shown in FIG. 20, the access data are supplied to the memory units at only one time in order to read out the (n+1) pixel data. Hence, the present embodiment enable the memory device to read out the desirable number of pixel data within one memory cycle.

(B) Line Select Write

Next, description will be given with respect to the pixel data write-in operation in conjunction with FIG. 21.

Firstly, the values of the row address strobe signal RAS, the column address strobe signal CAS, the write enable signal WE and the output enable signal OE at a time $t_{120}$ are set to those in the case of the line select read mode. In addition, the command "Line Select Enable" is pre-executed so as to set the level of the signal LSE at the "1" level. Further, the row address is defined at the leading edge timing $t_{120}$ of the row address strobe signal RAS and the column address is defined at the leading edge timing $t_{121}$ of the column address strobe signal CAS, whereby the access address is defined. At a next time $t_{122}$, the data to be written in are supplied from the data buses $IO_p$-0 to $IO_p$-3, and the select data are supplied from the data buses $IO_0$ to $IO_7$ in order to select desirable bits within the area on which the access is performed. In the case shown in FIG. 21, the select data are supplied in order to set the value of the data on the data bus $IO_0$ to "1", i.e., in order to select the 0-bit position of the memory blocks. As is similar to the case described before, the "1" signal is supplied to the input terminal of the L flip-flop LFF6 (shown in FIG. 7) within the bit interface $BTI_0$ via the data bus $IO_0$. In addition, the "0" signal is supplied to the input terminal of the L flip-flop LFF6 within each of the bit interfaces $BTI_1$ to $BTI_7$ via the data buses $IO_1$ to $IO_7$. At a next time $t_{123}$ when the write enable signal WE rises, the signal LMST (shown in FIG. 4) rises, whereby the L flip-flop LFF6 (shown in FIG. 7) stores the input signal thereof. Thus, the value of the output signal $FBS_i$ of the L flip-flop LFF6 coincides with that of the select data at the time $t_{123}$. More specifically, the signal $FBS_0$ within the bit interface $BTI_0$ is equal to the "1" signal, and other signals $FBS_1$ to $FBS_7$ within the bit interfaces $BTI_1$ to $BTI_7$ are all equal to the "0" signal. These signals are supplied to the 2-bit and 3-bit input terminal of the corresponding selector 13. In this case, since the signal BLS supplied to the select input terminal of the selector 13 is the "1" signal (because the signals PAM and LSE shown in FIG. 5 are both equal to the "1" signal), the selector 13 selects the 2-bit or 3-bit input terminal of the selector 13, whereby the signal $BM_i$ is set identical to the signal $FBS_i$. Hence, the signals $BM_0$ to $BM_7$ are supplied to the respective input terminals of the AND gates AN10 to AN17 (shown in FIG. 4). These AND gates AN10 to AN17 are provided for generating the write strobe signals $WEP_0$ to $WEP_7$, hence, only the write strobe signal $WEP_0$ is outputted from the AND gate $AN_0$ when only the signal $BM_0$ is the "1" signal. In this case, the data are only written into the 0-bit memory $M_0$ when the output signal WEP of the AND gate AN8 is the "1" signal. Hence, the data $WDT_0$ are written into the 0-bit memory $M_0$ within each of the memory units #0M to #3M. In other words, the data of the pixel PX0 (shown in FIG. 1) are written into the memory units.

Next, description will be given with respect to the condition where the level of the signal WEP becomes identical to the "1" level.

In order to set the above condition, it is necessary to satisfy a first condition where both of the signals CSMP and NCS are identical to the "1" signal in the normal mode, or a second condition where both of the signals WPMP and MWP are identical to the "1" signal in the mask mode. Furthermore, it is necessary to satisfy a third condition where the signal WEW becomes the "1" signal in addition to the first or second condition. The signal WPMP is set in a manner similar to the signal RPMP described before. In this case, however, the command "write plane mask" (shown in Table 1) is executed by the timing shown in FIG. 22, and the data having the value to be set are written into the D flip-flop DFF10 (shown in FIG. 8).

Figure 21:
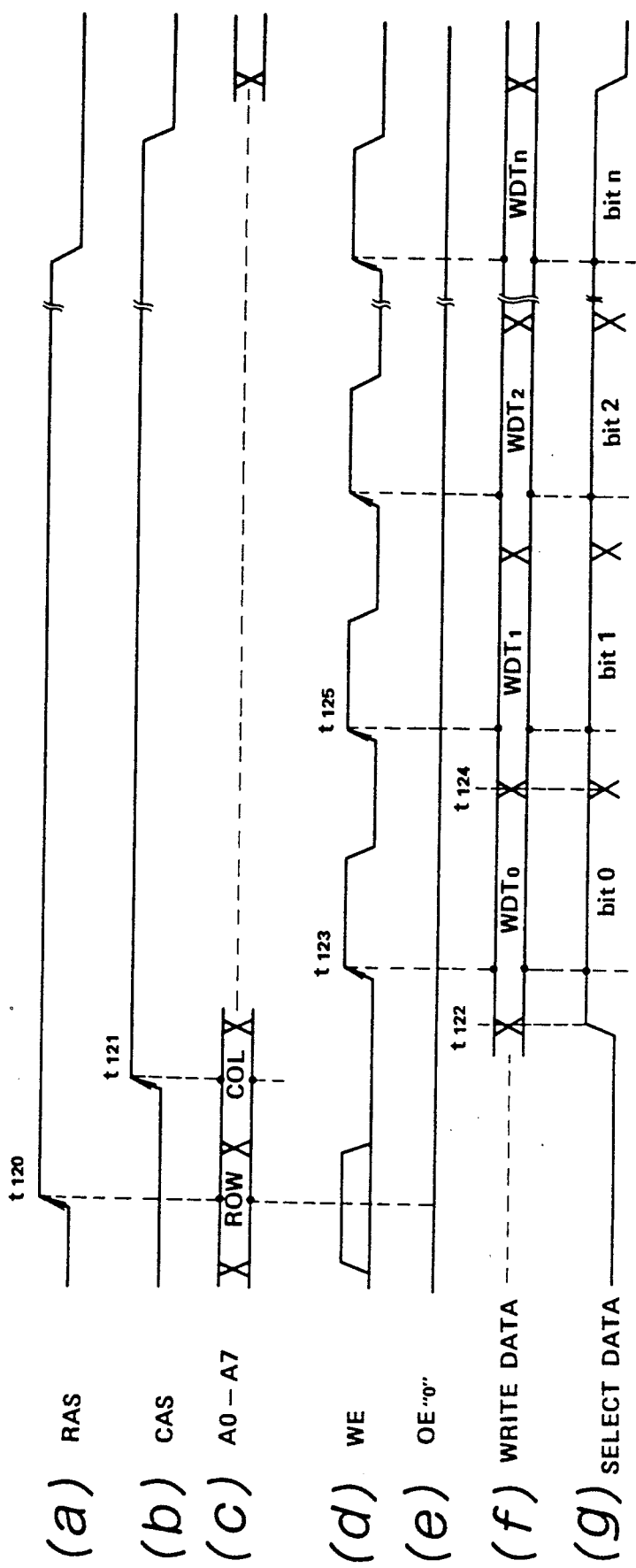
FIG. 21 is a timing chart for explaining a line select write process.

Next, at a time $t_{124}$ shown in FIG. 21, the select data for selecting the 1-bit memory are supplied to the memory units via the data buses $IO_0$ to $IO_7$, and the data to be written in are supplied to the memory units via the data buses $IO_p$-0 to $IO_p$-3. At a next time $t_{125}$ when the write enable signal WE rises, the data are written into the 1-bit position of the access area within each of the memory units #0M to #3M. Hence, the data are written into the pixel PX1 shown in FIG. 1. Similarly, the pixel data PX2, PX3, ..., PXn (where the maximum value of n is equal to 7) can be sequentially written into the memory units by sequentially setting the 2-bit, 3-bit, ..., n-bit positions. Similar to the case in the read cycle described before, (n+1) pixel data can be written into the memory units by supplying the address data at only one time. It is therefore possible to perform the data write-in operation with a high speed.

(C) Line Select Read/Write in Word Direction

In the description described heretofore, the data write-in and read-out operation is performed by the pixel data. However, it is possible to perform the data input/output operation by the word data in the present embodiment. Hereinafter, description will be given with respect to word access operation.

In order to perform the word access operation, it is necessary to perform the command "Word Access Mode" (shown in Table 1) by a timing shown in FIG. 22. As a result, the decoder 3 (shown in FIG. 5) sets the level of the output signal PAM thereof at the "0" level. Next, the command "Line Select Enable" is performed so as to set the level of the signal LSE at the "1" level, whereby the output signal PLS of the AND gate AN34 becomes identical to the "1" signal.

The word data are read out by the timing shown in FIG. 20, and the word data are written in by the timing shown in FIG. 21. The select data for selecting one of the memory units (planes) are supplied to the memory units by way of the data buses $IO_p$-0 to $IO_p$-3, and the read data or the write data are transferred via the data buses $IO_0$ to $IO_7$. Hereinafter, detailed description will be given with respect to the word data read-out and write-in operations.

In the word data read-out operation, the select data are supplied to the memory units via the data buses $IO_p$-0 to $IO_p$-3 so as to enable one of the memory units. For example, in order to enable the memory unit #0M only, the select data to be supplied to the data bus $IO_p$-0 are set identical to the "1" signal, and the other select data to be supplied to the data buses $IO_p$-1 to $IO_p$-3 are all set identical to the "0" signal. As a result, the "1" signal is supplied to the L flip-flop LFF11 within the memory unit #0M shown in FIG. 8, and the "0" signal is supplied to the L flip-flop LFF11 within each of the memory units #0M to #3M. At the time $t_{104}$ when the output enable signal OE rises up to the "1" signal, the signal LMST becomes identical to the "1" signal, whereby the above select data are stored in the L flip-flop LFF11. In addition, the output signal FDP of the L flip-flop LFF11 is supplied to the 2-bit and 3-bit input terminals of each of the selectors 21, 22 and 23. Furthermore, since the signal PLS is identical to the "1" signal, the all values of the signals RPMP, WPMP and CSMP coincide with the value of the signal FDP. This signal RPMP (which only relates to the read cycle) is supplied to the AND gate AN41 (shown in FIG. 7) so as to control the value of the signal $OE_i$ (because the signal NCS is not outputted in the modes other than the normal mode). More specifically, the signal $OE_i$ becomes identical to the "1" signal so as to enable the output data buffer 15 when the signal RPMP becomes identical to the "1" signal, whereby the read data read from the memory $M_i$ are outputted to the data bus $IO_i$ via the buffer BFF2 and the output data buffer 15 in series. On the other hand, the AND gate AN41 does not output the "1" signal so that the output data buffer 15 is not subject to the enable state when the signal RPMP becomes identical to the "0" signal, whereby the above read data are not outputted to the data bus $IO_i$. In this case, one word data are therefore outputted from the memory unit #0M only.

Similarly, the select data can be sequentially supplied to the memory units in order to sequentially select the memory units #0M to #3M in turn. Hence, it is possible to read out the word data from each plane within one memory cycle without newly giving the address data to the memory units.

Next, in the case where the word data are written into the memory units, the select data for selecting the memory unit #0M, for example, are supplied via the data buses $IO_p$-0 to $IO_p$-3 at a time $t_{122}$ shown in FIG. 21. Hence, the select data are stored in the L flip-flop LFF11 (shown in FIG. 8) at a next time $t_{123}$, whereby the all values of the signals RPMP, WPMP and CSMP coincide with the value of the signal FDP. In this write cycle, the signals WPMP and CSMP contribute to permit/non-permit for the data write operation. More specifically, the output signal of the OR gate OR2 does not become identical to the "1" signal so that all of the write enable signals $WEP_0$ to $WEP_7$ does not become identical to the "1" signal when the signal CSMP does not become identical to the "1" signal in the normal mode (as shown in FIG. 4). Similarly, all of the write enable signals WEP0 to WEP7 does not become identical to the "1" signal when the signal WPMP does not become identical to the "1" signal in the mask mode. Therefore, the word data are written into the memory unit #0M where both of the signals WPMP and CSMP become identical to the "1" signal.

Similarly, the select data can be sequentially supplied to the memory units in order to sequentially select the memory units #0M to #3M in turn. Thus, it is possible to write the word data into each plane within one memory cycle without newly supplying the address data to the memory units.

[III] COMPARE PROCESS (A) Diagrammatical Description For Compare Process

In the present embodiment, the D flip-flop DFF4 (shown in FIG. 7) is provided in each of eight bit interfaces $BTI_0$ to $BTI_7$ within each of the memory units #0M to #3M. These eight D flip-flops (DFF4) constitute a compare register. Hence, each of the compare registers CMP0 to CMP3 is provided within each of the memory units #0M to #3M. The compare registers are written in by predetermined complements to be compared. Then, the data are read out from the memory blocks MB0 to MB3 and are supplied to the compare registers CMP0 to CMP3 wherein the value of the read data is compared with that of the predetermined complements by every bits. The value of the output data of the compare register is turned to "1" when both values coincide with each other in the compare register. On the other hand, the value of the output data of the compare register is turned to "0" when both values do not coincide with each other in the compare register. Such output data of the compare register are outputted to the common data buses $IO_0$ to $IO_7$ by every bits. In this compare process, each bit and each memory unit can be masked.

Next, description will be given with respect to an example of the compared result in the case where the above compare process and the mask process are performed in conjunction with FIG. 24.

Figure 24:
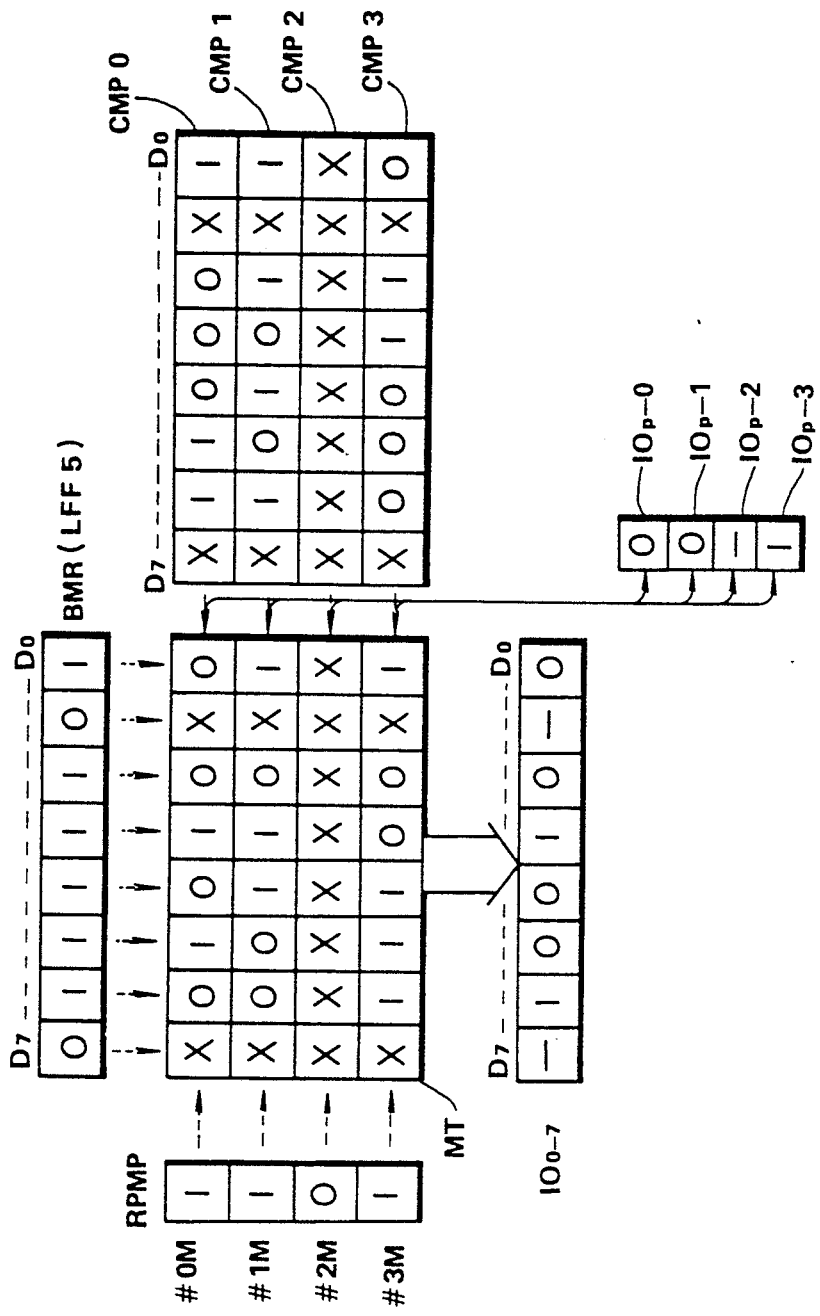
FIG. 24 is a drawing showing a data output state when the compare process is performed.

In a matrix MT shown in FIG. 24, respective rows of the matrix MT designate the data read out from the respective memory blocks MB0 to MB3. In addition, respective columns of the matrix MT designate the respective data to be outputted to the data bus $IO_i$.

BMR designates a bit mask register which is constituted by the eight L flip-flops LFF5 (shown in FIG. 7) within each of the memory units #0M to #3M. All of the four bit mask registers BMR within the memory units #0M to #3M are written with the same data as described later.

As described before, the value of the output signal RPMP of the selector 23 (shown in FIG. 8) corresponds to the content of the data stored in the D flip-flop DFF11 when the level of the signal PME is at the "1" level. Each of the values of the signals RPMP within the memory units #0M to #3M can be set independently.

Now, detailed description will be given with respect to the case where the values of the signals RPMP within the memory units and the values of the data stored in the bit mask register BMR and the compare registers CMP0 to CMP3 are all set as shown in FIG. 24. In the case where the read-out operation is performed in the word direction, the data shown in FIG. 24 are outputted via the common data buses $IO_7$ to $IO_0$. More specifically, the memory unit #2M is excluded from the comparing process because the level of the signal RPMP thereof is at the "0" level. Hence, the values of the read data and the values of the data stored in the compare register CMP2 are all identified as the "don't care values" (shown by "X"). Thus, the memory unit #2M is masked. On the other hand, the memory units #0M, #1M and #3M are not masked because the levels of the signals RPMP thereof are at the "1" level and read data are outputted respectively from these memory units. The bits of the above read data corresponding to the bits (the values of which equal to "0") of the data stored in the bit mask register BMR are masked and identified as the "don't care bits". Therefore, the values of the bits other than the masked bits within the read data are compared with those of the corresponding bits within the data stored in the compare registers CMP0, CMP1 and CMP3. This comparing process is performed by the exclusive OR operation, i.e., this comparing process is performed by use of the exclusive OR gate EXOR1 (shown in FIG. 7). More specifically, the data read out from the memory block are supplied to one input terminal of the exclusive OR gate EXOR1 via the buffer BFF2, and the output signal of the D flip-flop DFF4 (which constitutes the bit mask register) is supplied to another input terminal of the exclusive OR gate EXOR1 via the selector 14. The compared result of the exclusive OR gate EXOR1 is passed through the open drain type output data buffer 15 and is outputted to the data bus $IO_i$ on which the logical product operation is performed to the same bit number of the comparing result based on the open drain function. In FIG. 24, the data having the value "1" are outputted to the data buses $IO_6$ and $IO_3$ because the the output values of the exclusive OR gates EXOR1 at the same bit numbers within the memory units are all equal to "1" at the corresponding bits of the output data of the data buses, i.e., at the corresponding data buses $IO_6$ and $IO_3$. Therefore, it is possible to judge that the data values at the bits of the data (to be compared) stored in the compare register does not coincide with the data values at the corresponding bits of the read data in the memory units by detecting the value "1" in the bits of the data outputted to the data buses $IO_0$ to $IO_7$.

In the case where the read-out operation is performed in the pixel direction, the data outputted from the data buses $IO_p$-0 to $IO_p$-3 can be described by the data (00-1) as shown in FIG. 24. More specifically, the logical product operation is further performed on the result of the exclusive OR operation which is performed by bits in each memory unit, and the result of the above logical product is outputted to the data buses $IO_p$-0 to $IO_p$-3. As similar to the read-out operation in the word direction, the exclusive OR operation is performed in the exclusive OR gate EXOR1 (shown in FIG. 7), and the output signal of the exclusive OR gate EXOR1 is outputted to the data bus $IO_p$-0 (or the data buses $IO_p$-1 to $IO_p$-3) via the buffer BFF4 and the pixel output data buffer 24 (shown in FIG. 8) in series. On this data bus, the AND operation is performed based on the open drain function.

(B) Detailed Description Of Compare Process (1) Write-In Operation For Compare Registers CMP0 To CM3

The write-in operation for the compare registers CMP0 to CMP3 (i.e., the write-in operation for the D flip-flop DFF4) is performed by executing the command "Plane Compare Register" or "Compare Register" (shown in Table 1). Hereinafter, description will be given with respect to these commands respectively.

(i) "PLANE COMPARE REGISTER"

Figure 15:
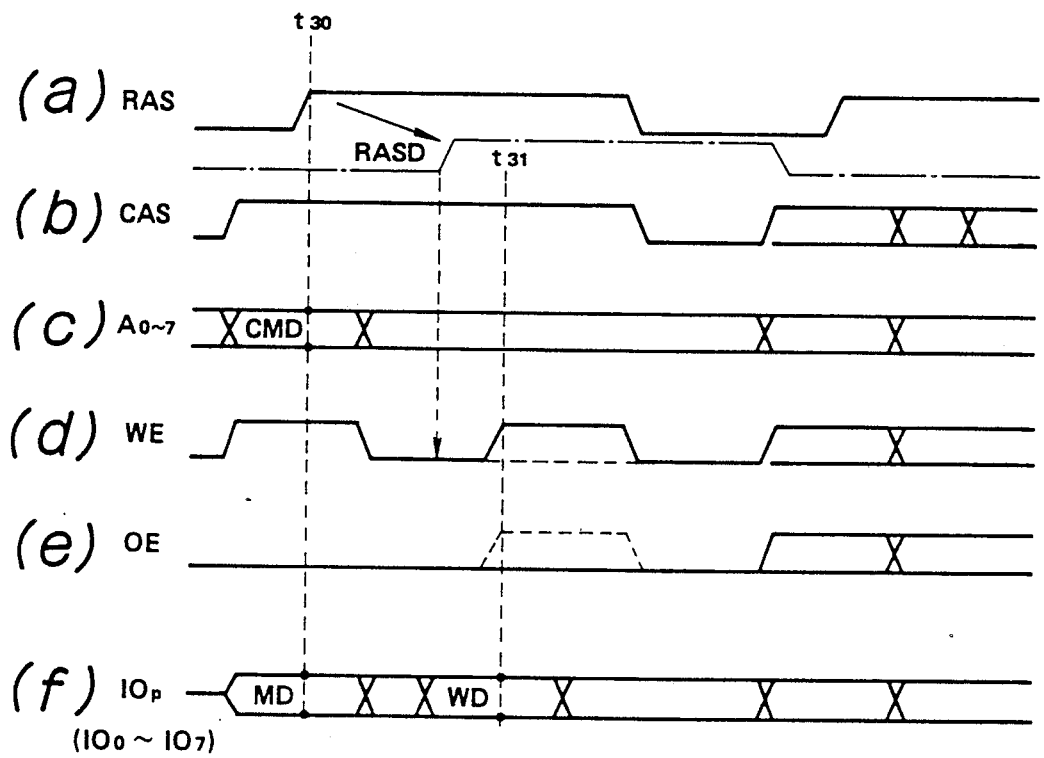

Similar to the command "Read Plane Mask" described before, the output timings for the control signals in the command "Plane Compare Register" are set identical to the timings shown in FIG. 15. More specifically, when a command code (12) (indicating the command "Plane Compare Register") is supplied to the memory units via the address buses A0 to A7, this code is stored in the command register 1 at the time $t_{30}$. Thus, the command data MC3, MC2, MC1 and MC0 (the binary number of which is described as (0010)) are supplied to the decoder 3, and the signal CME turns to the "0" signal. In addition, the command data MC0 to MC2 are supplied to the decoder 2 (shown in FIG. 5) so as to enable the OR gate OR11 to output the signal WTC. Further, the command data MC4 to MC6 are supplied to the main command decoder 4 so that the output signal RGA of the command decoder 4 turns to the "1" signal.

When the data to be written in are supplied to the pixel interface PXI-0 via the data bus $IO_p$-0 (shown in FIG. 8), such data are supplied to the 1-bit input terminal of the selector 11 (shown in FIG. 7) as the signal DIP via the buffer BFF10. In this case, the signal DIP is supplied to all of the selectors 11 of the bit interfaces within one memory unit. The selector 11 selects the 1-bit input terminal thereof and outputs the signal DIP to the D flip-flop DFF4 because the signal MCW is the "0" signal. At the time $t_{31}$ when the signal WE rises, the signal WEW (shown in FIG. 4) rises, whereby the decoder 2 is subject to the enable state and the decoder 2 turns the signal WTC to the "1" signal. When this signal WTC turns to the "1" signal, the D flip-flop DFF4 (shown in FIG. 7) starts to store the input data thereof. In other words, the data write-in operation for the compare register CMP0 to CMP3 is completed at this time.

This command "Plane Compare Register" is the command in which the data supplied from the data bus $IO_p$-0 (or the data buses $IO_p$-1 to $IO_p$-3) are simultaneously supplied to all of the D flip-flops within the bit interfaces $BTI_0$ to $BTI_7$. Therefore, in the case where the command "Plane Compare Register" is executed, all values of the data stored in all of the compare registers CMP0 to CMP3 are set to the same value "1" or "0".

(ii) "COMPARE REGISTER"

Similar to the command "Plane Compare Register", the output timings of the control signals in the command "Compare Register" are set identical to the timings shown in FIG. 15. More specifically, when a command code (15) (indicating the command "Compare Register") is supplied to the command control circuit CC via the address buses A0 to A7 at the time $t_{30}$ shown in FIG. 15, such command code is stored in the command register 1 (shown in FIG. 5) at the time $t_{30}$. Thus, the command data MC3, MC2, MC1 and MC0 (the binary number of which is described as (1001)) are supplied to the decoder 3 wherein the output signal LSE thereof turns to the "1" signal. In addition, the command data MC0 to MC2 are supplied to the decoder 2 so that the signals WTC and MCW can be outputted. Furthermore, the command data MC4 to MC6 are supplied to the main command decoder 4 wherein the signal RGA turns to the "1" signal.

Next, when the data of eight bits to be written in are supplied to the memory units via the data buses $IO_0$ to $IO_7$ (shown in FIG. 7), such data are supplied to the 0-bit input terminal of the selector 11 within each of the bit interfaces $BTI_0$ to $BTI_7$.

At the next time $t_{31}$ when the signal WE rises, the signal WEW (shown in FIG. 4) also rises, whereby the decoder 2 is subject to the enable state so that both of the signals WTC and MCW are turned to the "1" signal. Hence, the selector 11 selects the 0-bit input terminal thereof and the D flip-flop DFF4 starts to store the input data thereof. In this case, the compare data, which are supplied to the data buses $IO_0$ to $IO_7$, are stored in the D flip-flop DFF4 via the selector 11. Therefore, the data write-in operation for the compare register CMP0 to CMP3 is completed at the time $t_{31}$.

As is apparent from the above description, the command "Compare Register" is identical to the command in which the data of eight bits, which are supplied to the memory units via the data buses $IO_0$ to $IO_7$, are supplied to the D flip-flop DFF4 within each of the bit interfaces $BTI_0$ to $BTI_7$. Hence, in the case where the command "Compare Register" is performed, the values of the data stored in each of the compare registers CMP0 to CMP3 is set identical to the values of each bit of the data supplied to the data buses $IO_0$ to $IO_7$.

Above is the description for explaining the process of the commands "Compare Register" and "Plane Compare Register". In the case where these commands are executed, it is possible to select one of the memory units #0M to #3M and execute such commands to the selected memory unit. Hereinafter, description will be given with respect to the mask process.

Prior to the time when the signal RASW (shown in FIG. 4) rises, the data having the value "0" are supplied to the memory units to be masked and the data having the value "1" are supplied to the other memory units not to be masked via the data buses $IO_p$-0 to $IO_p$-3 (shown in FIG. 8). Such data are passed through the buffer BFF10 (shown in FIG. 8) and supplied to the input terminal of the L flip-flop LFF10 wherein such data are stored therein at the leading edge timing of the signal RASW. Since the output signal FCS of the L flip-flop LFF10 is supplied to the 1-bit input terminal of the selector 21, the value of the output signal CSMP of the selector 21 coincides with that of the mask data stored in the L flip-flop LFF10 when value of the signal BCE is equal to "1". This signal CSMP is supplied to the AND gate AN35 (shown in FIG. 5) so as to control the main command decoder 4 to be enabled or disenabled. Hence, the level of output signal of the AND gate AN35 does not turn to the "1" level when the value of the mask data supplied to the L flip-flop LFF10 is equal to "0", whereby the main command decoder 4 is not subject to the enable state. For this reason, the level of the signal RGA does not turn to the "1" level so that the decoder 2 is not subject to the enable state. As a result, the level of the signal WTC does not turn to the "1" level so that the D flip-flop DFF4 (shown in FIG. 7) does not store the input data thereof. In conclusion, the commands "Plane Compare Register" and "Compare Register" are not executed in the memory units which are supplied with the mask data having the value "0".

As is apparent from the above description, the compare registers to be written in are pre-selected, hence, the compare data can be written in the selected compare registers. In the case where the write-in operation of the compare data is performed as shown in FIG. 24, one of the compare registers CMP0 to CMP3 is selected by the above-mentioned process and the compare data are written into the selected compare registers in turn.

(2) Compare Process At Data Read Cycle

Next, description will be given with respect to the compare process at the data read cycle.

First, the command "Compare Data Enable" (shown in Table 1) is executed in order to designate the compare process. This command is executed at the timing shown in FIG. 12. More specifically, the command code (03) is supplied to the command control circuit CC via the address buses A0 to A7 and is stored in the command register 1 at the time $t_{10}$, whereby the command data MC3, MC2, MC1 and MC0 (i.e., the command data (0011)) are supplied to the decoder 3 wherein the level of the signal CME is set to the "1" level. In order to perform the read-out operation in the word direction, the command "Word Access Mode" is further executed by the timing shown in FIG. 12. As a result, the command data MC3, MC2, MC1 and MC0 (i.e., the command data (0000)) are supplied to the decoder 3 wherein the level of the signal PAM is set to the "0" level. Next, the read-out operation is performed by the timing shown in FIG. 10 in order to perform the data read-out operation according to the mask mode. In this case, the access is given to the certain address of the memory units, during the period between the times $t_1$ and $t_2$, wherein the data thereof are read out at the time $t_4$ and this read data are supplied to one input terminal of the exclusive OR gate EXOR1 via the buffer BFF2 (shown in FIG. 7). In addition, the selector 14 selects the 1-bit input terminal thereof because the signal CME is identical to the "1" signal, hence, the compare data stored in the D flip-flop DFF4 are supplied to the another input terminal of the exclusive OR gate EXOR1. Thus, the exclusive OR result can be obtained between the read data and the compare data in the exclusive OR gate EXOR1, and such result is outputted to the data bus $IO_i$ via the output data buffer 15. This output data buffer 15 is subject to the enable state under the condition where the levels of the signals MKA, $BM_i$ and RPMP are all equal to the "1" level and the level of the signal PAM is equal to the "0" level. Among these signals, the level of the signal MKA is always set at the "1" level in the mask mode, and the level of the signal PAM is set at the "0" level when the command "Word Access Mode" is executed. Therefore, the levels of the signals $BM_i$ and RPMP determines whether the output data buffer 15 is subject to the enable state or not. However, the levels of the signals $BM_i$ and RPMP are predetermined in the write-in operation of the mask data described before. More specifically, the output data buffer 15 is not subject to the enable state and the data of the masked bits are not outputted because the levels of the signals $BM_i$ and RPMP are both set at the "0" level at the masked bits.

Figure 12:
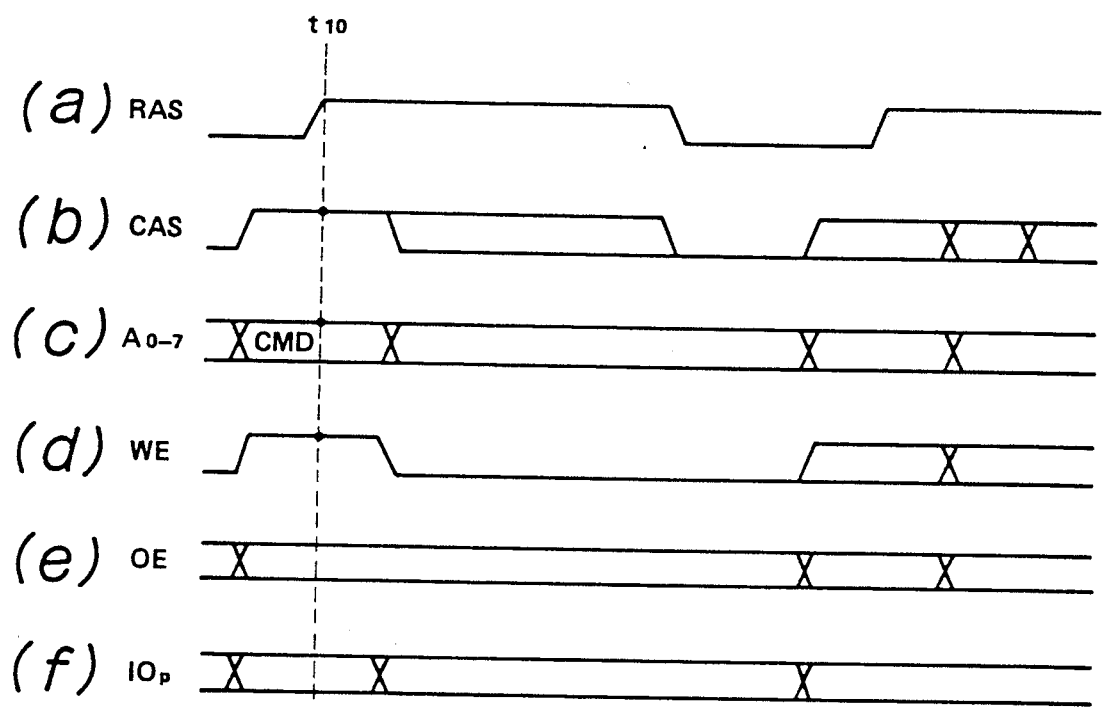
FIGS. 12 and 15 are timing charts showing command write-in cycles.

Meanwhile, in order to perform the access operation in the pixel direction, the command "Pixel Access Mode" must be executed by the timing shown in FIG. 12. As a result, the command code (01) is written into the command register 1 (shown in FIG. 5) at the time $t_{10}$ (shown in FIG. 12), and the command data MC3, MC2, MC1 and MC0 (i.e., the command data (0001)) are supplied to the decoder 3 wherein the signal PAM is turned to the "1" signal. Next, in order to perform the data read-out operation according to the mask mode, the readout operation is performed by the timing shown in FIG. 10. As a result, the data are read out from the memory units at the time $t_4$ (shown in FIG. 10) and such read data are supplied to one input terminal of the exclusive OR gate EXOR1 via the buffer BFF2 (shown in FIG. 7). In addition, the selector 14 selects the 1-bit input terminal thereof because the signal CME is identical to the "1" signal, hence, the compare data stored in the D flip-flop DFF4 are supplied to another input terminal of the exclusive OR gate EXOR1. Thus, the exclusive OR result can be obtained between the read data and the compare data in the exclusive OR gate EXOR1, and such result is outputted to the data bus $IO_p$-0 (or the data buses $IO_p$-1 to $IO_p$-3) via the buffer BFF4 and the pixel output data buffer 24 in series. This pixel output data buffer 24 is subject to the enable state under the condition where both of the buffers BFF4 and BFF5 are subject to the enable state. These buffers BFF4 and BFF5 are subject to the enable state under the condition where all of the signals MKA, $BM_i$, RPMP and PAM are identical to the "1" signal. As described before, the level of the signal MKA is always set at the "1" level in the mask mode, and the level of the signal PAM is turned to the "1" level when the command "Pixel Access Mode" is executed. Therefore the levels of the signals $BM_i$ and RPMP determines whether the buffers BFF4 and BFF5 are both subject to the enable state or not. More specifically, the pixel output data buffer 24 is not subject to the enable state and the data at the masked bits are not outputted because the levels of the signals $BM_i$ and RPMP are both set at the "0" level at the masked bits.

If the compare process is performed on all of the memory units #0M to #3M in the data read cycle, the following advantage can be obtained.

Since the logical product according to the open drain operation is obtained on the data buses $IO_0$ to $IO_7$ (as shown in FIG. 24), it can be understood that the values of the compare data coincide with those of the data at all of bits within the memory units #0M to #3M when values of all of the data outputted on the data buses $IO_0$ to $IO_7$ are identical to the value "1". In other words, based on the values of the data of eight bits outputted on the data buses $IO_0$ to $IO_7$, it is possible to detect whether the values of the compare data coincide with those of the data at all of bits within the memory units #0M to #3M or not in only one memory cycle. In short, it is possible to simultaneously detects whether the values of the compare data coincide with the values of the read data within all of the memory units #0M to #3M. Furthermore, it is possible to obtain the above-mentioned advantage in the compare process performed in the pixel direction since the logical product according to the open drain operation is performed on all bits within the memory units #0M to #3M.

Above is the description for explaining the compare process and the mask process in the data read-out cycle.

Incidentally, the complements of the compare data are written into the compare registers, however, it is possible to constitute the memory units to be written with the compare data themselves (by constituting the exclusive OR gate EXOR1 to have one negative logical input terminal, for example).

[IV] LOGICAL OPERATION PROCESS

Figure 25:
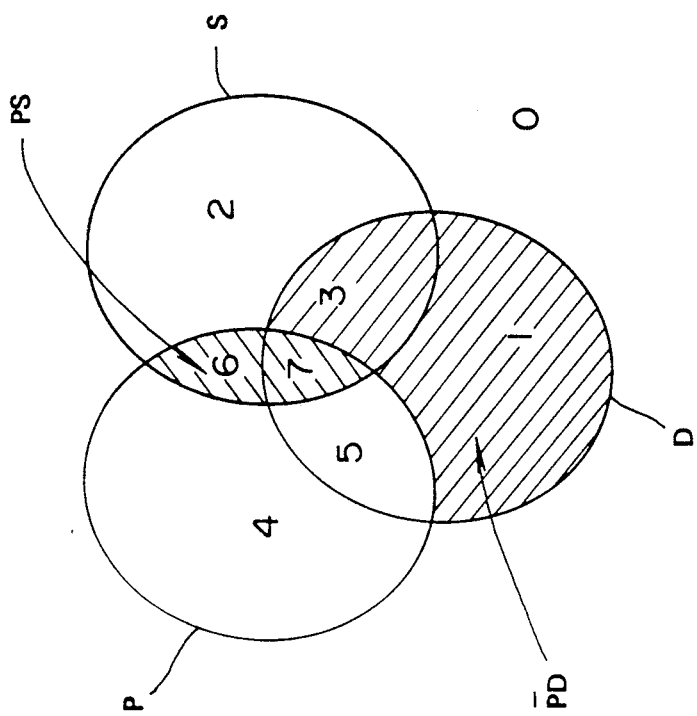
FIG. 25 is a drawing for explaining a logical operation.

Next, description will be given with respect to the logical operation process in conjunction with FIGS. 25 and 26.

(A) Diagrammatical Description of Logical Operation Process

First, diagrammatical description will be given with respect to the logical operation process. The data supplied in the write cycle are stored in a source register (i.e., the D flip-flop DFF1 shown in FIG. 7), the respective data are written into a destination register (i.e., the D flip-flop DFF2) and a pattern register (i.e., the D flip-flop DFF3) in accordance with the predetermined commands before the logical operation is performed. Several kinds of the logical operations are performed among the above registers and results thereof are written into the memories. The logical operation result R can be expressed by the following formula which includes eight terms, regardless of the form of the logical operation formula.

$$R = b_7 PSD + b_6 P\overline{S}D + b_5 PSD + b_4 P\overline{S}\overline{D} + b_3 \overline{P}SD + b_2 \overline{P}S\overline{D} + b_1 \overline{P}\overline{S}D + b_0 \overline{P}\overline{S}\overline{D} \quad (1)$$

In the above formula (1), P, S and D designate the respective contents of data respectively stored in the pattern register, the source register and the destination register, and the characters P, S and D with the upper bars designate the inverted contents (values) of data stored in respective registers. In the formula (1), the values of the coefficients $b_7$ to $b_0$ will be set to "1" or "0" based on the content of the logical operation. As is apparent from the formula (1), the addition operation of the formula (1) excludes the term in which the value of the coefficient is set equal to "0". FIG. 25 is provided for explaining the meaning of the terms corresponding to the coefficients $b_7$ to $b_0$. In FIG. 25, circles P, S and D correspond to the pattern register, the source register and the destination register respectively. Each of the areas designated by the numerals "1" to "7" represents the term of the same coefficient. For example, the area 1 designates the term $\overline{P}\overline{S}D$ corresponding to the coefficient $b_1$, and the area 7 designates the term PSD corresponding to the coefficient $b_7$. Next, description will be given with respect to an example of the logical operation, i.e., the addition operation where the $\overline{P}S$ (corresponding to the areas 6 and 7) is added to the PD (corresponding to the areas 1 and 3). According to this addition operation, the result thereof can be shown as the hatched area (i.e., the areas 1, 3, 6 and 7). In this case, the formula $PS + \overline{S}D$ can be transformed into the following formula (2).

$$PS + PD = PS(D + \overline{D}) + P(S + \overline{S})D = PSD + PS\overline{D} + P\overline{S}D + PSD \quad (2)$$

As is apparent by comparing the above formulae (1) and (2), the formula (2) becomes identical to the formula (1) if the coefficients ($b_7, b_6, b_5, b_4, b_3, b_2, b_1, b_0$) are set equal to (1, 1, 0, 0, 1, 0, 1, 0). In other words, the formula (2) can be obtained by setting the four terms effective and setting the other four terms non-effective in the formula (1). The first term of the formula (2) corresponds to the area 7 shown in FIG. 25. Similarly, the second, third and fourth terms of the formula (2) respectively corresponds to the areas 6, 3 and 1. Therefore, the total sum of the above four areas is identical to the hatched area shown in FIG. 25. Thus, it is clearly understood from FIG. 25 that the formula (2) is correct. As similar to the above-mentioned case, it is possible to express all of the logical operations by suitably setting the values of the coefficients ($b_7, b_6, b_5, b_4, b_3, b_2, b_1, b_0$) in the formula (1).

In FIG. 7, the above coefficients ($b_7, b_6, b_5, b_4, b_3, b_2, b_1, b_0$) respectively correspond to the signals ROC0 to ROC7 supplied to the respective 0-bit to 7-bit input terminals of the selector 12. Hence, the above-mentioned logical operation is performed by the select operation of the selector 12. More specifically, the output signals of the D flip-flop DFF2 (constituting the destination register), the D flip-flop DFF1 (constituting the source register) and the D flip-flop DFF3 (constituting the pattern register) are respectively supplied to the 0-bit, 1-bit and 2-bit select terminals of the selector 12. If the values of these output signals are set identical to "1", the respective output signals represent the values D, S and P. On the other hand, if the values of these output signals are set identical to "0", the respective output signals represent the values $\overline{D}, \overline{S}$ and $\overline{P}$. Hence, a group of these output signals supplied to the select terminals of the selector 12 represents one of the terms in the formula (1). In addition, when the level of the signal ROX is set identical to the "1" level, the selector 12 selects the desirable signals from the signals ROC0 to ROC7 based on the data of three bits (i.e., the three signals supplied to the select terminals of the selector 12). As a result, each term within the terms of the formula (1) meets with the corresponding coefficient in the selector 12. Therefore, the operation of the selector 12 is actually identical to the logical operation of the formula (1). If the levels of the signals ROC0 to ROC7 (corresponding to the values of the signals supplied to the 0-bit to 2-bit select terminals of the selector 12) are all set to the "1" level, the selector 12 outputs the "1" signal from the output terminal Y thereof. On the other hand, if the above levels of the signals ROC0 to ROC7 are all set to the "1" level, the selector 12 outputs the "0" signal from the output terminal Y thereof.

(B) Data Write-In Operation of Each Register

Next, description will be given with respect to the data write-in operations of the source register, the pattern register and the destination register.

(1) Write-In Operation of Source Register

If the write cycle is set, the write-in operation of the source register can be performed in accordance with the normal write-in operation. More specifically, the write-in operation of the source register is completed at the timing when both levels of the signal RASW and the write enable signal WE (shown in FIG. 4) turn to the "1" level because the D flip-flop DFF1 (shown in FIG. 7) starts to store the output signal of the selector 10 when the level of the signal WEW turns to the "1" level. In the case where the signal PAM is identical to the "1" signal and the signal NMA is identical to the "0" signal, the data in the pixel direction are supplied from the data bus $IO_p$-0 or (the data buses $IO_p$-1 to $IO_p$-3) and are written into the source register. In other cases, the data in the word direction are supplied from the data bus $IO_i$ and are written into the source register.

On the other hand, when the signal ROX is identical to the "0" signal, the data written in the D flip-flop DFF1 are supplied to the memory $M_i$ via the selector 12, the buffer BFF3 and the data bus $DT_i$ in series.

(2) Write-In Operations of Pattern and Destination Registers

The write-in operations of the pattern register and the destination register are performed by the three kinds of processes described hereinafter.

In a first process, the command "Plane Pattern Register" or "Plane Destination Register" is executed in order to supply the data of one bit in the pixel direction via the data bus $IO_p$-0 (or the data buses $IO_p$-1 to $IO_p$-3) and write such data into all bits of the pattern register or the destination register at one time.

In a second process, the command "Pattern Register" or "Destination Register" is executed in order to supply the data of eight bits in the word direction via the data bus $IO_0$ to $IO_7$ and write such data into the desirable bits of the pattern register or the destination register.

In a third process, the command "Pattern Load Enable" or "Destination Load Enable" is executed in order to read out the data from the memory blocks MB0 to MB3 and write such read data into the desirable bits of the pattern register or the destination register.

Next, description will be given with respect to each command in the above three processes.

(i) Commands "Plane Pattern Register", "Plane Destination Register"

The command "Plane Pattern Register" is executed by the timings shown in FIG. 15. More specifically, the command code (13) is supplied to the command control circuit CC via the address buses A0 to A7 at the time $t_{30}$ shown in FIG. 15. This command code (13) is latched in the command register 1 (shown in FIG. 5) wherein the command data MC0 to MC7 are outputted therefrom. As a result, the data having the value "3" are outputted from the command register 1 and are supplied to the input terminals of the decoder 2, and the main command decoder 4 sets the signal RGA to the "1" signal. Next, the write data having the value "1" or "0" are supplied to the data bus $IO_p$-0 just before the time $t_{31}$. Such write data (the signal DIP) are passed through the buffer BFF10 (shown in FIG. 8) and supplied to the 1-bit input terminal of the selector 11 (shown in FIG. 7). As shown in FIG. 15, the signal WE rises at the time $t_{31}$, whereby the signal WEW (shown in FIG. 4) rises. When the signal WEW rises, the decoder 2 is subject to the enable state, whereby the signal WTP rises up to the "1" signal. Further, when the signal WTP rises, the D flip-flop DFF3 (constituting the pattern register) starts to store the output data of the selector 11. At this time, the selector 11 selects the 1-bit input terminal thereof because the level of the signal MCW is identical to the "0" level and the level of the signal MCC is identical to the "1" level. As a result, the data are supplied to the 1-bit input terminal of the selector 11 via the data bus $IO_p$-0, and such data are passed through the selector 11 and stored in the D flip-flop DFF3 at the time $t_{31}$. At this time, the write-in operation of the pattern register is completed.

Next, description will be given with respect to the command "Plane Destination Register". Similar to the above command "Plane Pattern Register", this command "Plane Destination Register" is executed by the timings shown in FIG. 15, and the write-in operation of the destination register is quite similar to that of the pattern register. More specifically, the command code (14) is supplied to the command control circuit CC via the address buses A0 to A7 at the time $t_{30}$. In addition, the predetermined data are supplied to the pixel interface PXI-0 via the data bus $IO_p$-0 at the time $t_{31}$. At this time $t_{31}$, the decoder 2 (shown in FIG. 5) turns the signal WTD to the "1" signal. As a result, the predetermined data are passed through the selector 11 and stored in the D flip-flop DFF2. Thus, the write-in operation of the destination register is completed.

(ii) Commands "Pattern Register", "Destination Register"

Similar to the above-mentioned commands, the command "Pattern Register" is executed by the timings shown in FIG. 15. First, the command code (16) is supplied to the command control circuit CC via the address buses A0 to A7. The command register 1 (shown in FIG. 5) latches this command code at the leading edge timing $t_{30}$ of the signal RAS and outputs the corresponding command data MC0 to MC7. As a result, the data having the value "6" are supplied to the input terminals of the decoder 2, and the main command decoder 4 outputs the signal RGA. Next, the write data are supplied to the data buses $IO_0$ to $IO_7$ just before the time $t_{31}$. Such write data are supplied to the 0-bit input terminal of the selector 11 via the buffer BFF1 within the bit interface $BTI_i$. Hence, the decoder 2 sets the signals MCW and WTP to the "1" signal when the write enable signal WE and the signal WEW rises at the time $t_{31}$. As a result, the D flip-flop DFF3 (shown in FIG. 7) stores the output signal of the selector 11. At this time, the selector 11 selects the 0-bit input terminal thereof because both levels of the signals MCW and MCC are set identical to the "1" level, whereby the data supplied on the data bus $IO_i$ are stored in the D flip-flop DFF3. This storing operation is performed in all of the bit interfaces $BTI_0$ to $BTI_7$ at the same time, hence, the the data write-in operation is performed completely on the desirable bits of the pattern register. In addition, this write-in operation is performed in the other memory units at one time. However, this write-in operation is not performed on the pattern register within the memory unit where the signal CSMP (i.e., the output signal of the selector 21 shown in FIG. 8) is identical to the "0" signal, because the signal MCST (shown in FIG. 5) is not turned to the "1" signal so that the main command decoder 4 is not subject to the enable state.

Next, description will be given with respect to the command "Destination Register". The write-in operation in this command "Destination Register" (having the command code (17)) is similar to that in the command "Pattern Register", except that the write data are written into the D flip-flop DFF2. More specifically, the decoder 2 sets the signal WTD to the "1" signal when the signal WE rises at the time $t_{31}$ shown in FIG. 15, whereby the write data supplied from the data bus IO$_i$ are supplied to and written into the D flip-flop DFF2 via the selector 11.

(iii) Commands "Pattern Load Enable", "Destination Load Enable"

The command "Pattern Load Enable" is executed as described hereinafter. The command control circuit CC is supplied with the command code of this command. The binary number of the upper data of four bits within the command code is equal to (0011), and the 1-bit value of the lower data within the command code is equal to "1", and other bits of the lower data are set as the "don't care bits". Hence, the signal MC1 having the "1" level is supplied to the input terminal D of the register 7 (shown in FIG. 5), and the main command decoder 4 sets the signal RLC to the "1" signal so that the register 7 is subject to the enable state. As a result, the signal PLE turns to the "1" signal, hence, one input terminal of the AND gate AN37 is set to the "1" level. In this case, the AND gate AN37 outputs the "1" signal so as to set the signal WTP to the "1" signal if the output signal of the AND gate AN39 is identical to the "1" signal. When this signal WTP rises up to the "1" signal, the D flip-flop DFF3 (shown in FIG. 7) starts to store the input data thereof. At this time, the AND gate AN39 outputs the "1" signal under the condition where the signals BM$_i$, CASW, OEE and MKA are all identical to the "1" signal. However, the value of the signal BM$_i$ is defined at the time when the value of the mask register is set, and the signal CASW becomes identical to the "1" signal at the leading edge timing of the column address strobe signal CAS, furthermore, the signal MKA has been already set to the "1" signal when the mask mode was set. In addition, the signal OEE becomes identical to the "1" signal at a certain time when the predetermined time has been passed after the output enable signal OE of the output data buffer 15 rises. In other words, the AND gate AN39 outputs the "1" signal at the above certain time. Therefore, if the read cycle (shown in FIG. 10) is started after the command "Pattern Load Enable" is executed, the signal rises up to the "1" signal when the predetermined time is passed after the leading edge timing t$_3$ of the output enable signal OE. Thus, the read data read out from the memory M$_i$ are supplied to and stored in the D flip-flop DFF3 via the buffer BFF1 and the selector 11 in series when the signal OEE rises up to the "1" signal. In short, the read data are written into the pattern register at the same time when such read data are read out from the memory in the read cycle. Thus, in order to write the read data into the pattern register at the timing when such read data are completely read out from the memory (i.e., at the timing when the read data are defined), the leading edge timing of the signal OEE must be delayed by the leading edge timing of the output enable signal OE.

Figure 26:
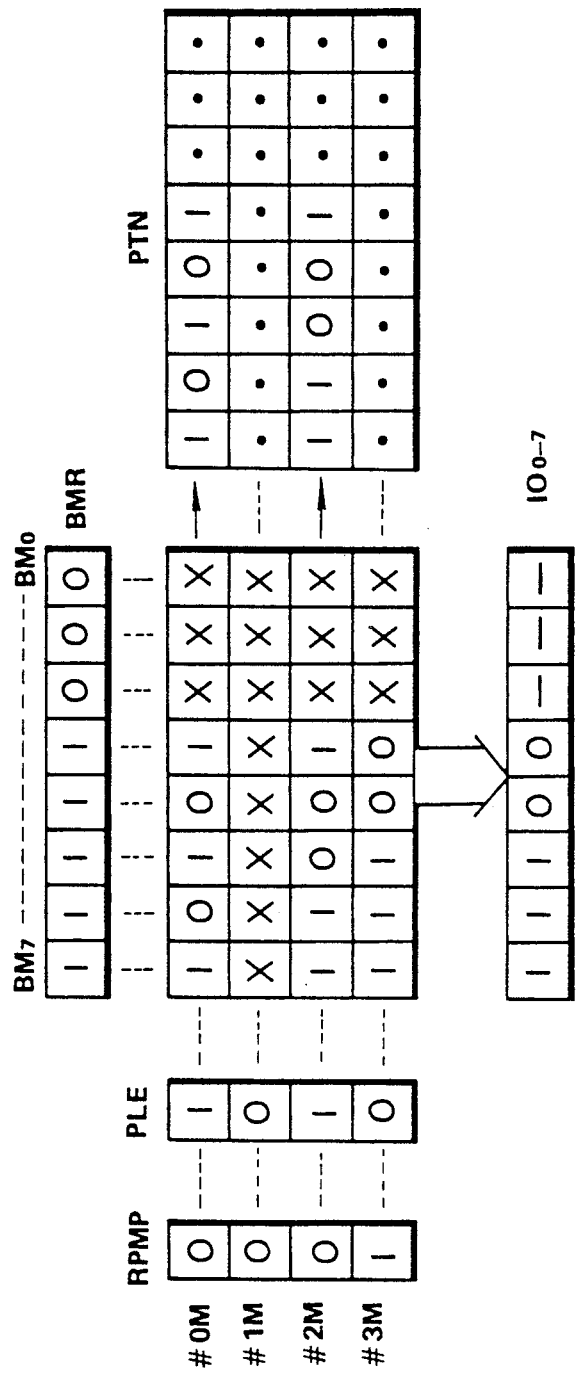
FIG. 26 is a drawing showing a data output state when a "pattern load enable" command is executed.

FIG. 26 shows an example in which the command "Pattern Load Enable" is executed. As is apparent from FIG. 26, the signals RPMP and BM$_i$ are given with the mask function in the read control operation from the memory, and the signals PLE and BM$_i$ are given with the mask function in the write-in operation of the pattern register. In FIG. 26, dots "''" represent the bits where the data are not written in.

Similar to the command "Pattern Load Enable", the command "Destination Load Enable" is executed. The command control circuit CC is supplied with the command code designating the command "Destination Load Enable". The binary number of the upper data of four bits within this command code is equal to (0011), and the value of the 2-bit of the lower data within this command code is equal to "1", and the other bits of this lower data are identified as the "don't care bits". In this case, the signal MC2 having the "1" level is supplied to the input terminal of the register 7 (shown in FIG. 5), and main command decoder 4 sets the signal RLC to the "1" signal so that the register 7 is subject to the enable state. As a result, the signals DLE and WTD both rises up to the "1" signal. Therefore, the D flip-flop DFF3 (constituting the destination register) stores the output data of the selector 11. As is apparent from the above description, the mask operation in the command "Destination Load Enable" is identical to that in the command "Pattern Load Enable" (as shown in FIG. 26).

In order to simultaneously execute both of commands "Pattern Load Enable" and "Destination Load Enable", a certain command code must be supplied to the command control circuit CC. More specifically, the binary number of the upper data of four bits within the certain command code are described as (0011), and the values of the 1-bit and 2-bit of the lower data within the certain command code are both identical to "1", and other bits of the lower data are identified as the "don't care bits".

(C) Coefficient Setting Process For Logical Operation

Next, description will be given with respect to the process for setting the coefficients b$_7$ to b$_0$ in the formula (1). The values of the lower coefficients b$_3$ to b$_0$ are determined by executing the command "Raster Operation Code (LOW)" (shown in Table 2), and the values of the upper coefficients b$_7$ to b$_4$ are determined by executing the command "Raster Operation Code (HIGH)". Hereinafter, description will be given with respect to these commands.

The command "Raster Operation Code (LOW)" is designated by a command code of eight bits. The binary number of the upper data of four bits within this command code is set identical to (0011), and the values of the bits of the lower data thereof are set corresponding to the values of the coefficients b$_3$, b$_2$, b$_1$ and b$_0$ (as shown in Table 2). When such command code is supplied to the command control circuit CC via the address buses A0 to A7 at the time t$_{10}$ (shown in FIG. 12), the command register 1 latches this command code and outputs the command data MC0 to MC7. As a result, the input terminals of the register 8 are supplied with the signals MC3, MC2, MC1 and MC0, the values of which correspond to those of the coefficients b$_3$, b$_2$, b$_1$ and b$_0$ respectively. In addition, main command decoder 4 sets the signal ROL to the "1" signal. Hence, the register 8 is subject to the enable state, and the register 8 outputs the signals ROC3, ROC2, ROC1 and ROC0, the values of which correspond to those of the coefficients b$_3$, b$_2$, b$_1$ and b$_0$ respectively. These signals ROC3 to ROC0 are supplied to the 3-bit to 0-bit input terminals of the selector 12 (shown in FIG. 7), thus, the process for setting the coefficients b$_3$ to b$_0$ is completed.

Next, the command "Raster Operation Code (HIGH)" is executed by another command code of eight bits. The binary number of the upper data of four bits within this command code is set identical to (0101), and the values of the lower data of four bits are set corresponding to those of the coefficients b$_7$, b$_6$, b$_5$ and b$_4$. When such command code is supplied to the command register 1 by the timing shown in FIG. 12, the input terminals of the register 9 are supplied with the command code MC3, MC2, MC1 and MC0 corresponding to the coefficients $b_7$, $b_6$, $b_5$ and $b_4$, and the main command decoder 4 sets the signal ROU to the "1" signal. As a result, the register 9 is subject to the enable state, and the register 9 outputs the signals ROC7, ROC6, ROC5 and ROC4 corresponding to the coefficients $b_7$, $b_6$, $b_5$ and $b_4$ respectively. These signals ROC7 to ROC4 are supplied to the 7-bit to 4-bit input terminals of the selector 12 (shown in FIG. 7), whereby the process for setting the coefficients $b_7$ to $b_4$ is completed.

As described heretofore, the commands "Raster Operation Code (LOW)" and "Raster Operation Code (HIGH)" must be executed in order to set the coefficients $b_0$ to $b_7$.

(D) EXECUTION OF LOGICAL OPERATION

Next, description will be given with respect to the execution of the logical operation performed based on the contents of data stored in the pattern register, the destination register and the source register and the values of the coefficients $b_7$ to $b_0$, as well.

In order to perform the logical operation, the command "Raster Operation Enable" (shown in Table 2) must be executed. More specifically, a command code (0F) is supplied to the address buses A0 to A7 at the time $t_{10}$ shown in FIG. 12. As a result, the command register 1 sets each value of the command data MC3, MC2, MC1 and MC0 to "0" and outputs the command data MC3 to MC0 to the decoder 3. In this case, the output signal MDS of the AND gate AN31 is turned to the "1" signal so that the decoder 3 is subject to the enable state, whereby the decoder 3 sets the signal ROE to the "1" signal. Meanwhile, the signal MKA is turned to the "1" signal in the mask mode. Hence, when the signal ROE is turned to the "1" signal, the output signal ROX of the AND gate AN32 is turned to the "1" signal. Due to this signal ROX having the "1" level, the level at the 3-bit select terminal of the selector 12 is set to the "1" level. In this case, above 3-bit select terminal of the selector 12 is identified as the negative logical terminal, hence, the decimal digit of the data supplied to the 0-bit to 3-bit select terminals does not exceed the value "8" when the signal ROX is turned to the "1" signal. Therefore, the output signal $SRC_i$ of the D flip-flop DFF7 (i.e., the source register) is not supplied to the memory $M_i$ via the selector 12, and all of the output signals of the D flip-flops DFF1, DFF2 and DFF3 work as the select signals. The output signals of the D flip-flops DFF1, DFF2 and DFF3 represent the terms S, D and P respectively in the formula (1) when the levels thereof are all equal to "1". On the other hand, the output signals of the D flip-flops DFF1, DFF2 and DFF3 represent the terms $\bar{S}$, $\bar{D}$ and $\bar{P}$ in the formula (1) when the levels thereof are all equal to "0". Hence, the select operation of the selector 12 corresponds to the logical operation shown in the formula (1). In this case, the write-in operation of the D flip-flop DFF1 (i.e., the source register) is performed in the normal write cycle (shown in FIG. 16), hence, the contents of data stored in the source register can be exchanged by every memory cycles.

As described heretofore, the present embodiment is advantageous in that it is possible to perform the logical operation between the data stored in the destination register, the pattern register and the source register with ease and with a relatively high speed, whereby it is possible to perform the processes of an image composition, a blanking display and a partial image removing and the like with a relatively high speed. In addition, it is also advantageous in that a process for designating the logical operation can be simplified even in the case where there are many kinds of color data to be operated and there are many kinds of the logical operations.

In the above-mentioned embodiment, the data are immediately exchanged by other data in the destination register and the pattern register. However, in the present constitution of the memory device, it is possible to exchange the data in the registers for storing data for comparison and detection with a high speed.

In addition, the parameters are written into the memory units via respective input/output data buses $IO_p$-0 to $IO_p$-3 in the pixel direction, and the parameters are also written into the memory units via the common input/output data buses $IO_0$ to $IO_7$ in the word direction. The data buses $IO_0$ to $IO_7$ in the word direction are connected in common to the memory units. However, it is possible to set independent parameters in each memory unit by masking each memory unit by use of the signal CSMP shown in FIG. 8 (or the signals PLE and DLE shown in FIG. in a parameter write-in operation.

[V] PRECHARGE OPERATION OF DATA BUS

Next, description will be given with respect to the precharge operation of the data bus in conjunction with FIG. 7.

Figure 27:
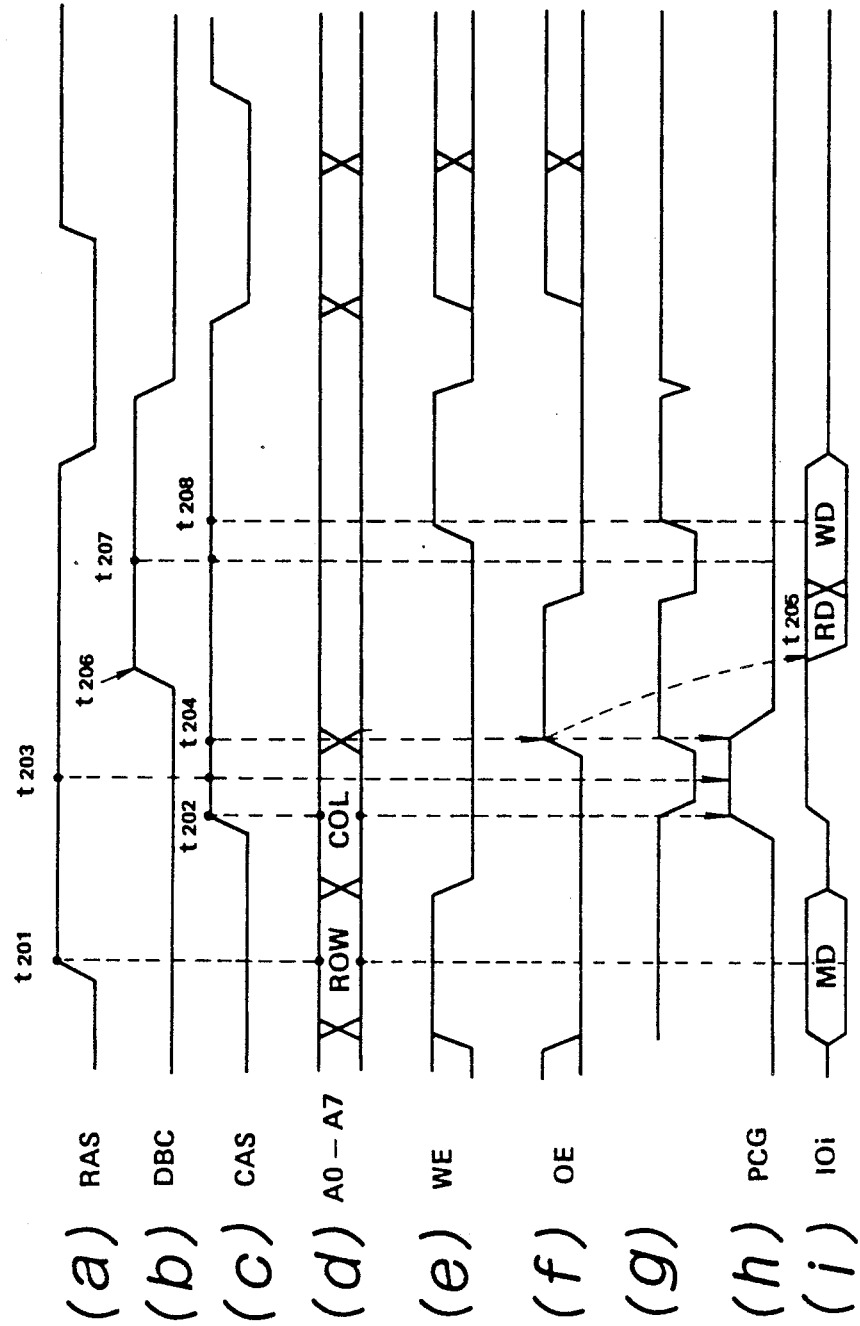
FIG. 27 is a timing chart for explaining a precharge operation.

FIG. 27 is a timing chart showing an example of waveforms of several parts within the memory unit #0M in the case where the data buses are precharged and a read modify write operation is performed. In FIG. 27, the command "Data Buffer Open Drain" has been already executed and the signal DBT (shown in FIG. 5) is set identical to the "0" signal. In addition, the following description will be given with respect to the case where the data are read out from the memories $M_0$ to $M_7$ in the word direction.

First, when the row address strobe signal RAS rises at a time $t_{201}$, the row address data are supplied to the command control circuit CC via the data buses A0 to A7 so that the row addresses are defined. As shown in FIG. 27(i), mask data (MD) are supplied to the memories $M_0$ to $M_7$ via the data bus $IO_i$ so as to designate the mask for each bit at the time $t_{201}$. However, this mask data do not relate to the essential part of the present invention, hence, the description thereof will be omitted.

Next, when the column address strobe signal CAS rises at a time $t_{202}$, the column address data are supplied to the command control circuit CC via the data buses A0 to A7 so that the all addresses for being given with access is defined. In addition, the level of the data bus control signal DBC (shown in FIG. 27(b)) is set to the "0" level, the level of the column address strobe signal CAS (shown in FIG. 27(c)) is set to the "1" level, the level of the write enable signal WE (shown in FIG. 27(e)) is set to the "0" level and the level of the output enable signal OE (shown in FIG. 27(f)) is set to the "0" level at the time $t_{202}$, hence, the signal PCG becomes identical to the "1" signal (as shown in FIG. 4). At this time, the AND gate AN101 (shown in FIG. 9) outputs the "1" signal to the gate of the field effect transistor FET1 via the OR gate OR101. Hence, the transistor FET1 is turned on and the data bus $IO_i$ starts to be charged by use of the resistor R101 and the transistor FET1. In this case, the resistance of the resistor R101 connected to the drain of the transistor FET1 is not so large, hence, the time constant determined by the resistance of the resistor R101 and the floating capacity of the data bus $IO_i$ is relatively small. Due to the small time constant, the data bus $IO_i$ is charged rapidly, and this charging is almost completed at a time $t_{203}$ shown in FIG. 27.

At a next time $t_{204}$, the output enable signal OE rises up to the "1" signal. When a predetermined time lag originated by element characteristics within the memory unit #0M is passed after the time $t_{204}$, the data bus $IO_i$ is supplied with the read data (RD) read out from the memories $M_0$ to $M_7$ by the access which starts to be performed at the times $t_{101}$ and $t_{102}$ (as shown at a time $t_{205}$ in FIG. 27(i)).

Meanwhile, when the output enable signal OE rises up to the "1" signal at the time $t_{204}$, the signal PCG falls down to the "0" signal. Hence, both of the output signals of the AND gate AN101 and the OR gate OR101 become identical to the "0" signal so that the transistor FET1 is turned off. In other words, the positive voltage is continuously supplied to the data bus $IO_i$ via the resistor R101, however, this positive voltage is cut off at the time $t_{204}$. Actually, however, the data bus $IO_i$ is charged via the resistor R102 by small current in the period between the times $t_{204}$ and $t_{205}$. As a result, an electric charge quantity of the data bus $IO_i$ is maintained so that the data bus $IO_i$ is maintained at the "1" signal level at the time $t_{205}$. For this reason, when the "1" signal is outputted as the read data at the time $t_{205}$, this "1" signal is maintained as it is. On the other hand, when the "0" signal is outputted as the read data (i.e., when the transistor FET2 shown in FIG. 9 is turned on), the charged data bus $IO_i$ is discharged via the transistor FET2 rapidly. Hence, the time lag is occurred until the "0" signal is defined as the read data, however, this time lag is not so large.

The above is the description of the memory read operation.

After the above-mentioned read data are read out from the memories at a predetermined timing, the write data are supplied to the data bus $IO_i$. Next, the write enable signal WE rises up to the "1" signal at a time $t_{208}$ so that the memory write operation is performed. The signal DBC rises up to the "1" signal at the time $t_{208}$ before a time $t_{207}$ when the write data is supplied to the memory units. Due to the signal DBC having the "1" level, the signal PCG can be prevented from rising up to the "1" signal (as shown in FIG. 4). In addition, due to the signal PCG having the "0" level, the precharge operation is prevented from being performed in the memory write cycle, hence, the write data is prevented from being effected by the charged data bus $IO_i$.

Above is the description of the memory write operation.

In the above description, the access is given to the memories in the word direction, however, the same operations will be performed in the pixel direction. More specifically, when the access is given to the memories in the pixel direction, the output data buffers within the pixel interfaces PXI-0 to PXI-3 pre-charges the data buses $IO_p$-0 to $IO_p$-3 (shown in FIG. 3) before the data read timing. Thus, the "1" signals can be defined without delay even when the memory device according to the present invention has a matrix style constitution.

In the present embodiment, the internal pre-charging circuit is provided within each of the memory units #0M to #3M. However, it is possible to obtain the same advantages described heretofore by providing an external pre-charging circuit connected to each memory unit instead of the internal pre-charging circuit.

4 MODIFIED EMBODIMENTS

Lastly, description will be given with respect to modified embodiments of the present invention in conjunction with FIGS. 28 to 36.

[A] First Modified Embodiment

Figure 28:
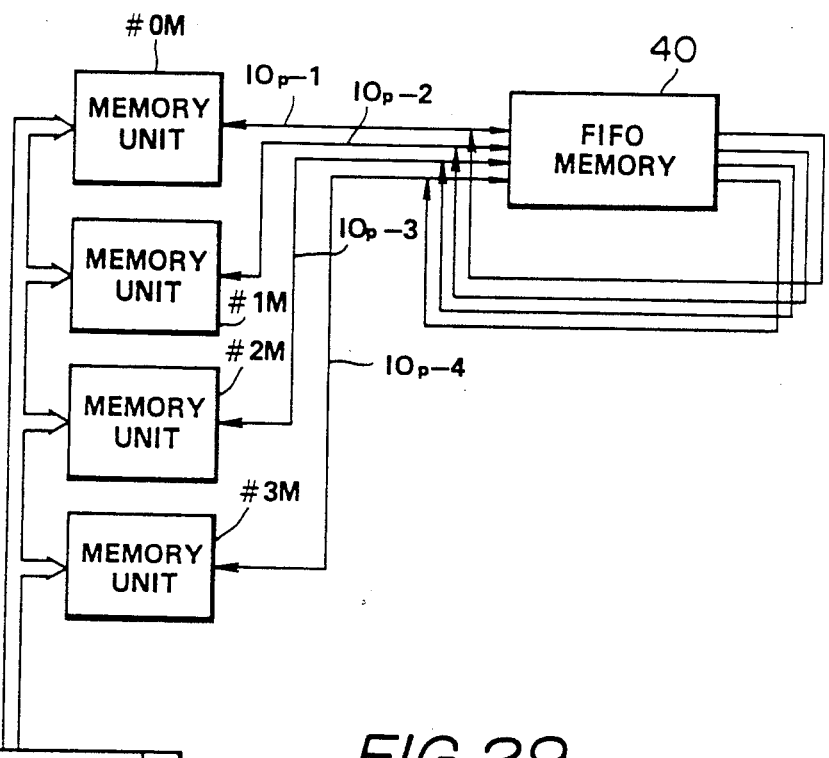
FIG. 28 is a block diagram showing a first modified embodiment of the present invention.

FIG. 28 is a block diagram showing a constitution of a first modified embodiment. In FIG. 28, 40 designates a first-in-first-out memory (i.e., a FIFO memory) of four-bit × two-word (i.e., sixteen bits). The pixel data are transferred between the FIFO memory 40 and the memory units #0M to #3M by way of the data buses $IO_p$-0 to $IO_p$-3. This first modified embodiment is suitable for transferring the pixel data from a source area to a destination area with a high speed. This data transfer is performed in the following manner.

In this embodiment, it is possible to transfer the data to the word boundary without no interval even when both boundaries of the source area and the destination area exist at the word boundary, or even when one of or both of the source area and the destination area exit in the continuous two-word area. Hereinafter, as a general example, description will be given with respect to the case where both of the source area and the destination area exist in the continuous two-word area.

Figure 29:
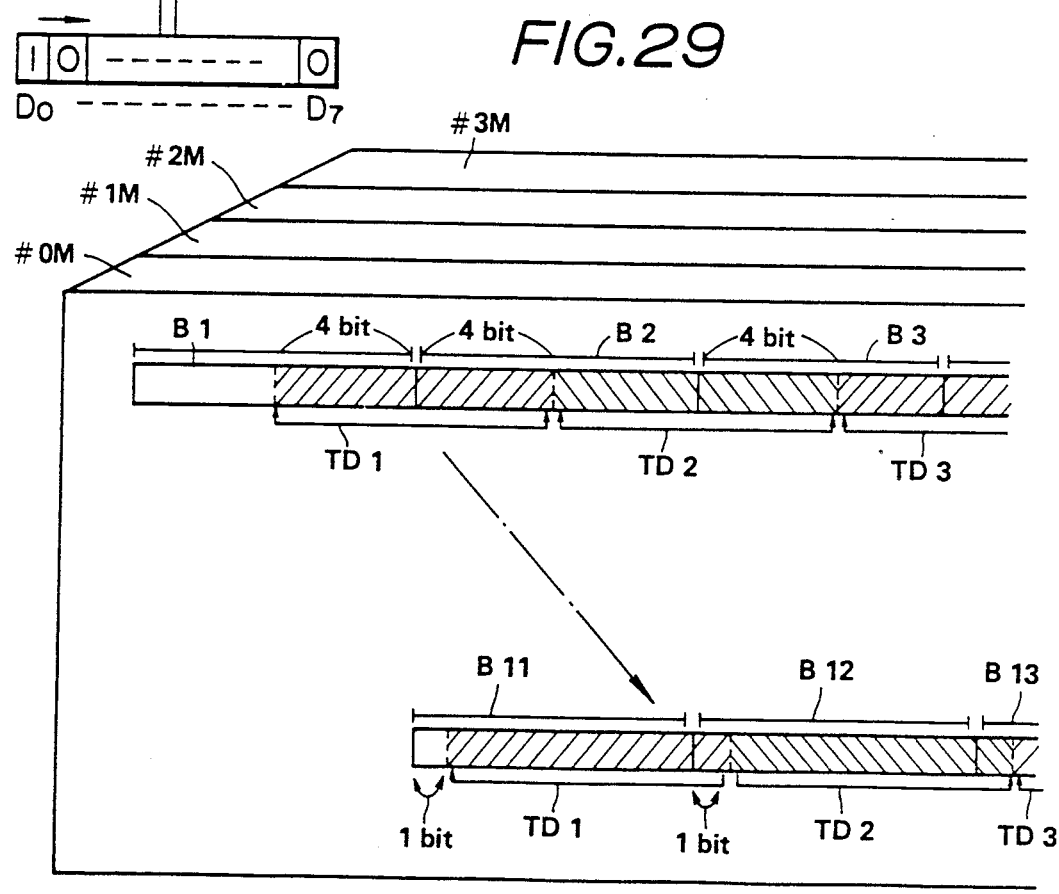
FIG. 29 is a conceptual diagram for explaining a data transfer state of the first modified embodiment.

In FIG. 29, data TD1, TD2 and TD3 of eight bits to be transferred are stored continuously in adjacent two bytes within bytes B1, B2, B3, and the like of eight bits. For example, the data TD1 are stored continuously in bytes B1 and B2 such that lower four-bit data and upper four-bit data within the data TD1 exist respectively in an upper four-bit area of the byte B1 and a lower four-bit area of the byte B2. Similarly, the data TD2 are stored continuously in bytes B2 and B3 such that lower four-bit data and upper four-bit data within the data TD2 exist respectively in an upper four-bit area of the byte B2 and a lower four-bit area of the byte B3. In addition, destination areas (in which the data TD1, TD2 and TD3 will be transferred to and written in) exist at bytes B11, B12, B13, and the like of eight bits such that the destination areas are shifted to an upper side of the bytes B11, B12 and B13 by one bit. In conclusion, both of the source area and the destination area exist continuously in the two-word area.

In this case, the access is firstly given to the byte B1 and 4-bit to 7-bit of the select data are sequentially shifted so as to sequentially read out the pixel data from the memory units, thereafter, such pixel data are stored in the FIFO memory 40. As a result, 4-bit to 7-bit of data stored in the byte B1 are stored in the FIFO memory 40. Next, the access is given to the byte B2 and 0-bit to 7-bit of the select data are sequentially shifted, thereafter, the similar operation described above is performed. Thus, all bits of the data TD1 and lower four bits of the data TD2 are stored in the FIFO memory 40.

Next, the access is given to the byte B11 so as to write the data stored in the FIFO memory 40 into the bytes B11 within the memory units. In this case, the select data are set so as to select the 1-bit of the byte B11, thereafter, the data of seven bits stored in the FIFO memory 40 are sequentially write into the bytes B11 while the select data are shifted to the upper bit side. As shown in FIG. 29, 0-bit to 6-bit of the data TD1 are written into the byte B11. Next, the access is given to the byte B3 wherein all bits of data stored therein are read out and stored in the FIFO memory 40. At this time, the FIFO memory 40 stores the remained one bit (i.e., the 7-bit) of the data TD1, all bits of the data TD2 and lower four bits of the data TD3. Next, the access is given to the byte B12 so as to select the 0-bit to 7-bit of the byte B12, and the output data of the FIFO memory 40 are written into the byte B12. As shown in FIG. 29, the byte B12 stores the 7-bit of the data TD1 and the 0-bit to 6-bit of the data TD2. Similarly, thereafter, the access is given to each of the source side (i.e., the bytes B1, B2, . . . ) and the destination side (i.e., the bytes B11, B12, . . . ) within the memory units in turn so as to perform the data transfer. As described heretofore, it is possible to freely transfer the data by bits even when the source data and the destination data exist continuously in the continuous two-word area. If the FIFO memory 40 has a word length of two words, it is possible to continuously transfer the data until the word boundary even when the source or destination data exist in the word areas in any way.

[B] Second Modified Embodiment

Figure 30:
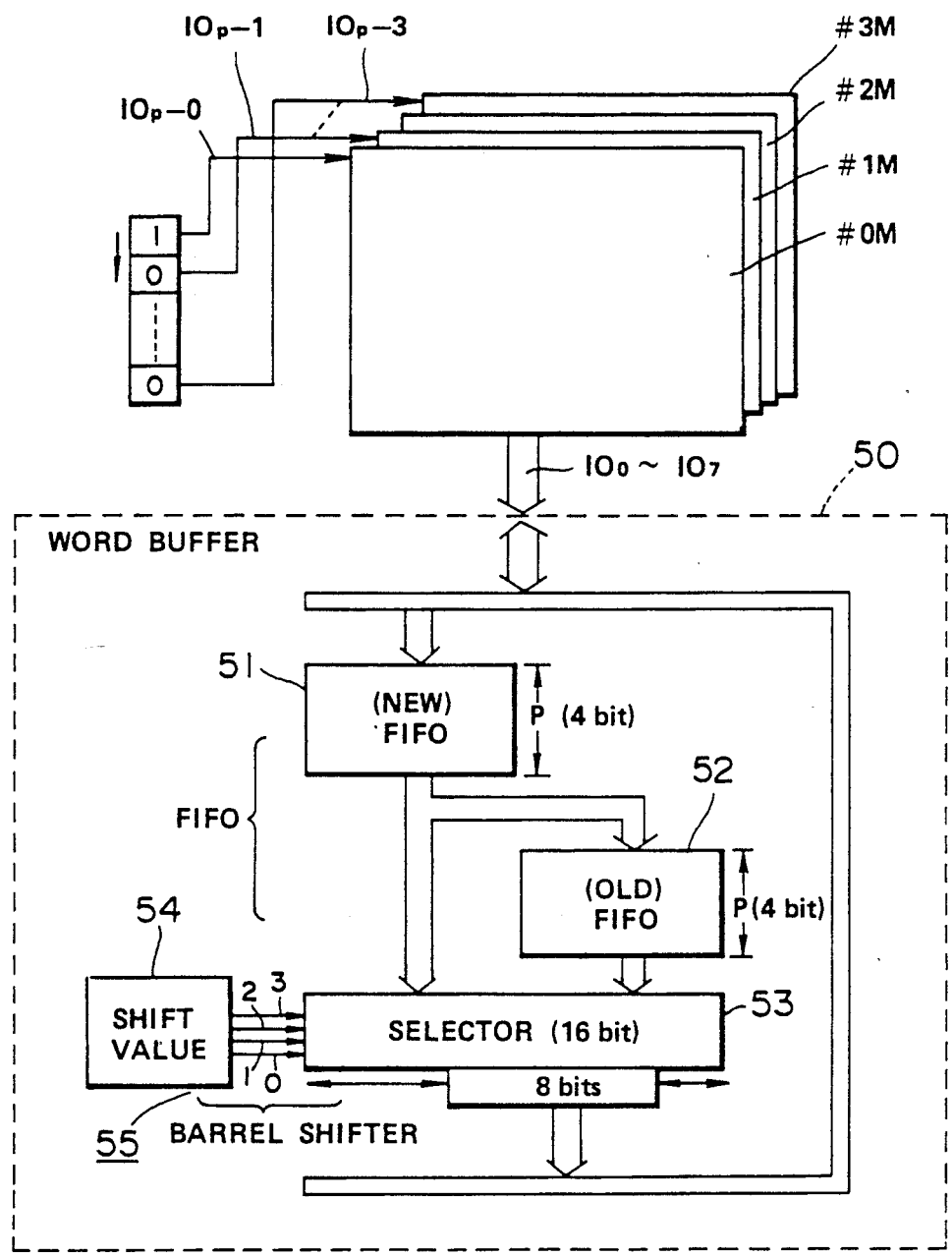
FIG. 30 is a block diagram showing a second modified embodiment of the present invention.

FIG. 30 is a block diagram showing a constitution of the second modified embodiment. In a word buffer 50 shown in FIG. 30, 51 and 52 respectively designate FIFO memories of eight bits×P bits (where P means a number of planes, and P denotes as four in the present embodiment). These FIFO memories 51 and 52 are connected by a cascade connection. The output data of eight bits of the FIFO memory 51 and the output data of eight bits of the FIFO memory 52 are supplied to a selector 53 in parallel. This selector 53 is constituted such that the selector 53 extracts continuous data of eight bits from the parallel input data of sixteen bits thereof based on control signals of shift value selecting portion 54. The selector 53 and the shift value selecting portion 54 constitutes a barrel shifter 55.

In the present embodiment, the access is given to a head address of the source area, and the read-out operation is performed by selecting each plane with respect to such access address. As a result, the FIFO memory 51 is fully stored with the word data at the head address of each plane. Next, the access is given to the address next to the head address of the source area so as to sequentially select each plane at this next address, whereby the write-in operation is performed at this next address of the selected plane. As a result, the FIFO memory 51 stores the data at the head address of each plane, and the FIFO memory 51 stores the data at the address (i.e., the head address +1) of each plane. In this state, when the data are read out from the FIFO memories 51 and 52, the input terminal of the selector 53 is supplied with the continuous data at adjacent two addresses within the same memory unit.

Next, the access is given to the destination area so as to sequentially select each plane, and the data are written into the selected plane. In this case, it is possible to transfer the data without missing any bits thereof by shifting the extracted bit positions of the selector 53 even when the source area exists continuously in the adjacent two-word area. The shift value selecting portion 54 supplies an information of desirable bits to be extracted to the selector 53 in the case where the source area exists continuously at the adjacent two-word area. For example, this shift value selecting portion 54 generates such information in accordance with the CPU controls etc.

Due to the present embodiment, it is possible to freely transfer the data by bits, regardless of the positions of the source areas.

Figure 31:
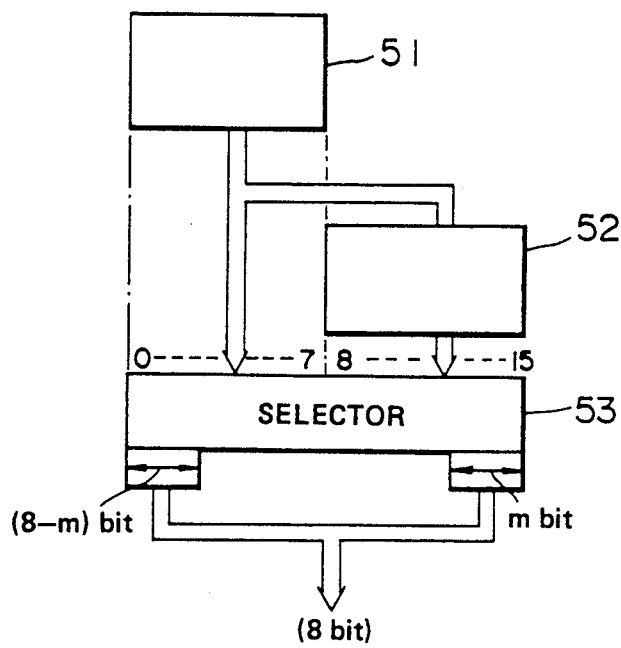
FIGS. 31 to 34 are block diagrams for explaining the operations of the second modified embodiment.
Figure 32:
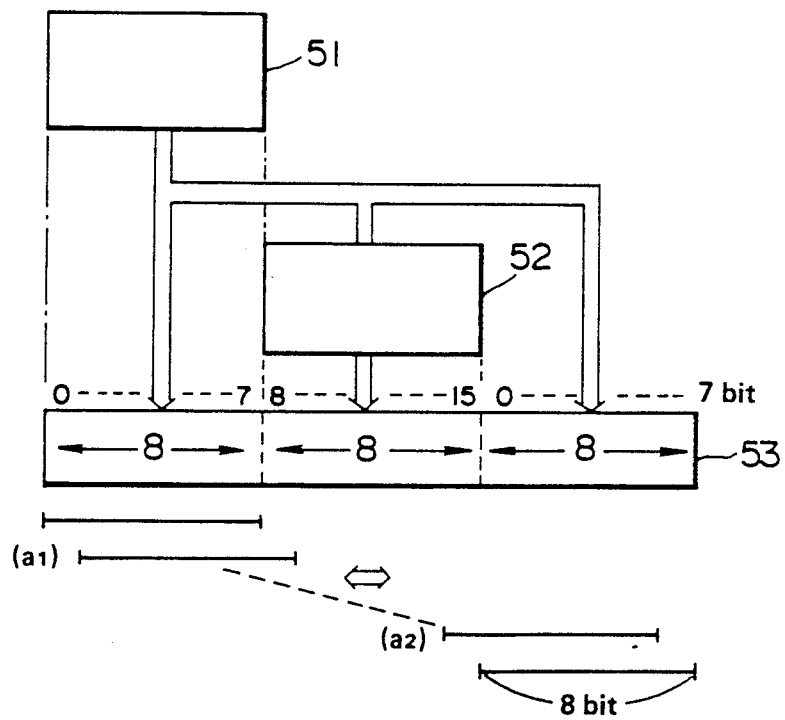

As shown in FIG. 31, the selector 53 can extract the data of lower (8-m) bits from the FIFO memory 52 and also extract the data of upper m bits (where m denotes as an integral number) from the FIFO memory 51 so as to generate data of continuous eight bits. This selector 53 actually has a storing capacity of (8×3) bits, however, the selector 53 works as if the selector 53 has an equivalent storing capacity of (8×3) bits as shown in FIG. 32. In short, the selector 53 works as if the continuous eight bits are extracted from the twenty-four bits. In FIG. 32, a relation between the respective output data of the FIFO memories 51 and 52 will be inverted in the case where an extraction position of the selector 53 exists at a position $a_1$, comparing to the case where such extraction position exists at a position $a_2$. In other words, it is possible to invert transfer directions of the respective output data of the FIFO memories 51 and 52.

Due to the above-mentioned function, the present embodiment is extremely advantageous in the case where it is necessary to invert transfer orders of the FIFO memories 51 and 52.

Next, description will be given with respect to concrete examples of the barrel shifter 55 in conjunction with FIGS. 33 and 34.

Figure 33:
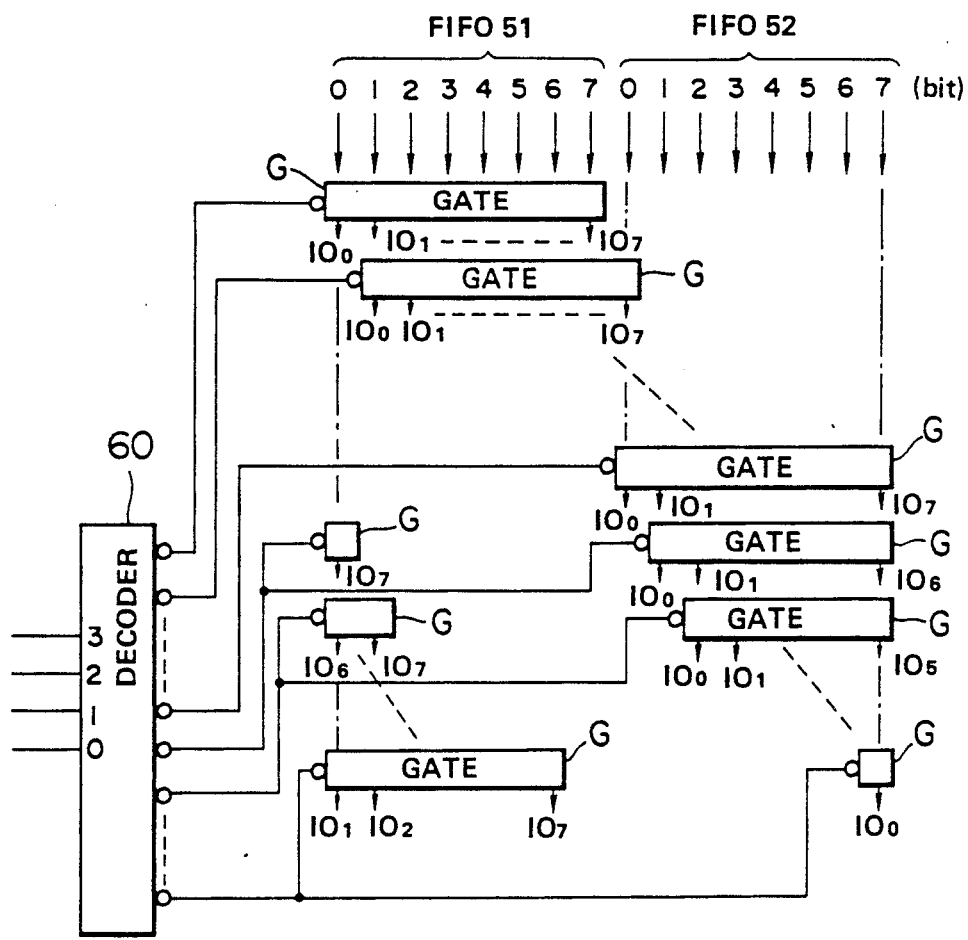

In FIG. 33, all of the numerals G designate gates. When the "0" signal is supplied to control terminals of the gates G, the gates G are subject to an open state so that the gates G extract data of predetermined eight bits from the output data of sixteen bits of the FIFO memories 51 and 52 and output such data of eight bits. Each of the gates G is arranged such that the extraction position of certain gate G is shifted by one bit with respect to that of a gate G adjacent to the certain gate G. In addition, in the case where the gates G are arranged independently in the lower side and the upper side of the FIFO memories as shown in FIG. 33, the gates G are arranged such that respective extraction positions of adjacent two gates G are shifted by one bit. The output signals of the shift value selecting portion 54 are decoded in a decoder 60 wherein the output signals thereof control the gates G to turn on and off. As a result, the circuit shown in FIG. 33 works like the equivalent circuit shown in FIG. 32.

Figure 34:
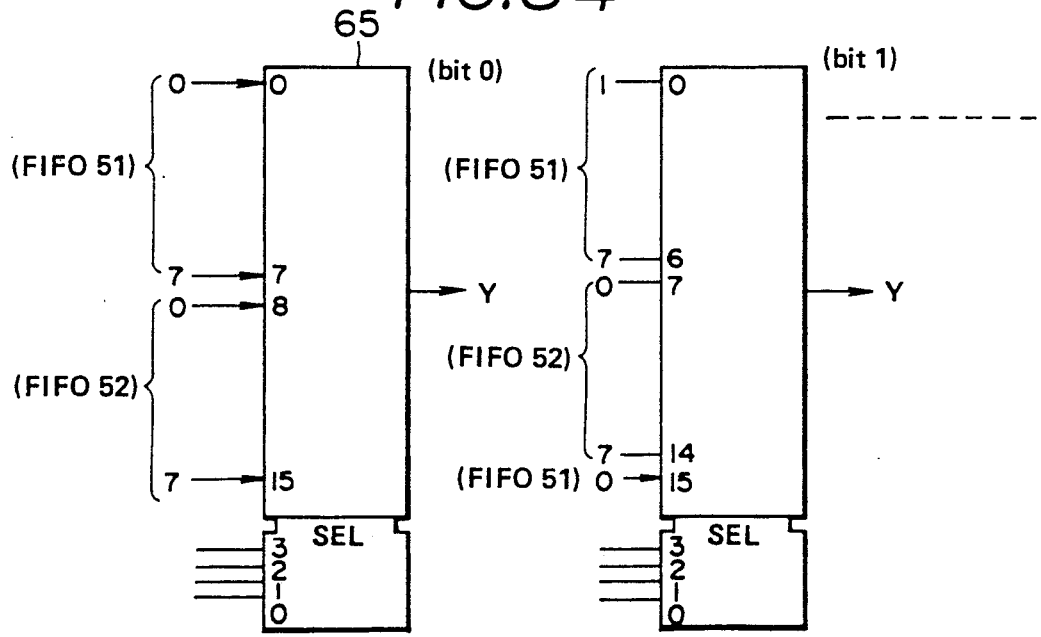

Next, FIG. 34 shows an example of the barrel shifter which is constituted by use of a selector 65. The respective output data of the FIFO memories 51 and 52 are supplied to the input terminals of the selector 65 wherein one of these output data are selected and outputted from an output terminal Y thereof. The data selection in the selector 65 is performed based on the signals supplied to the select terminals of the selector 65. In this example shown in FIG. 34, eight selectors 65 are provided in parallel in accordance with bit0 to bit7. In addition, the signals supplied to the input terminals of the selector 65 corresponding to (bit1) are shifted by one bit with respect to the signals supplied to the input terminals of the selector 65 corresponding to (bit0). Similarly, the input signals are shifted by one bit between two adjacent selectors 65.

Above are the examples of the barrel shifter 55. However, the constitution of the barrel shifter 55 is not limited to those examples, and it is possible to employ other circuit constitutions as the barrel shifter 55. In short, the barrel shifter 55 must be constituted to realize the equivalent circuit shown in FIG. 32.

In the first and second modified embodiments described heretofore, one word is constituted by eight bits, however, it is possible to realize that one word is constituted by sixteen bits. In this case, the FIFO memory 40 has a word length of thirty-two bits (i.e., two words), and bit width of the FIFO memories 51 and 52 have the same word width of sixteen bits (i.e., one word). Due to this word composition in the FIFO memories 40, 51 and 52, it is possible to perform the operation of the barrel shifter in a manner similar to the first and second modified embodiments.

Incidentally, in the case where memory elements used for the memory blocks require the column address strobe signal CAS at the data input/output timings, the column address strobe signal CAS in the line select read operation must be controlled in correspondence with the output enable signal OE as shown by a dotted line in FIG. 20 described before. In addition, the column address strobe signal CAS in the line select write operation must be controlled in a manner similar to that in the line select read operation.

[C] Other Embodiments

The present invention is not limited to the embodiments described heretofore, and it is possible to employ several kinds of modified connection relations and modified function distributions among the bit interfaces, the pixel interfaces, the timing command control circuit and memory portions.

Figure 35:
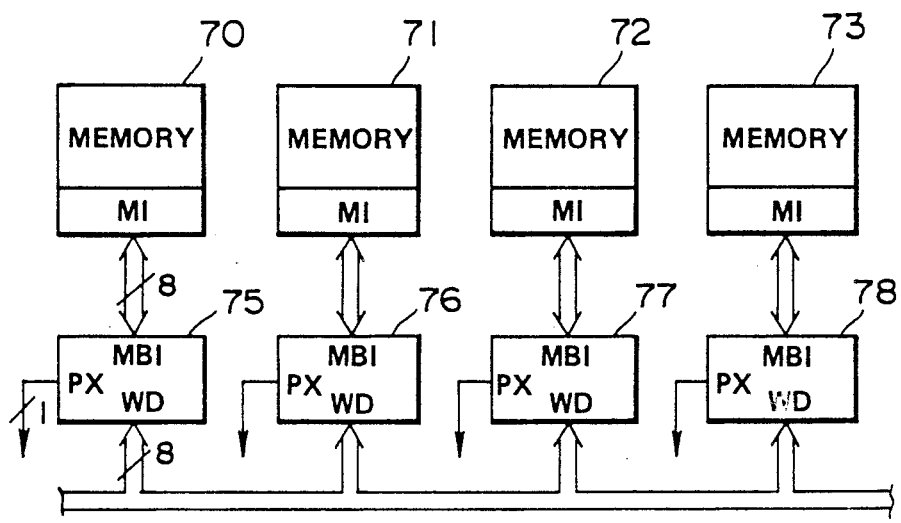
FIGS. 35 and 36 are block diagrams showing other modified embodiments of the present invention.

As shown in FIG. 35, it is possible to constitute the present invention by use of memory blocks 70 to 73 each having a memory interface MI and memory block interfaces (MBI). The write bit mask function is provided in the memory interfaces MI, and other kinds of functions are provided in each of the memory block interfaces 75 to 78.

Figure 36:
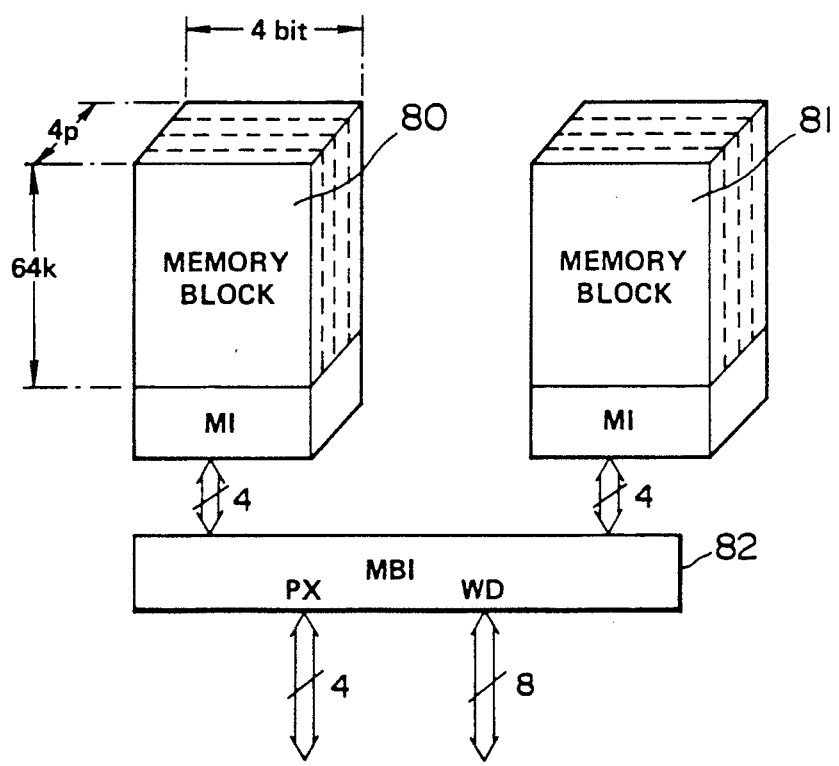

If the storing capacity of the memory is relatively large, the present invention may be constituted as shown in FIG. 36. In FIG. 36, 80 and 81 designate respective memory blocks of four-bit×64-kilo×four-plane (i.e., four planes), each of these memory blocks 80 and 81 provide memory interfaces MI. In this case, data of four bits are transferred between the memory interfaces MI and a memory block interface MBI. This memory block interface MBI is constituted such that the word data of eight bits and the pixel data of four bits can be transferred between the memory block interface MBI and an external device (not shown).

In addition, the memory interfaces MI shown in FIG. 36 are required to provide a function for selecting one of the word direction and the pixel direction, a read-/write bit mask function, a write plane mask function and a read plane mask function.

As a result, when the word direction is selected, the input/output data of the memory interface MI are identical to the data of one or plural planes in the word direction. Similarly, when the pixel direction is selected, the input/output data of the memory interface MI are identical to the data of each plane in the pixel direction. Furthermore, it is possible to perform the bit mask and the plane mask in the read/write cycle.

Next, the memory block interface MBI is required to provide a function for selecting one of the word direction and the pixel direction, a read bit mask function, a read plane mask function, a function of data buffers (four-plane×2) and a function of barrel shifter.

When the word direction is selected, the memory block interface MBI combine a pair of the input/output data of four bits of the memory interface MI together so as to generate word data of eight bits. This word data are transferred in response to the read plane mask via the memory block interface MBI. On the other hand, when the pixel direction is selected, the input/output data of the memory interface MI (i.e., the pixel data of the same plane) are subject to the AND operation in response to the read bit mask and transferred to the memory block interface MBI.

The data buffers require a storing capacity of eight-bit×four-plane×two-word. However, the barrel shifter requires only one plane of such storing capacity because it is sufficient for the barrel shifter to transfer the data to the selected one of the planes. For example, the data are transferred to the planes sequentially in the predetermined order.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A single memory storage and accessing device for storing a plurality of image data corresponding to dots on a display screen, and providing access data to said memory storage and accessing device for accessing said image data stored therein, said single memory storage and accessing device comprising;
   (a) memory means including a plurality of memory units, with a common address bus being connected in common to each said memory unit, each said memory unit having at least a first data port for a word data access and a second data port for a pixel data access, said first data port of each said memory unit being connected in common by a word data bus, and each said second data port of each said memory unit being independently connected to a respective pixel data bus, said pixel data buses and said word data bus being independently operable;
   (b) select means for selecting a specific portion within a storage area of each said memory unit and enabling said selected specific portion so that said selected specific portion can be accessed within one memory cycle; and
   (c) access data selecting means for selecting access data to be provided to each said memory unit so as to access said selected specific portion sequentially or randomly within one memory cycle.

2. The single memory storage and accessing device according to claim 1, wherein said image data comprises color data indicating display colors of said image data and the number of said memory units corresponds to the bit number of said color data.

3. The single memory storage and accessing device according to claim 1 which further includes a plurality of buffers for receiving said image data accessed from said specific portions selected by said access data selecting means.

4. The single memory storage and accessing device according to claim 3, wherein memory elements are arranged in a word direction in each memory unit and a plurality of said memory units are arranged in a pixel direction, whereby said image data are stored in said memory elements two-dimensionally, wherein said image data can be accessed along said pixel and word directions.

5. A single memory storage and accessing device for storing a plurality of image data corresponding to dots on a display screen, and providing access data to said memory storage and accessing device for accessing said image data stored therein, said memory single storage and accessing device comprising:
(a) memory means comprising a plurality of memory units, each said memory unit including a plurality of memory elements for storing bits of image data therein;
(b) a word data bus provided in common for the same bit number for each memory unit in a word direction;
(c) a plurality of pixel data buses, each of which is independently provided for each said memory unit in a pixel direction;
(d) first storing means for storing bit mask data for performing a bit mask, said bit mask being supplied to said first storing means via said word data bus, at least one of said bits within each said memory unit being selected to be masked based on said bit mask data;
(e) second storing means for storing select data, said select data being supplied to said second storing means via said pixel data bus, one of said memory units being selected based on said select data;
(f) third storing means for storing plane mask data for performing a plane mask, said plane mask data being supplied to said third storing means via said pixel data bus, at least one of said memory units being masked based on said plane mask data;
(g) first means for executing a normal mode, one of said memory units being selected based on said select data stored in said second storing means when said normal mode is selected;
(h) second means for executing a mask mode, said bit mask based on said bit mask data stored in said first storing means or said plane mask based on said plane mask data stored in said third storing means being performed when said mask mode is selected; and
(i) mode selecting means for selecting one of said normal mode and said mask mode based on a value of a predetermined memory control signal when a start control signal is activated for accessing said memory means.

6. The single memory storage and accessing device according to claim 5, wherein a predetermined command determines whether said plane mask is performed or not performed based on said plane mask data.

7. A single memory storage and accessing device for storing a plurality of image data corresponding to dots on a display screen, and providing access data to said memory storage and accessing device for accessing said image data stored therein, said single memory storage and accessing device comprising;
a plurality of memory units, with a common address bus being connected in common to each said memory unit, each said memory unit including a plurality of memory elements, said plurality of memory elements being arranged in a word direction in each said memory unit and said plurality of memory units being arranged in a pixel direction, each said memory unit having at least a first data port for a word data access and a second data port for a pixel data access, said first data port of each said memory unit being connected in common by a word data bus, and each said second data port of each said memory unit being independently connected to a respective pixel data bus, said pixel data buses and said word data bus being independently operable, wherein each said memory unit further includes
a plurality of bit interface subunits, each said bit interface subunit being in data communication with a respective memory element and being connected to said word data bus,
a pixel interface subunit in data communication with each said bit interface subunit within said memory unit, and being connected to said pixel bus of said memory unit, and
a timing command control subunit for receiving timing, command and control data, and being in data communication with said plurality of memory elements, said plurality of bit interface subunits and said bit interface subunits.

8. The single memory storage and accessing device of claim 7, wherein each said bit interface subunit within each said memory unit, includes a pixel output data buffer.

9. The single memory storage and accessing device of claim 8, wherein each said bit interface subunit further comprises
a source register,
a destination register, and
a pattern register.

* * * * *